(12) United States Patent
Tang et al.

(10) Patent No.: US 8,832,688 B2
(45) Date of Patent: Sep. 9, 2014

(54) KERNEL BUS SYSTEM WITH A HYBERBUS AND METHOD THEREFOR

(75) Inventors: Chang Bin Tang, Shanghai (CN); Yanxin Wang, Shanghai (CN)

(73) Assignee: Transoft, Shanghai (CN)

( * ) Notice: Subject to any disclaimer, the term of this patent is extended or adjusted under 35 U.S.C. 154(b) by 505 days.

(21) Appl. No.: 13/115,341

(22) Filed: May 25, 2011

(65) Prior Publication Data

US 2011/0296411 A1 Dec. 1, 2011

(30) Foreign Application Priority Data

May 27, 2010 (CN) .......................... 2010 1 0183844

(51) Int. Cl.
*G06F 9/455* (2006.01)
*G06F 9/46* (2006.01)
*G06F 13/24* (2006.01)

(52) U.S. Cl.
USPC ................ 718/1; 718/102; 710/262; 710/260

(58) Field of Classification Search
None
See application file for complete search history.

(56) References Cited

U.S. PATENT DOCUMENTS 7,853,744 B2 * 12/2010 Mahalingam et al. ........ 710/262

OTHER PUBLICATIONS

Bhatia et al; Virtual Cluster Management with Xen, Euro-Par 2007 Workshops, LNCS 4854, pp. 185-194, 2008.*
Zhao et al; Improving Distributed File System Performance in Virtual Machine Environments; eecs.umich.edu, 2006.*
Garfinkel et al; Terra: A Virtual Machine-Based Platform for Trusted Computing; SOSP'03, Oct. 1-22, 2003.*

* cited by examiner

*Primary Examiner* — Meng An
*Assistant Examiner* — Bing Zhao
(74) *Attorney, Agent, or Firm* — Bryan Cave LLP

(57) ABSTRACT

Some embodiments concern a kernel bus system for building at least one virtual machine monitor. The kernel bus system can include: (a) a hyperbus; (b) user space components; (c) guest space components configured to interact with the user space components via the hyperbus; (d) VMM components having frontend devices configure to perform I/O operations with the hardware devices of the host computer using a zero-copy method or non-pass-thru method; (e) para-virtualization components having (1) a virtual interrupt module configured to use processor instructions to swap the processors of the host computer between a kernel space and a guest space; and (2) a virtual I/O driver configured to enable synchronous I/O signaling, asynchronous I/O signaling and payload delivery, and pass-through delivery independent an QEMU emulation; and (f) KVM components. Other embodiments are disclosed.

18 Claims, 36 Drawing Sheets

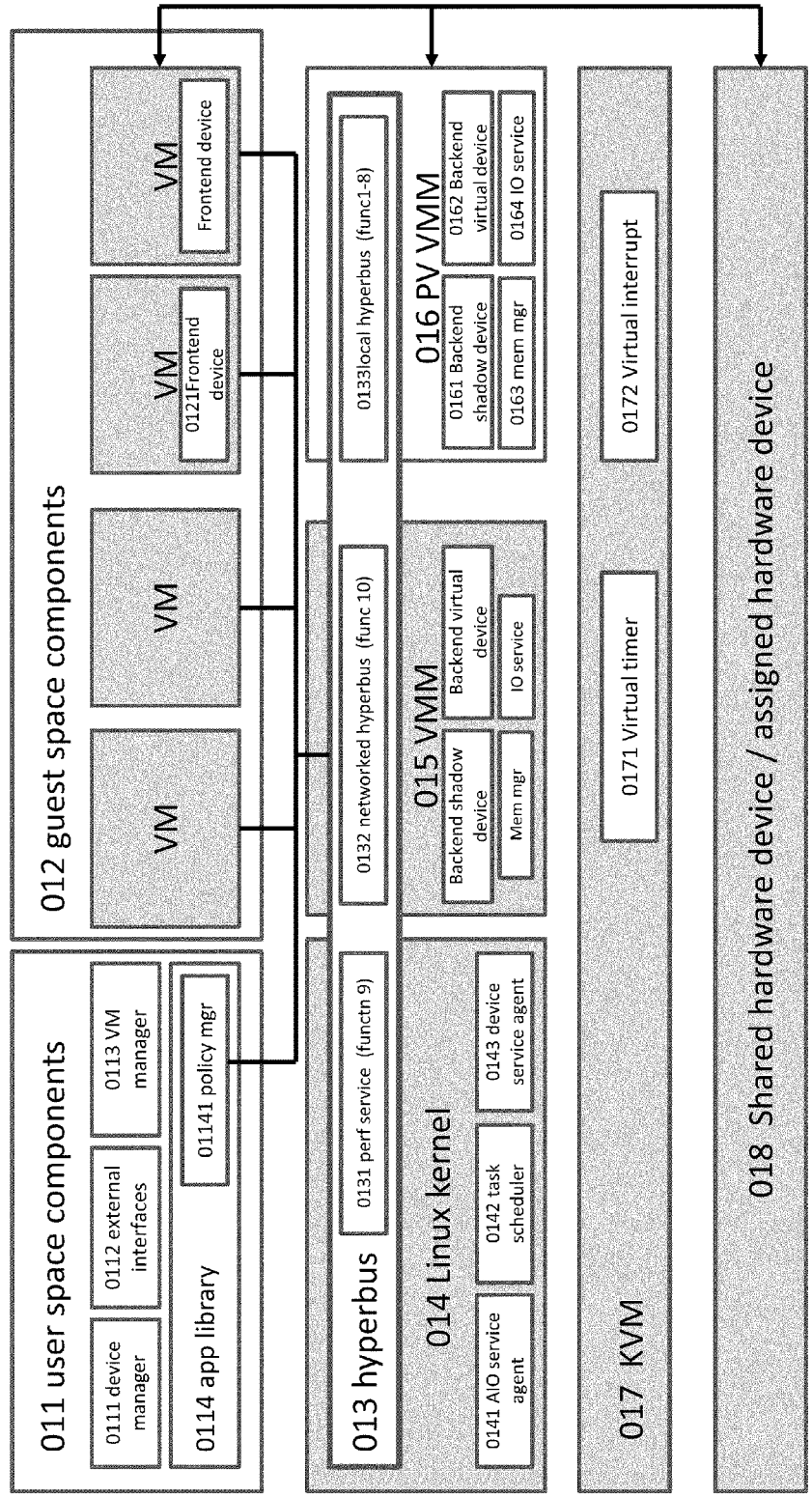
Fig.1. Hyperbus Architecture

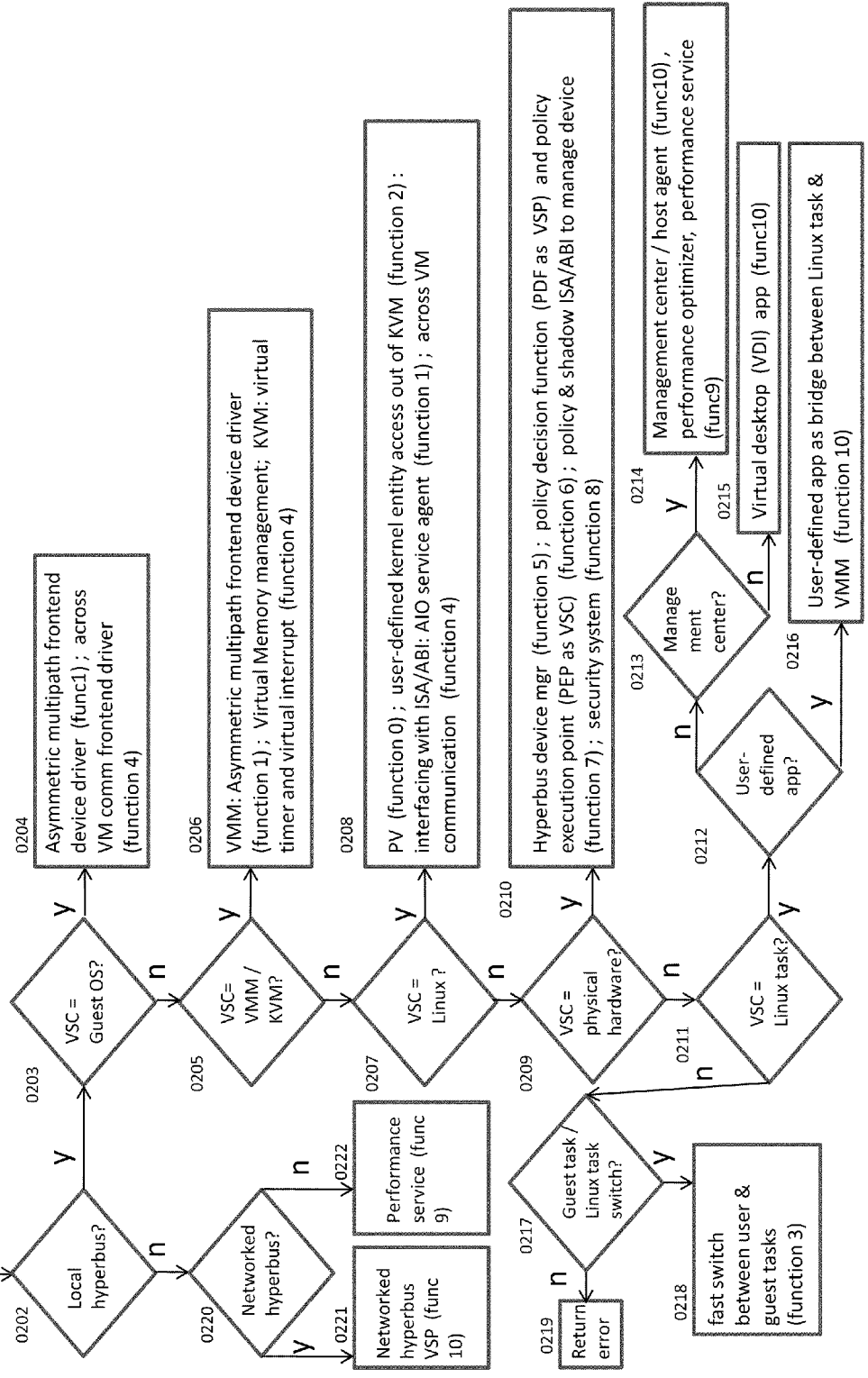

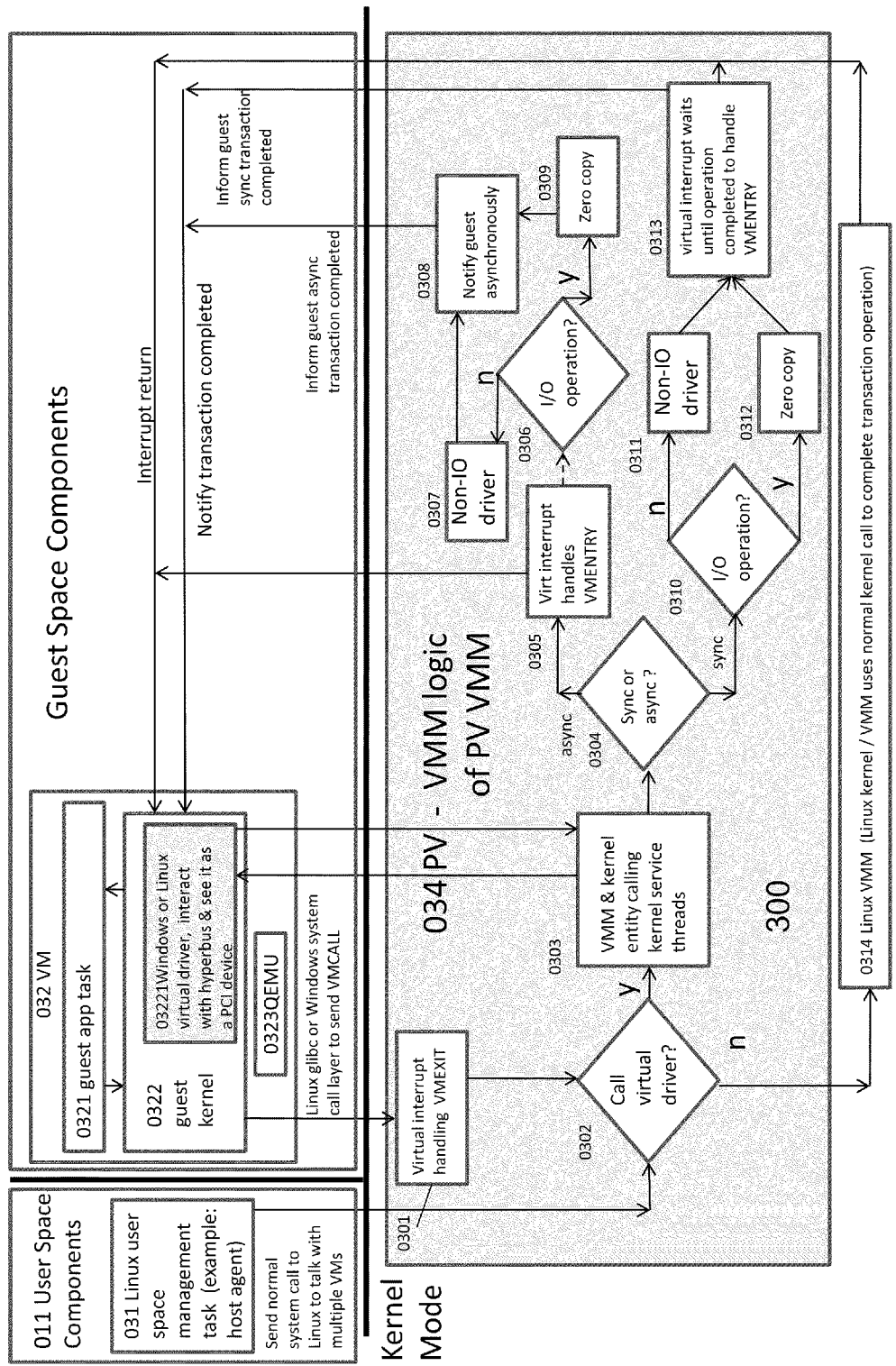
Fig.3. Hyperbus function 0—basic PV function (by-passing QEMU)

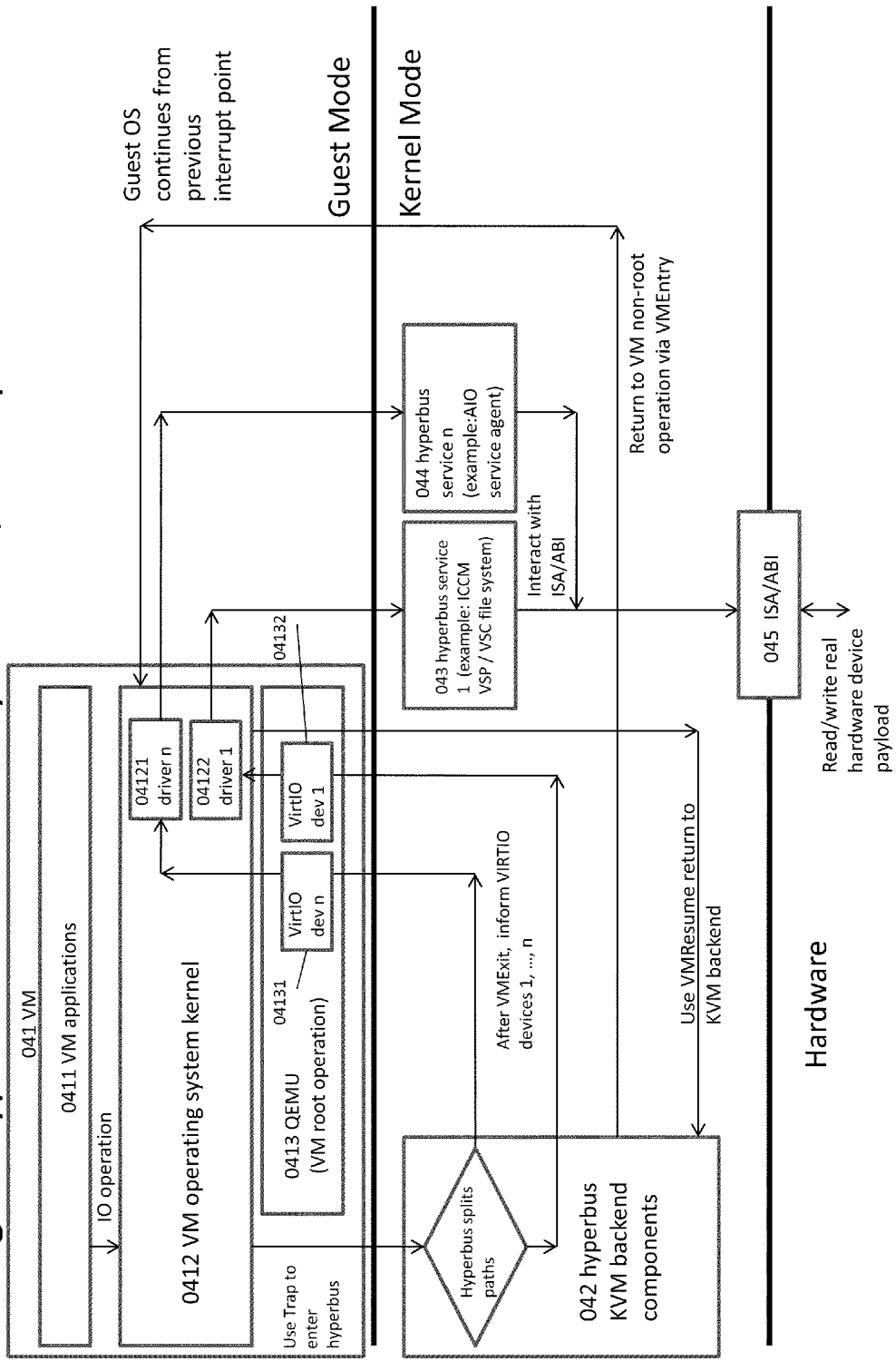
Fig.4. Hyperbus function 1:Asymmetric, multipath fast control

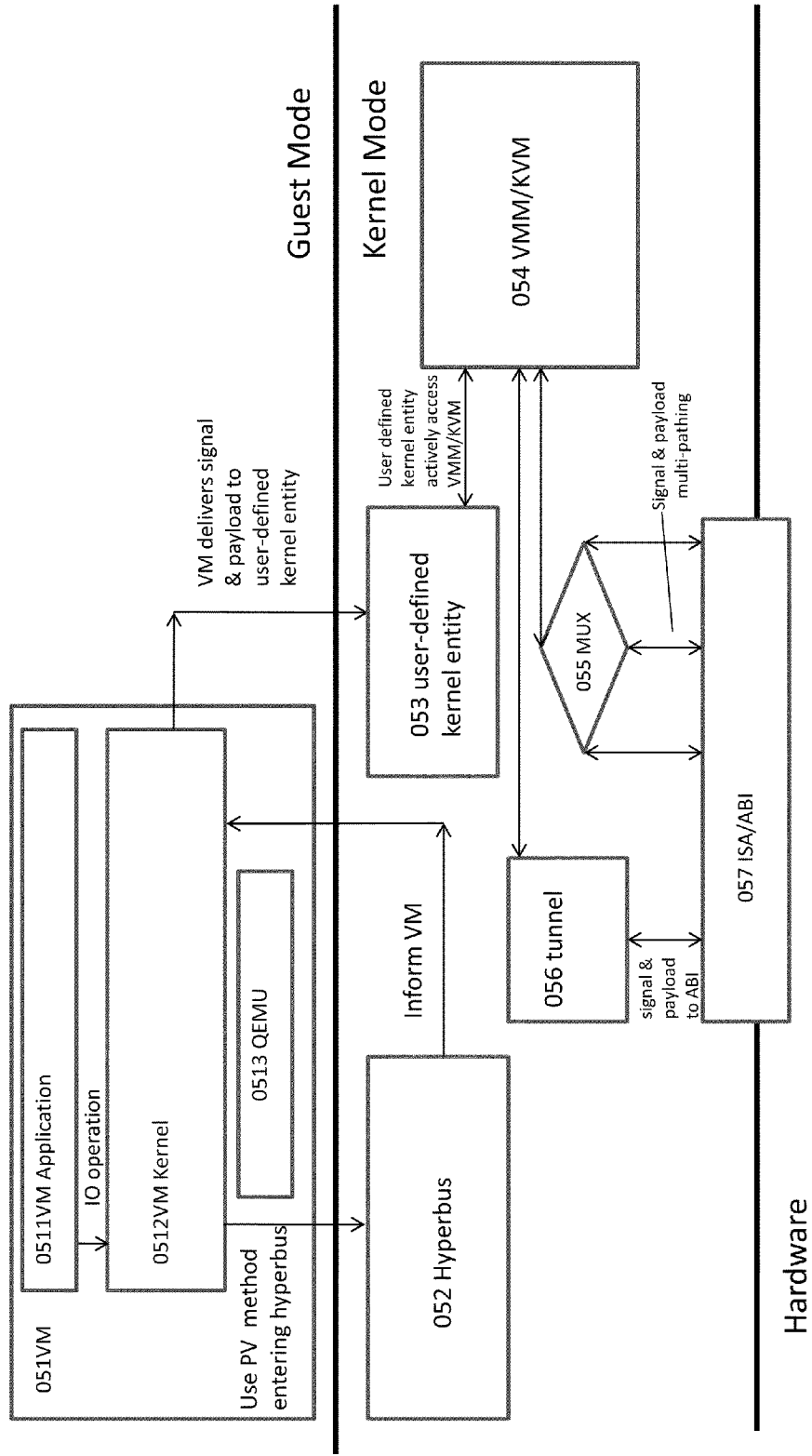
Fig.5. Hyperbus function 2: user-defined kernel entity access out of VMM/KVM

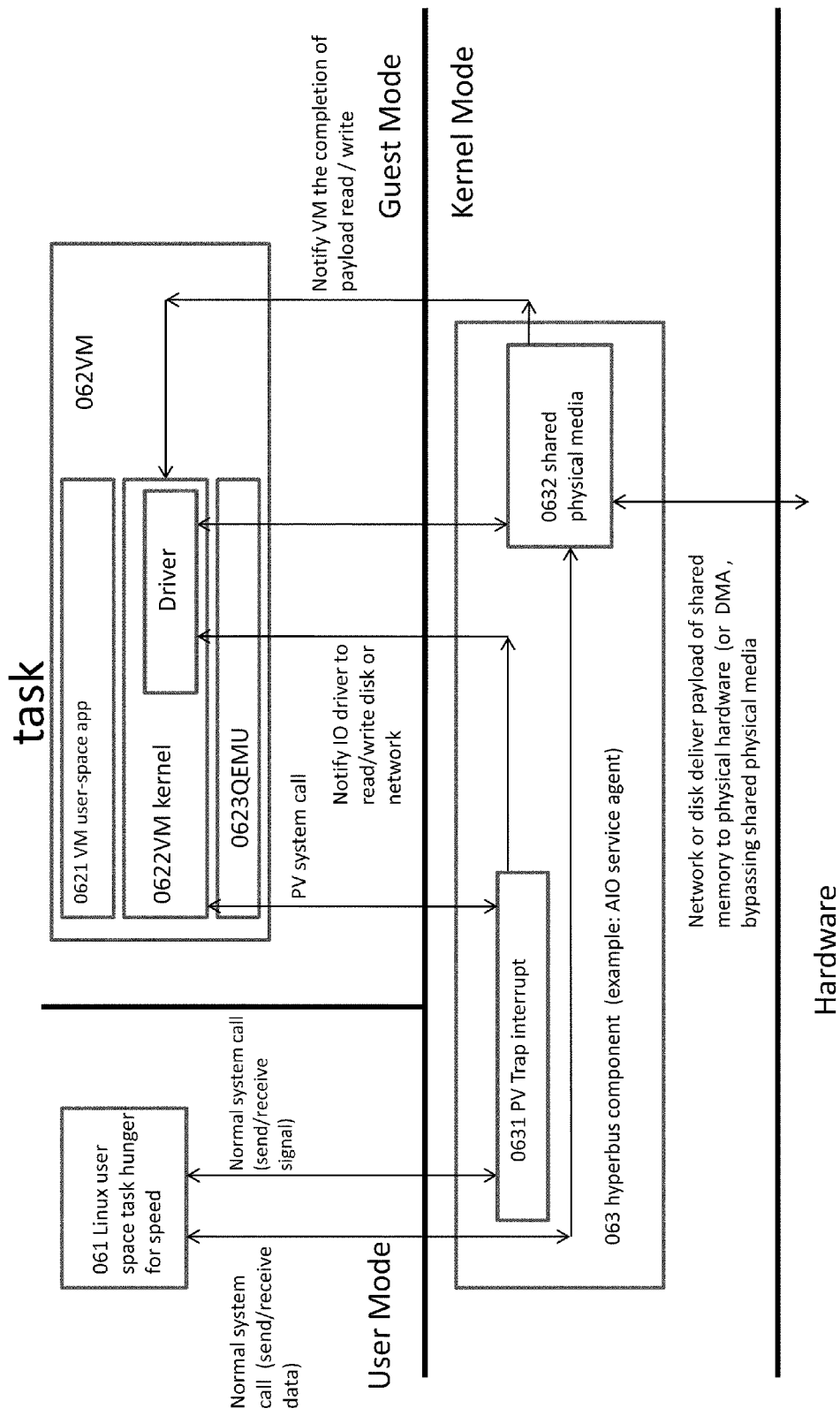
Fig.6. Hyperbus function 3: fast switch between user task & guest task

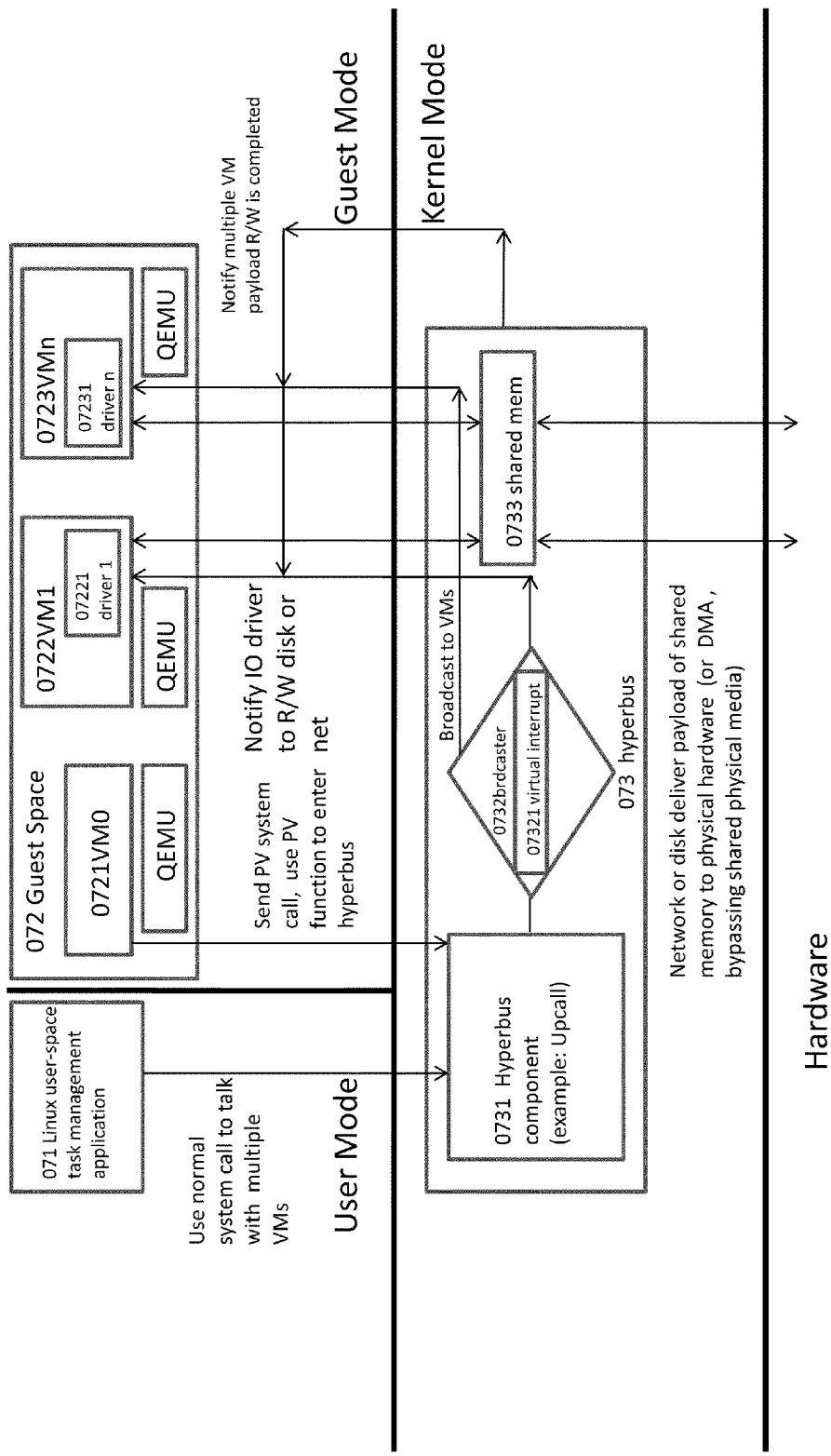
Fig.7. Hyperbus function 4: Across-VM communication

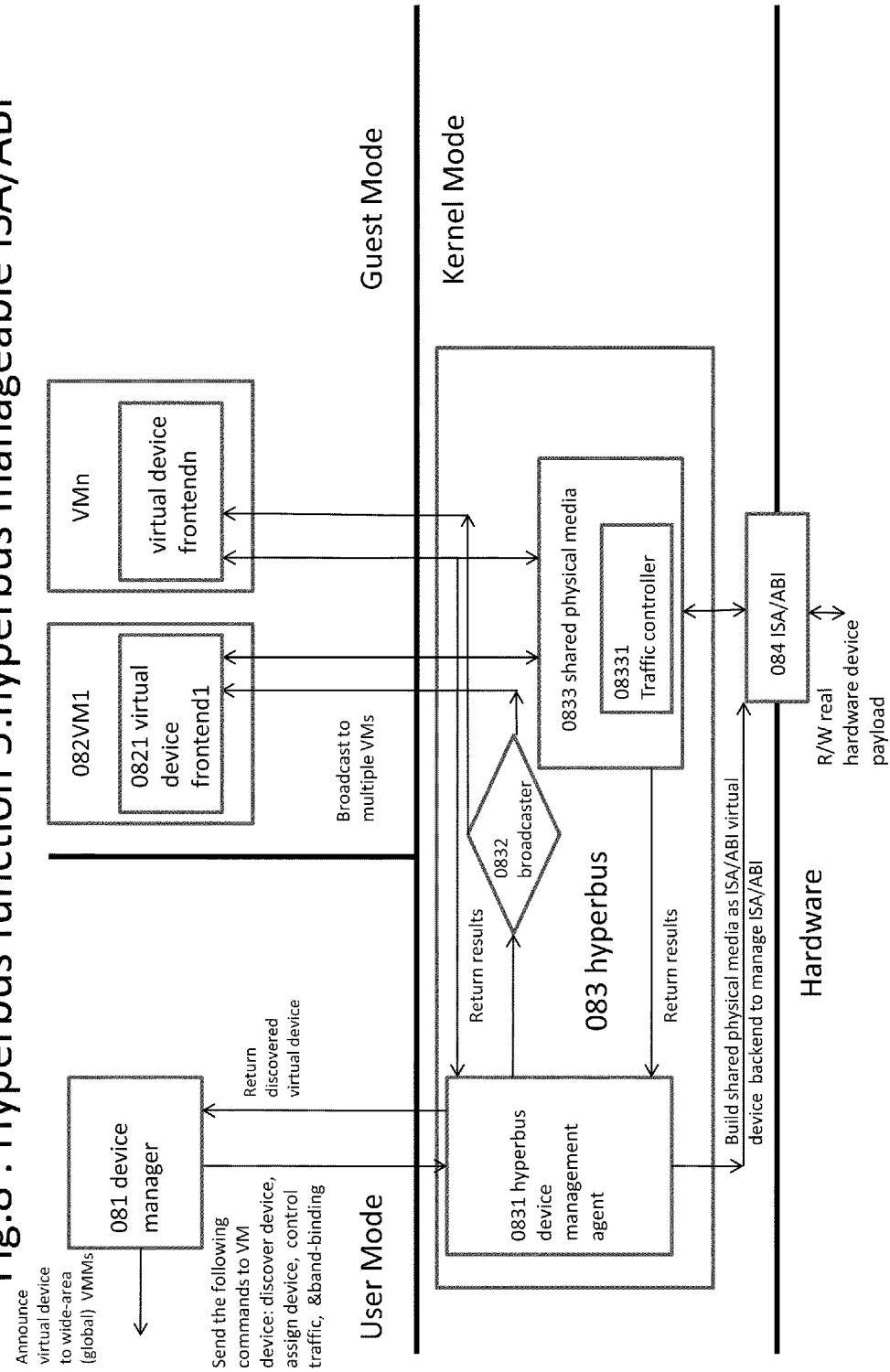

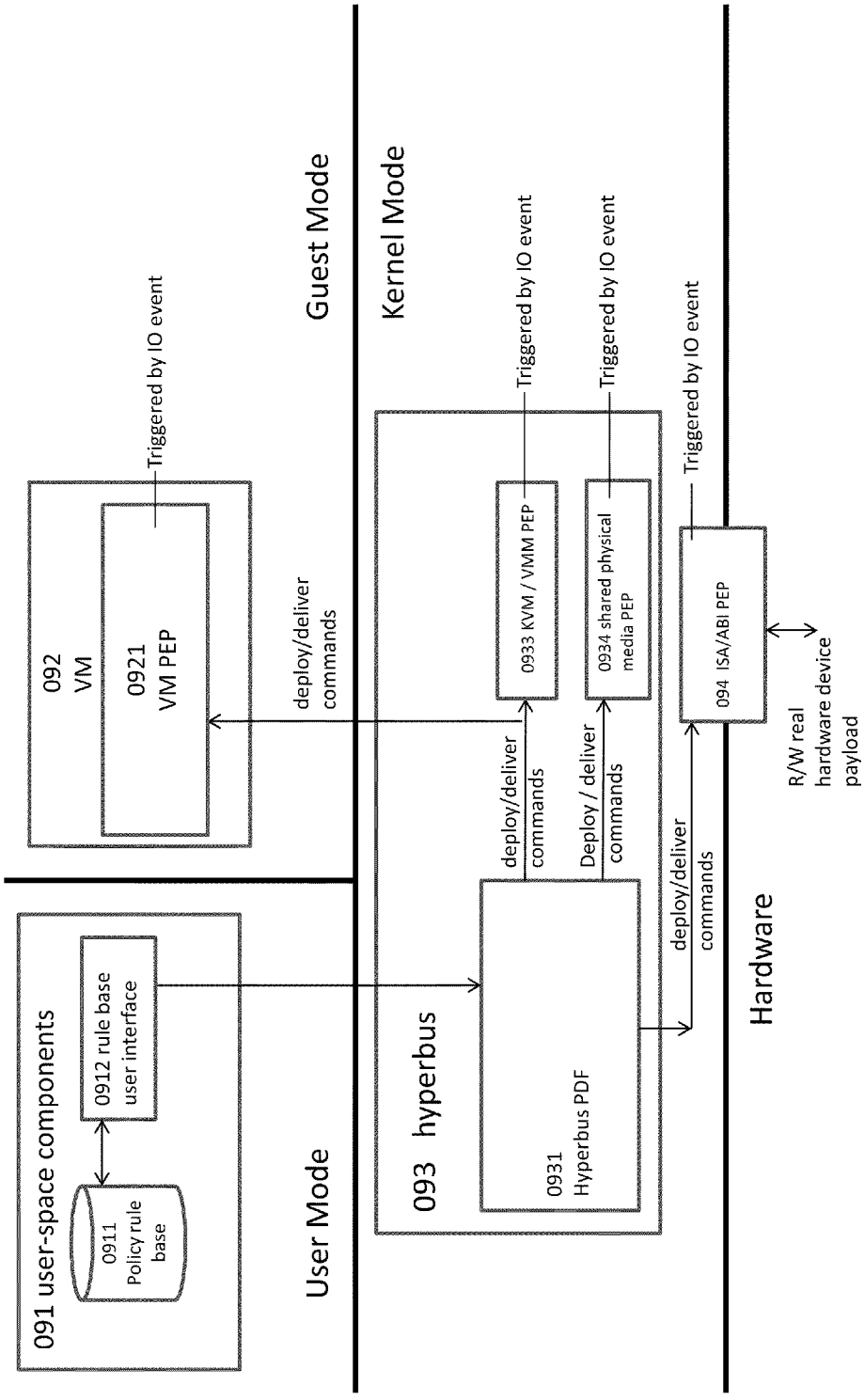
Fig.9. Hyperbus function 6: use of policy decision function (PDF) & policy execution point (PEP)

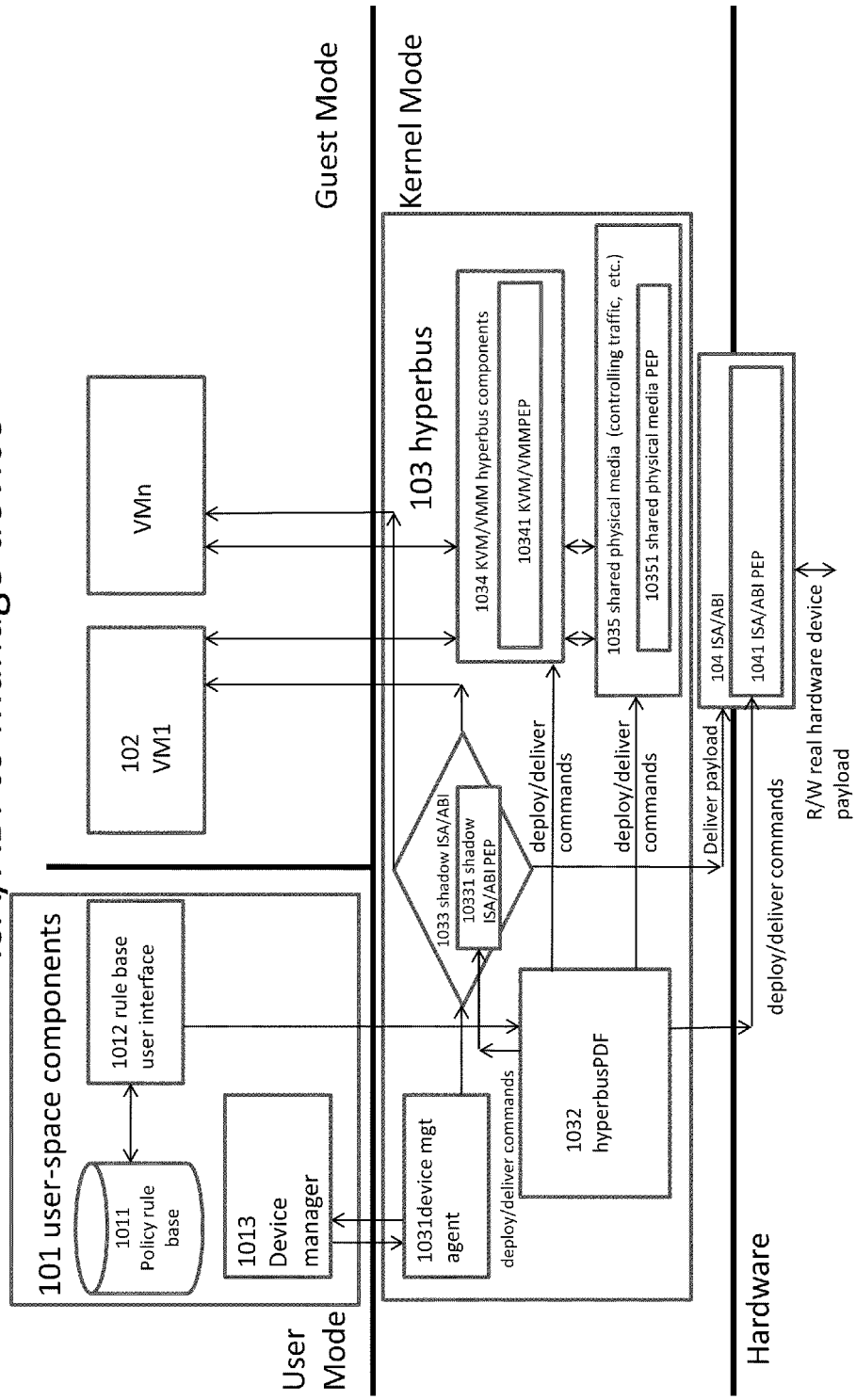
Fig.10. Hyperbus function 7: use policy and a shadow ISA/ABI to manage device

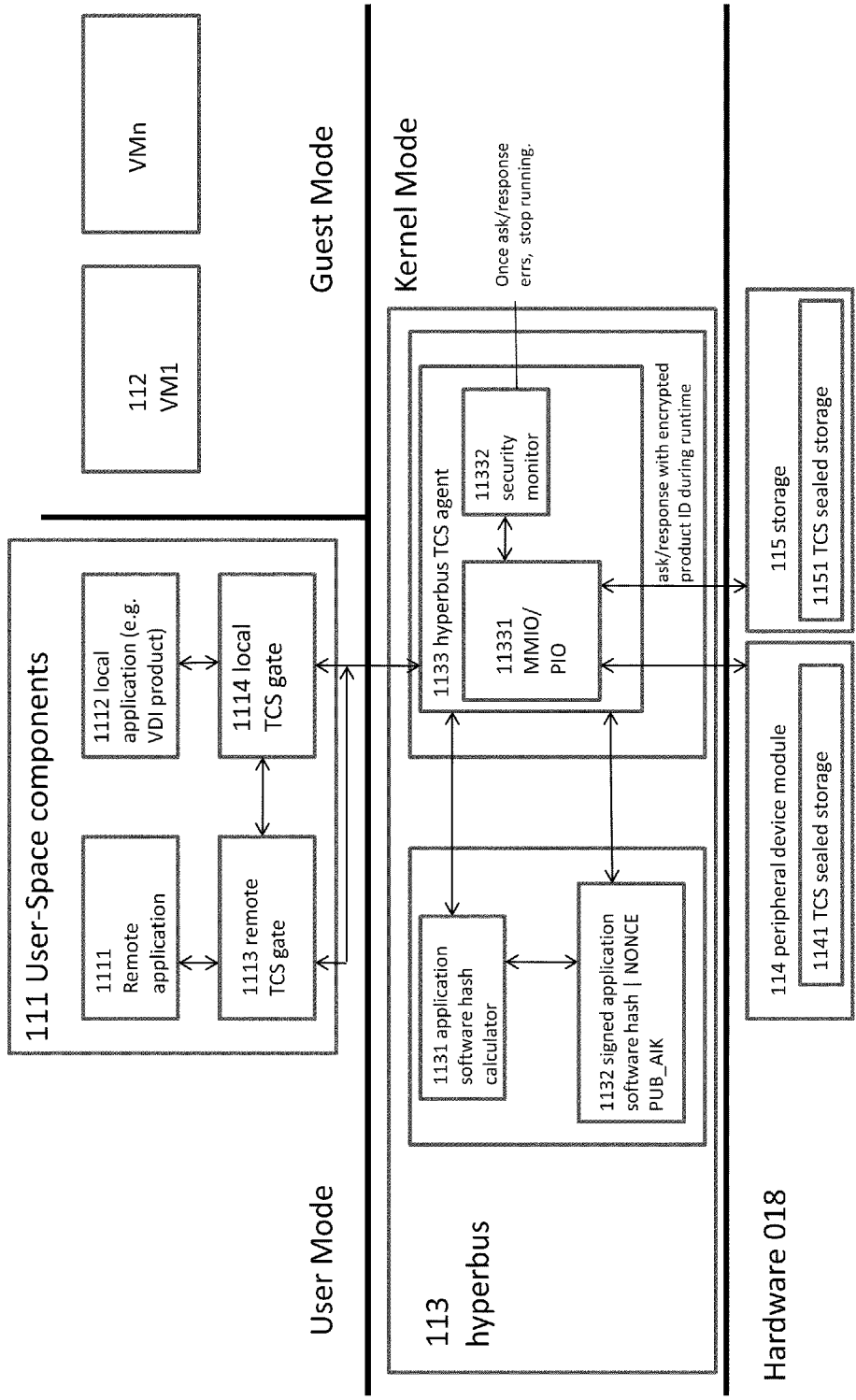
Fig.11. Hyperbus function 8:Security Management

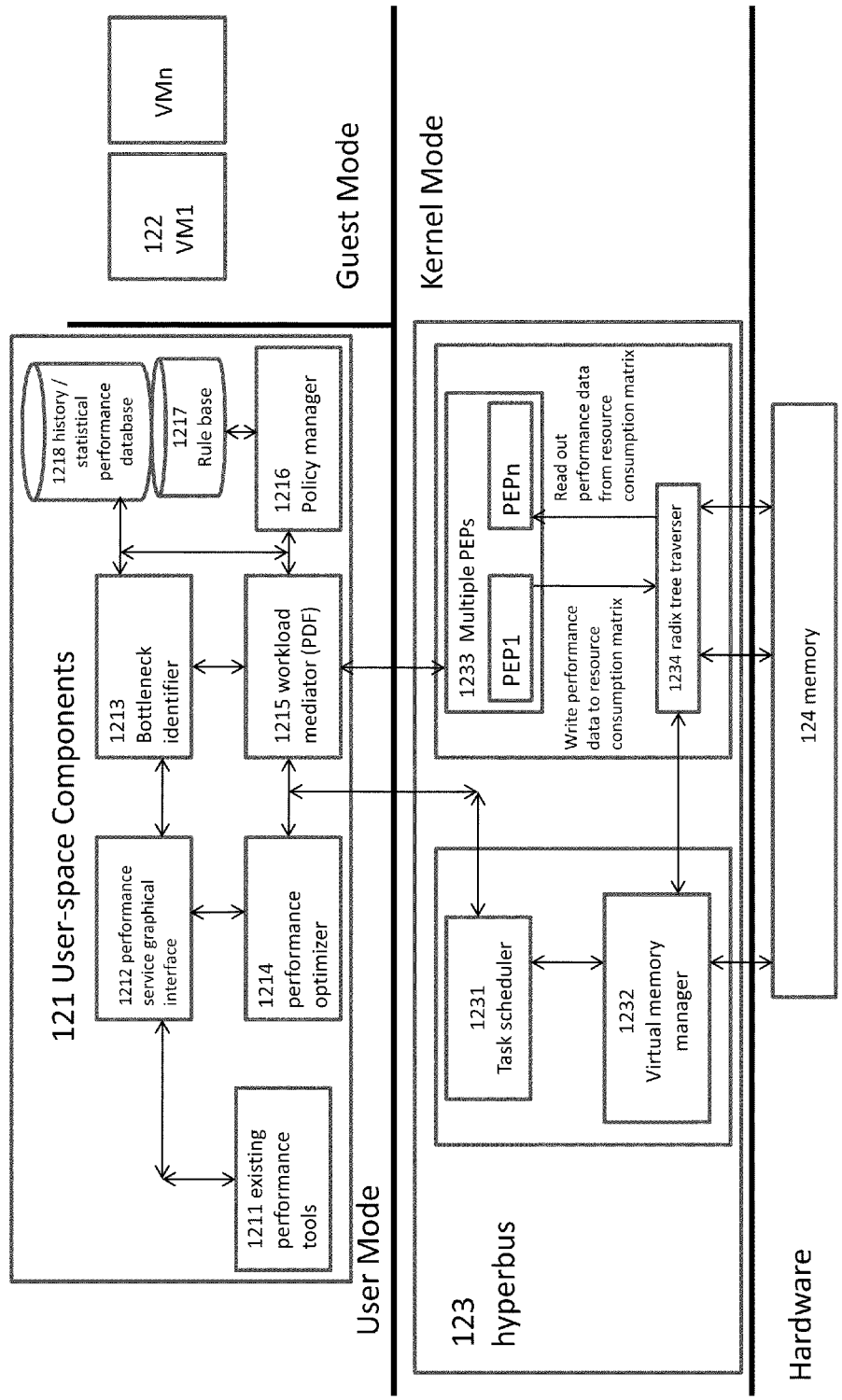
Fig. 12. Hyperbus function 9: Monitoring Performance Service

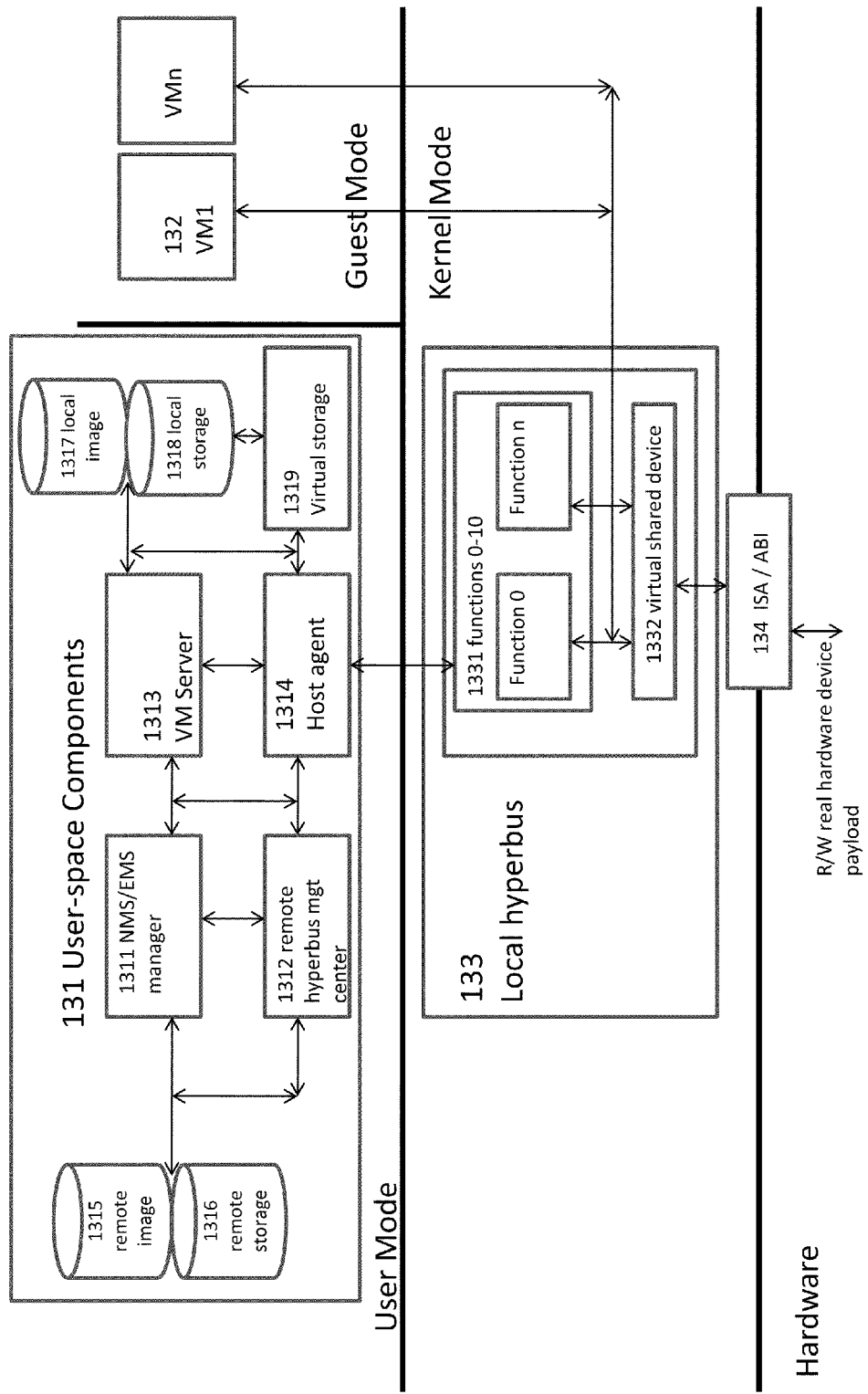
Fig.13. Hyperbus function 10: A Networked hyperbus

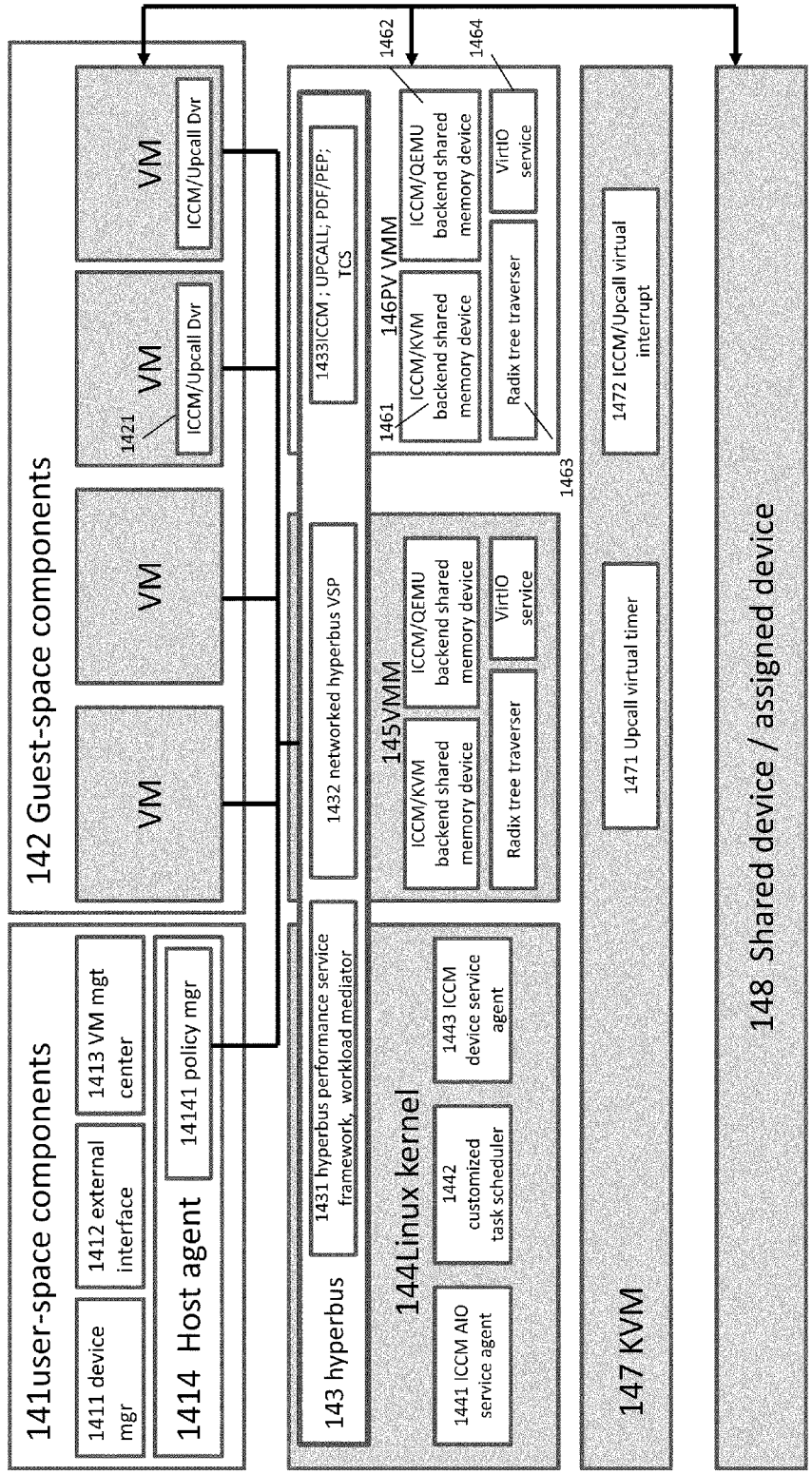
Fig.14. hyperbus Examples

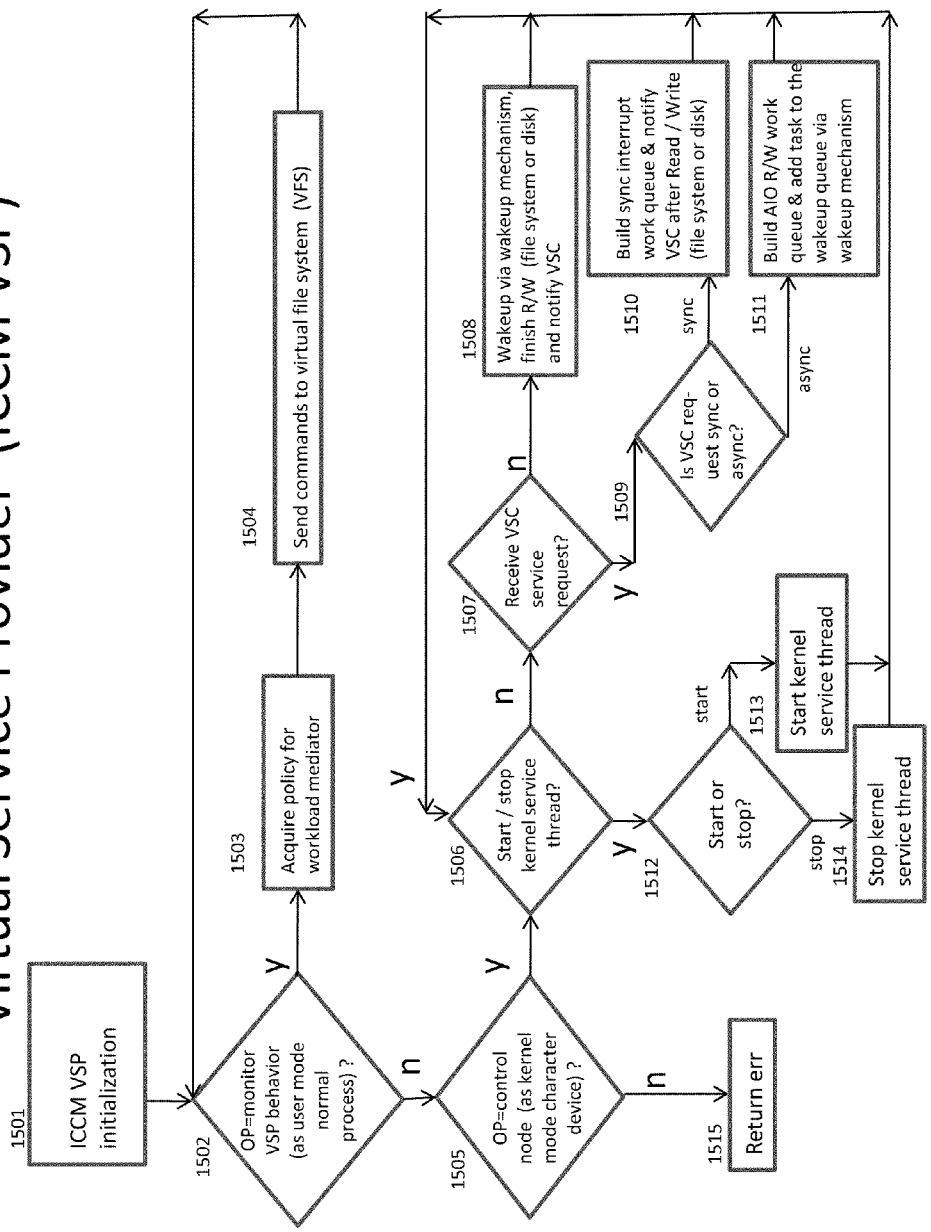
Fig. 15. Inter-counterpart Communication Mechanism Virtual Service Provider (ICCM VSP)

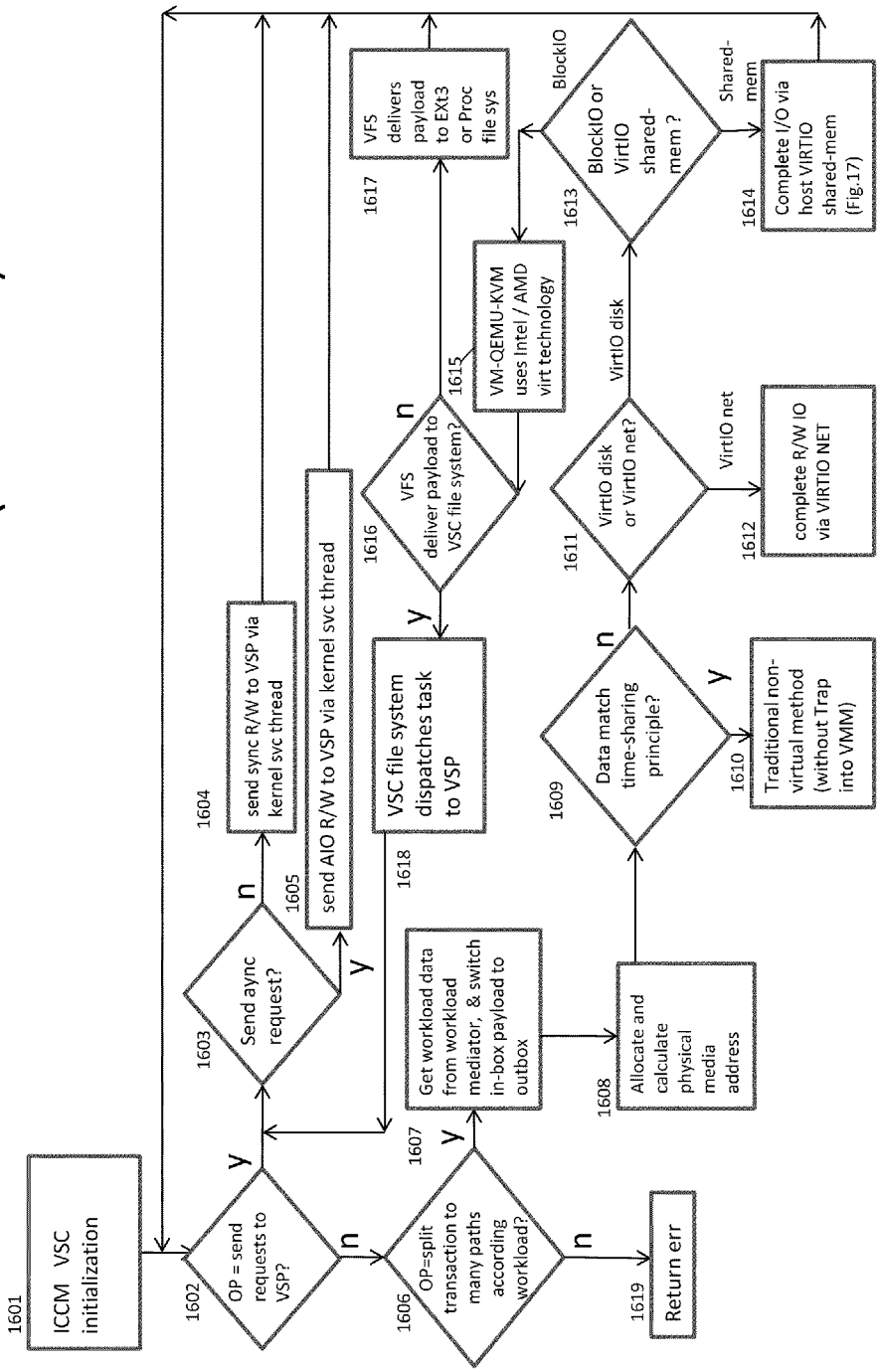
Fig.16. Inter-Counterpart Communication Mechanism Virtual Service Consumer (ICCM VSC)

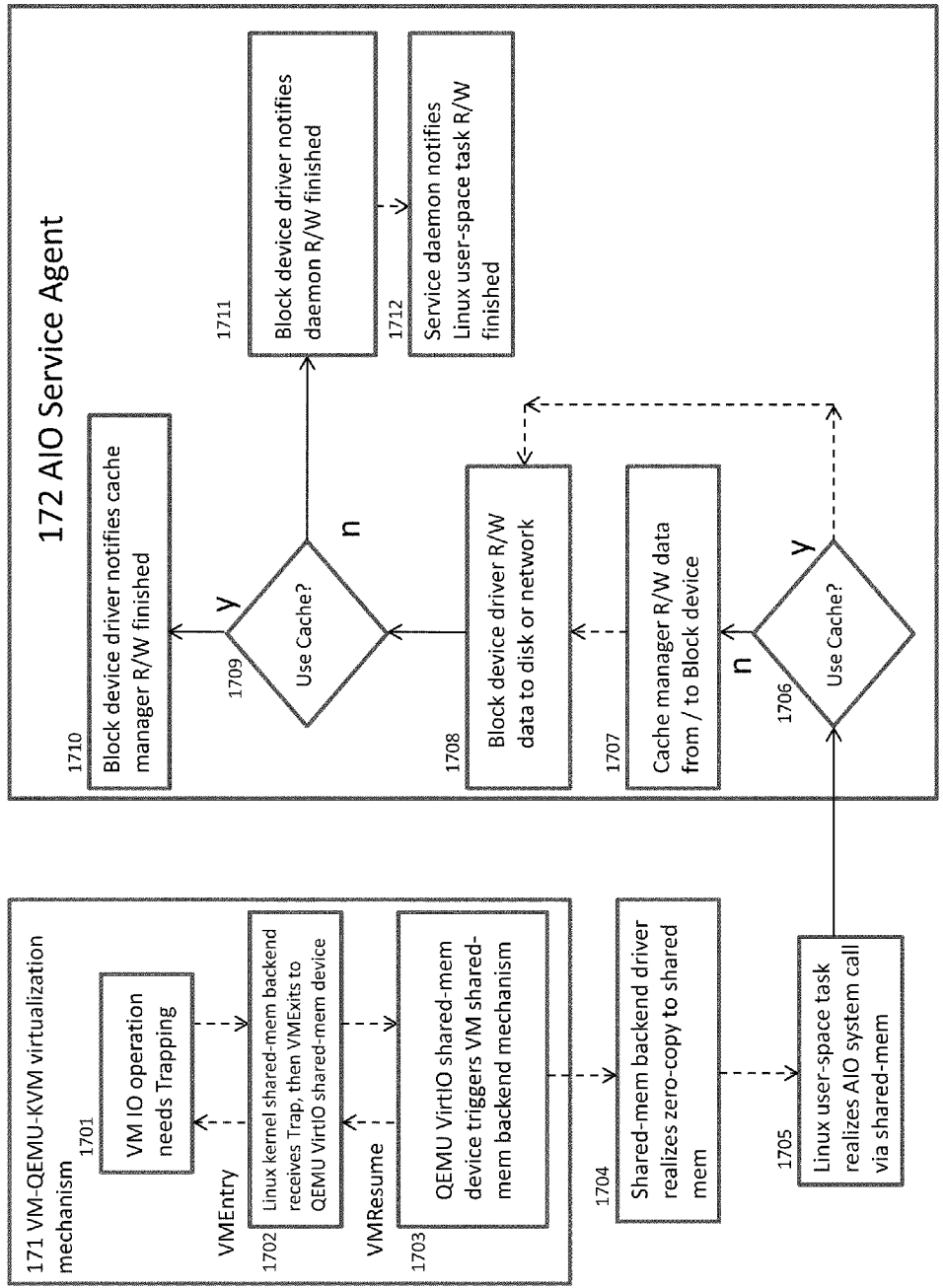
Fig.17. VIRTIO Shared Memory Mechanism

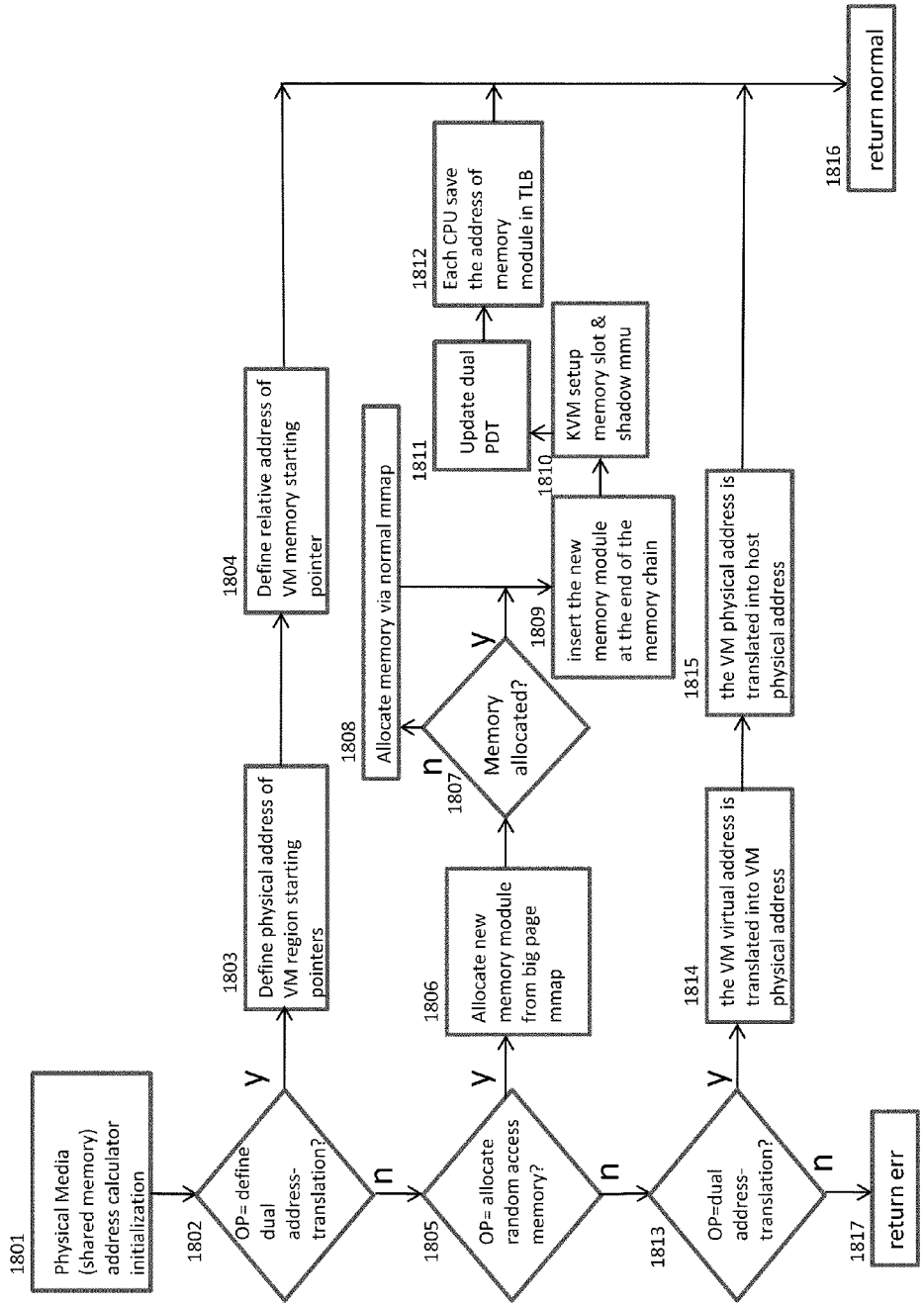
Fig.18. Physical Media (shared memory) address calculator

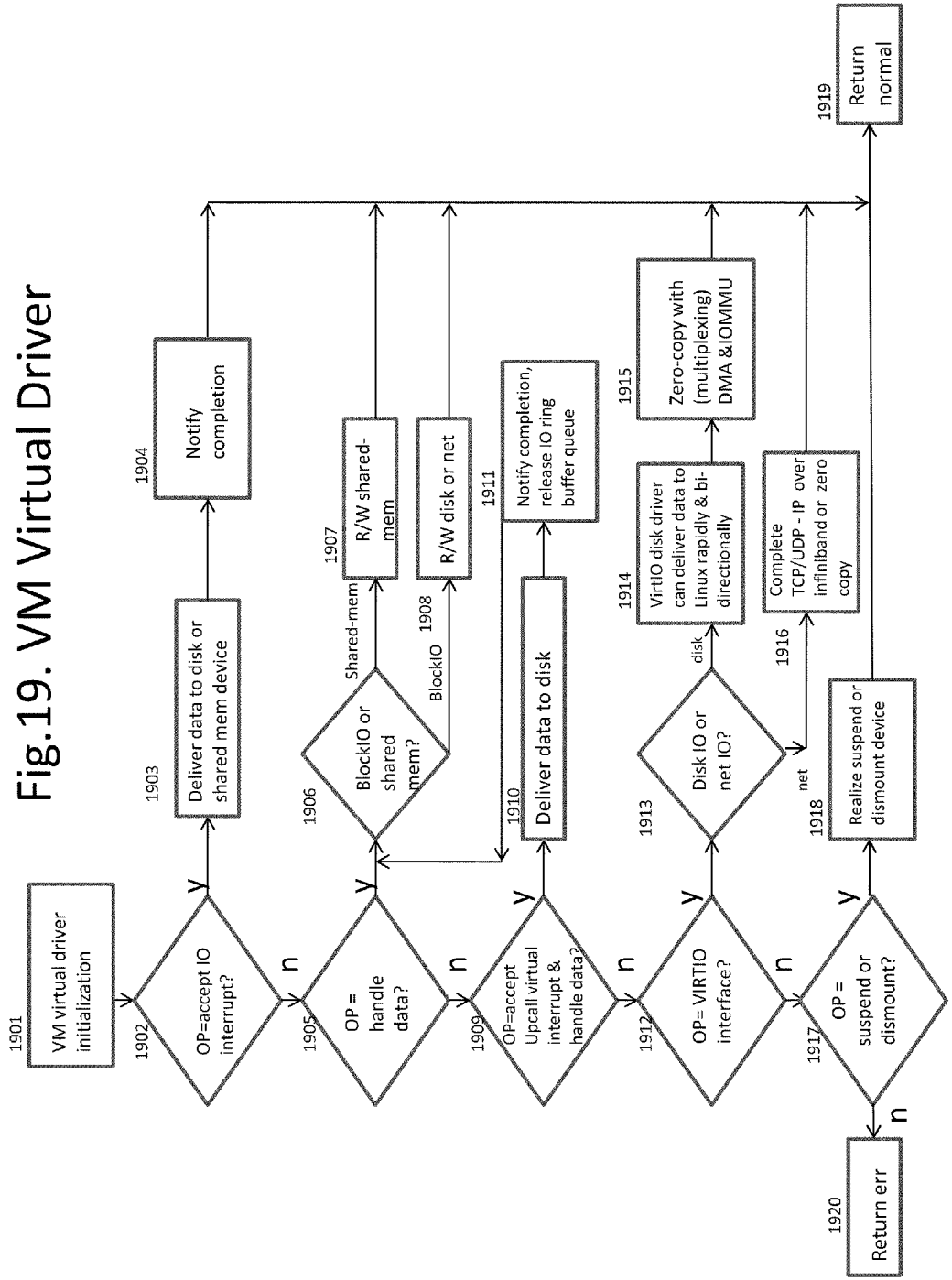
Fig.19. VM Virtual Driver

Fig.20. Zero Copy

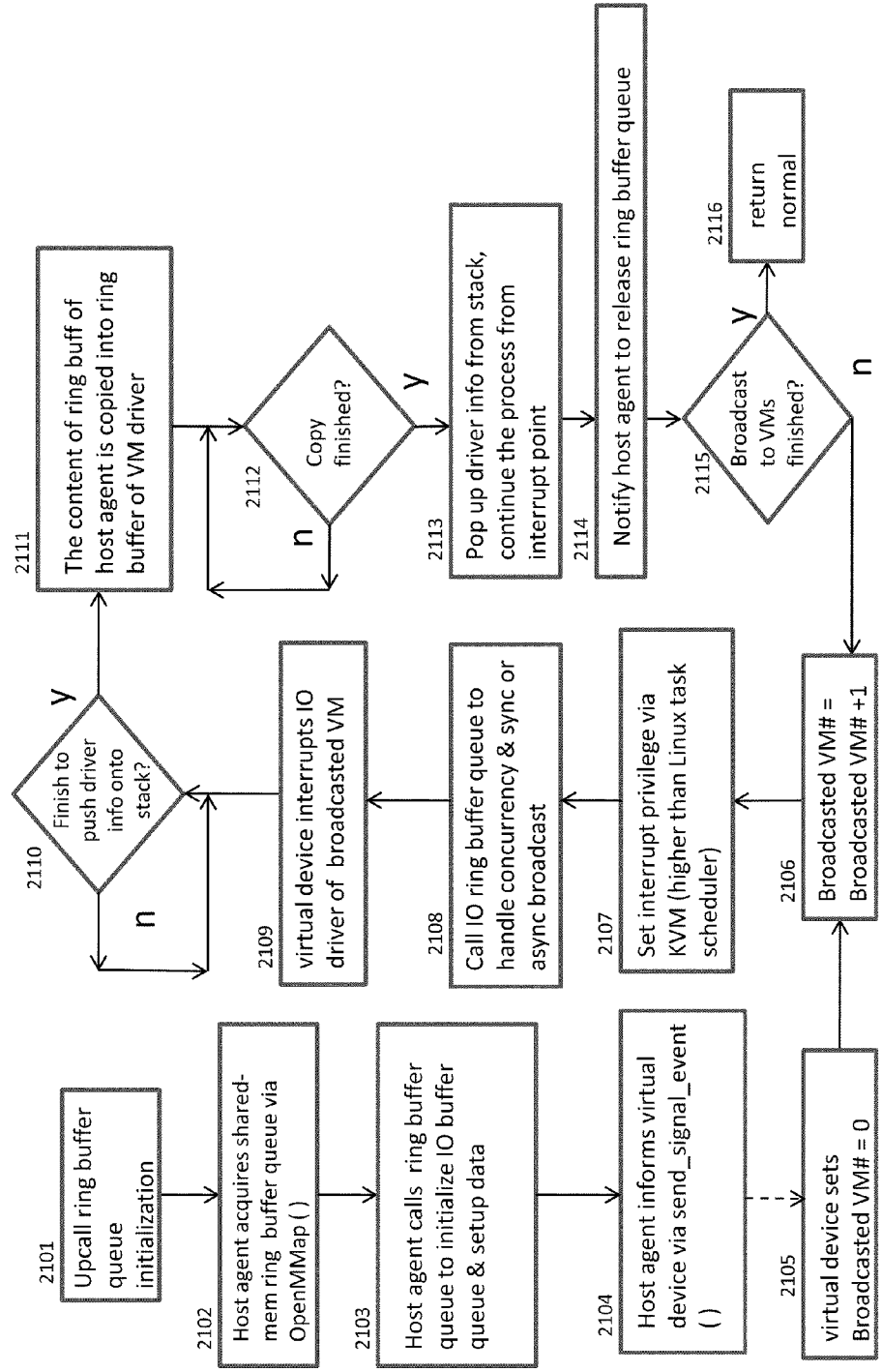
Fig.21. Upcall (UPCALL)

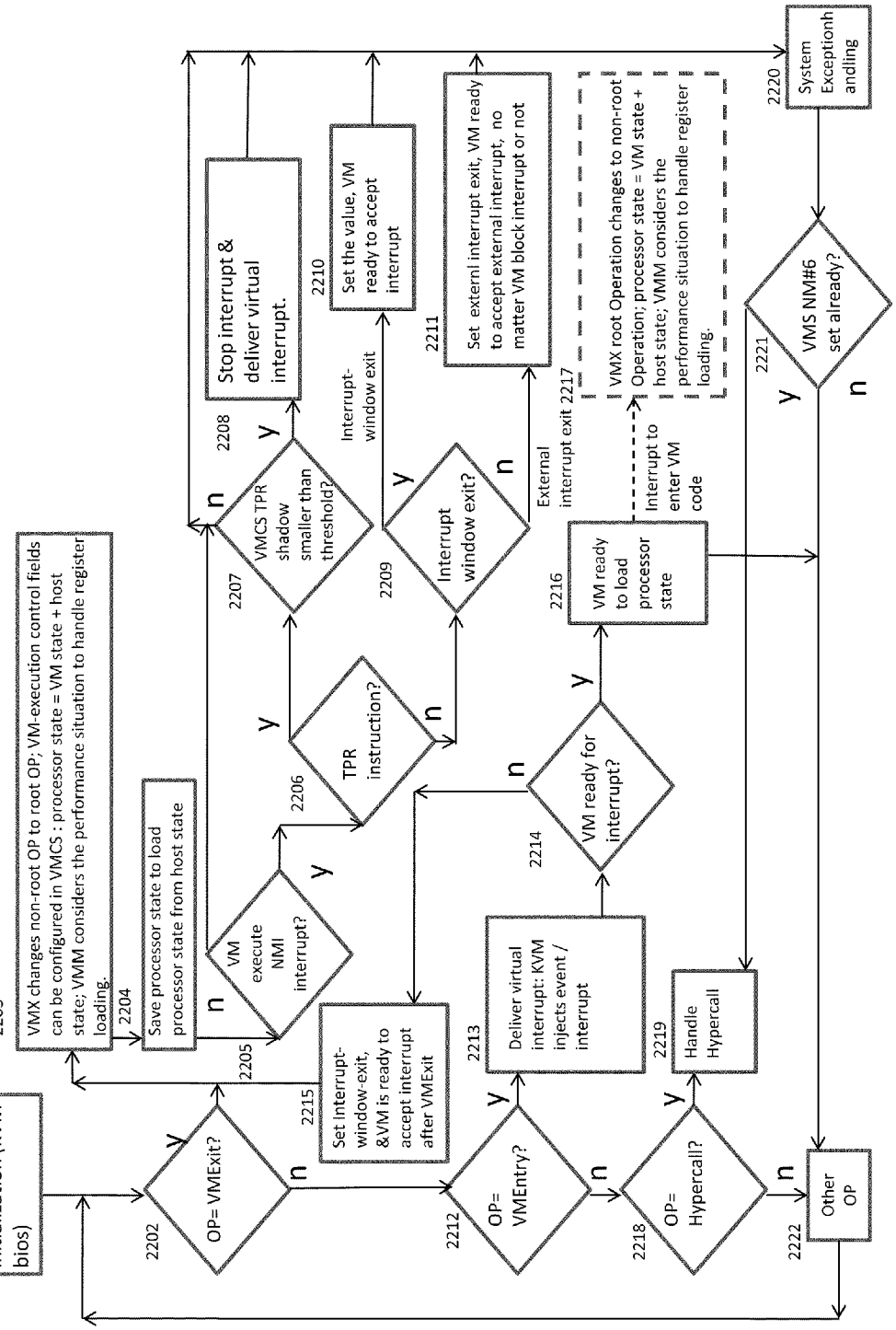
Fig.22. virtual interrupt

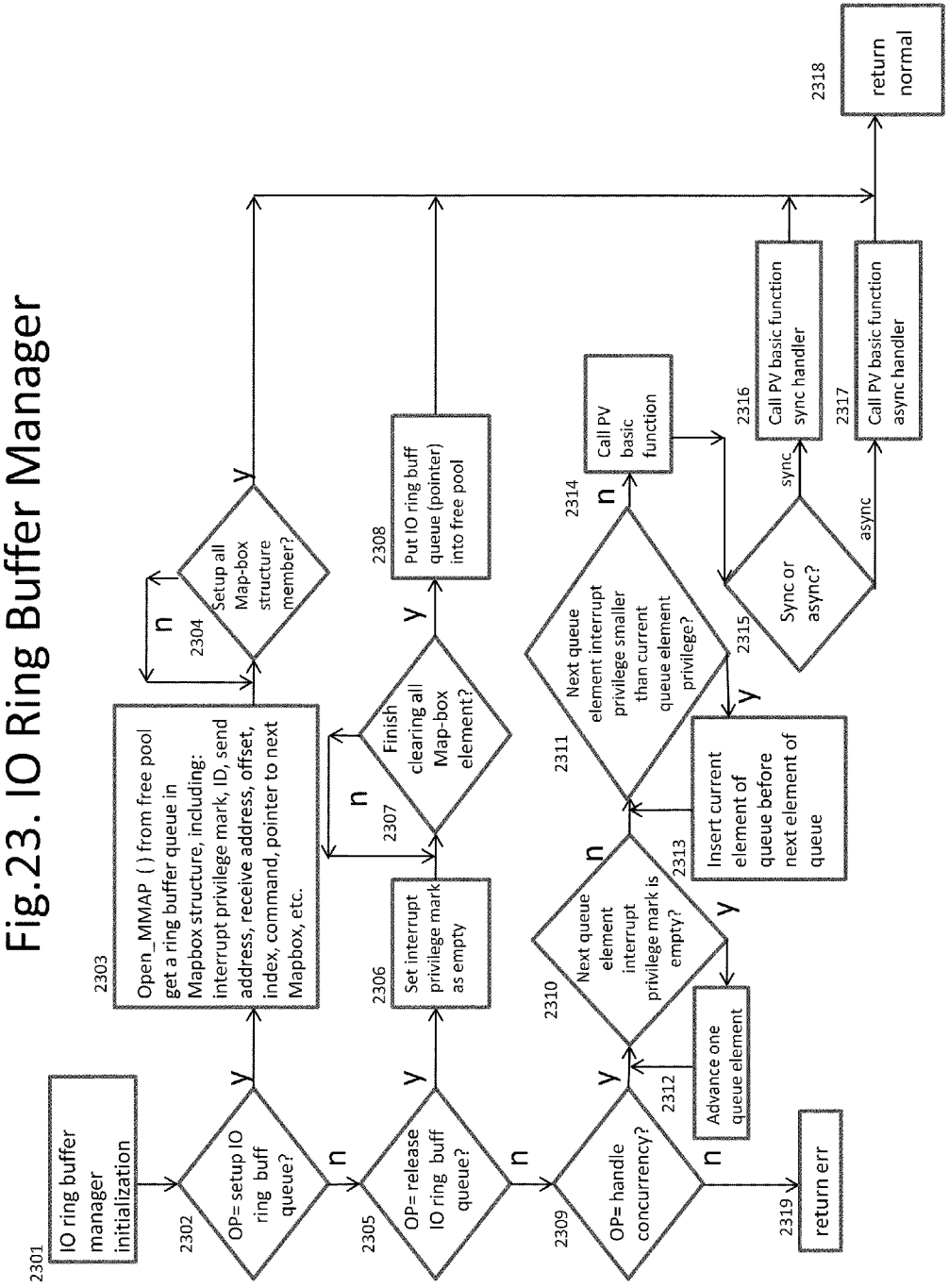
Fig.23. IO Ring Buffer Manager

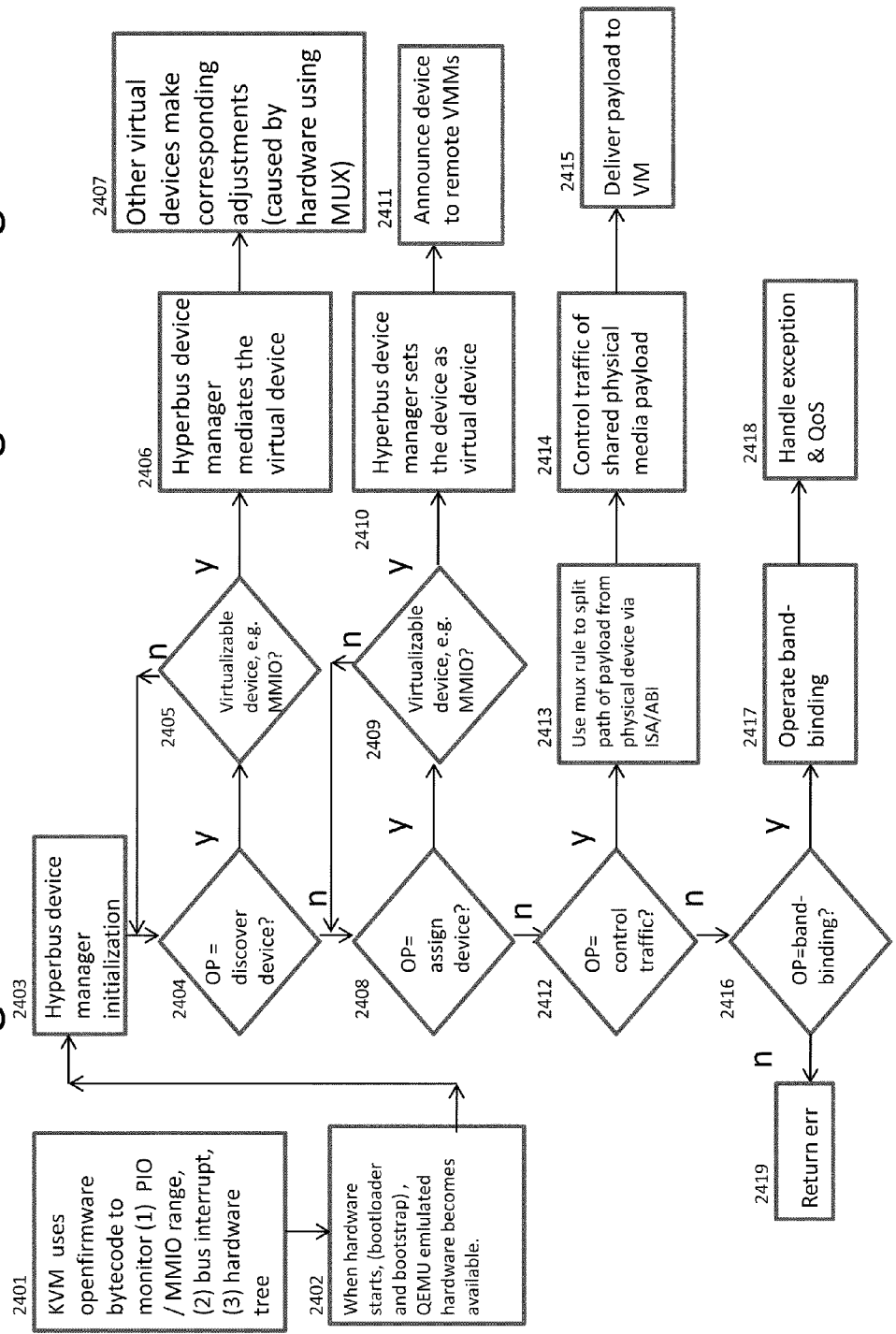
Fig.24. ICCM Device Management Agent

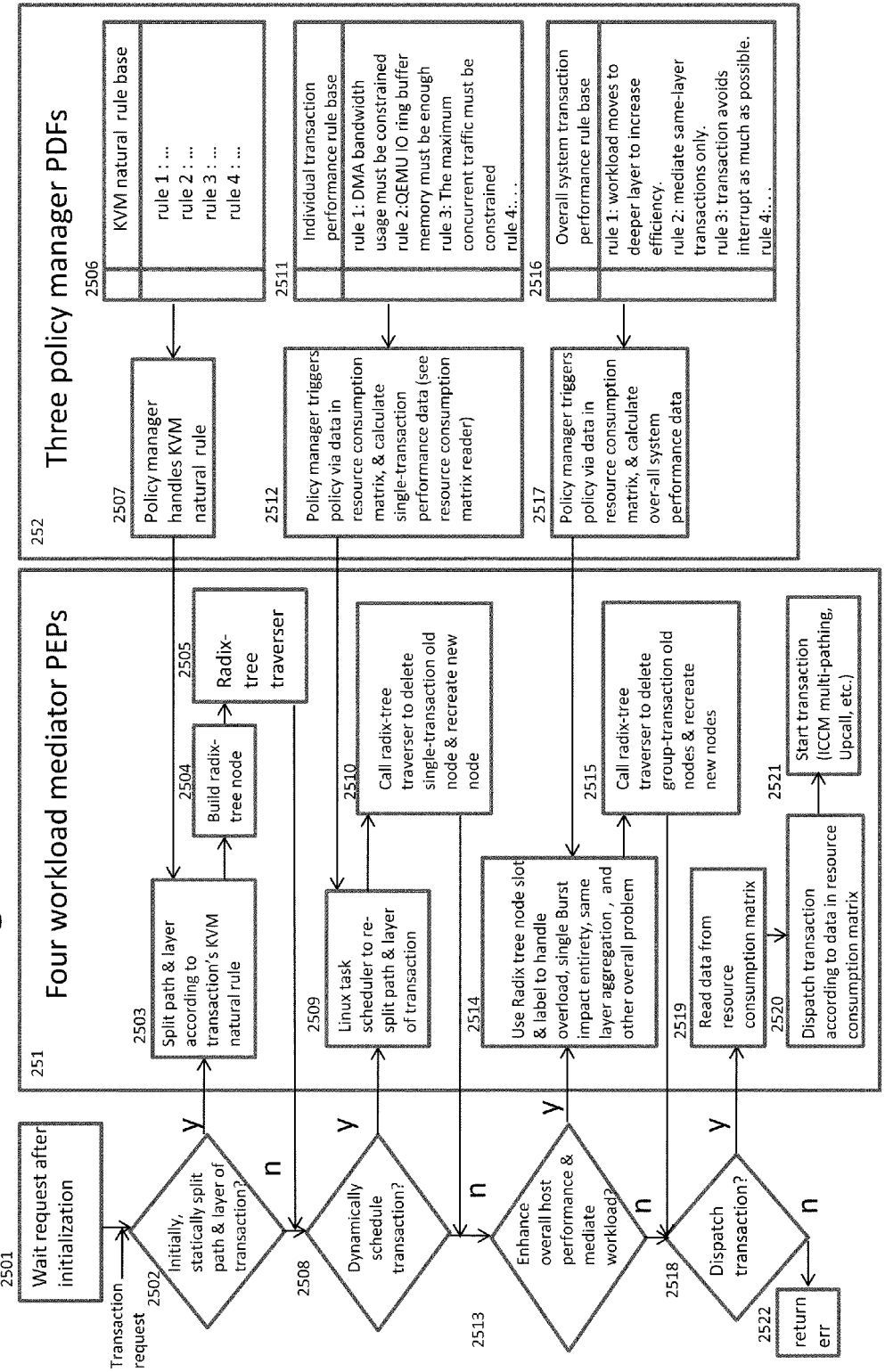
Fig. 25. Workload Mediator

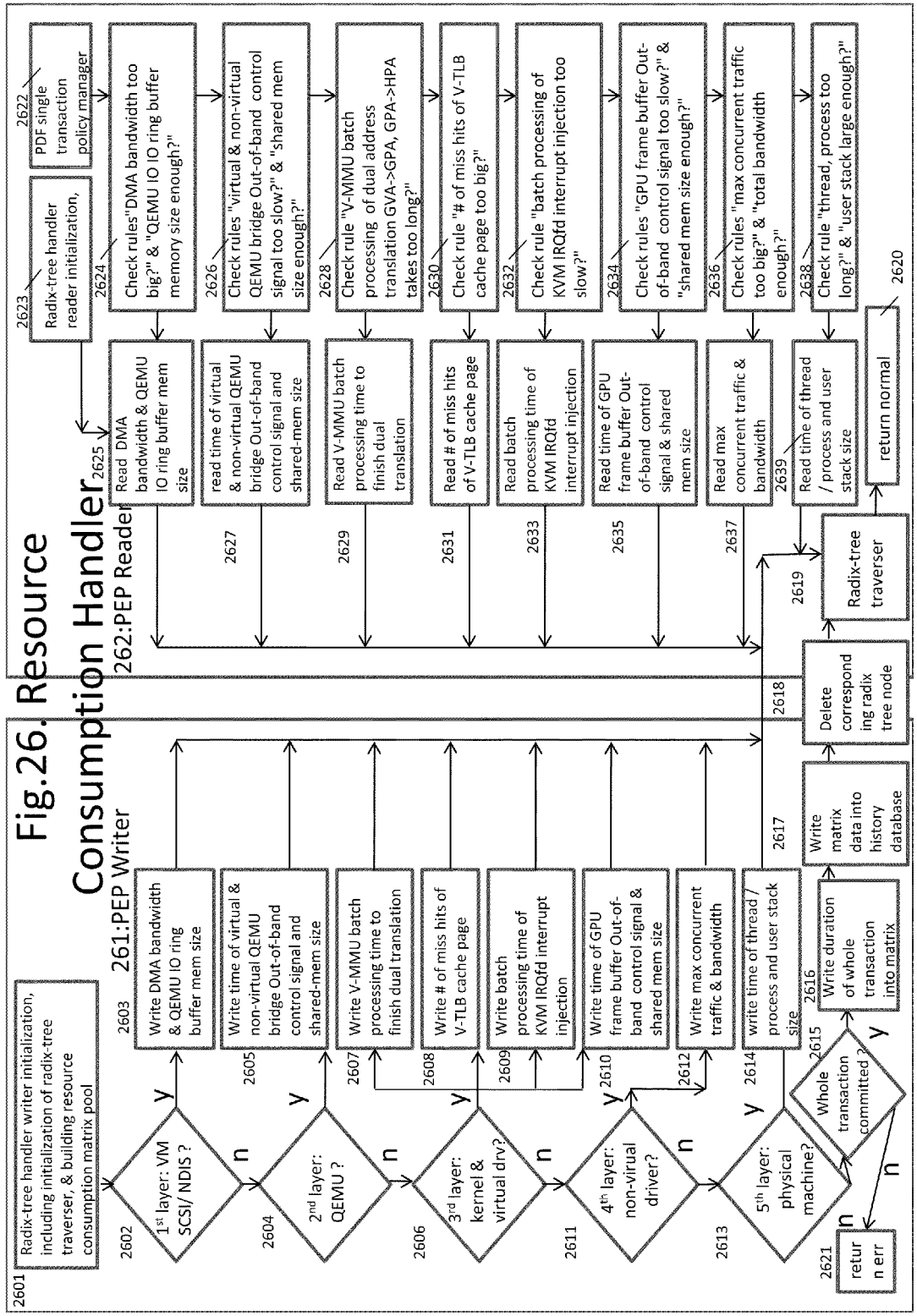
Fig. 26. Resource Consumption Handler

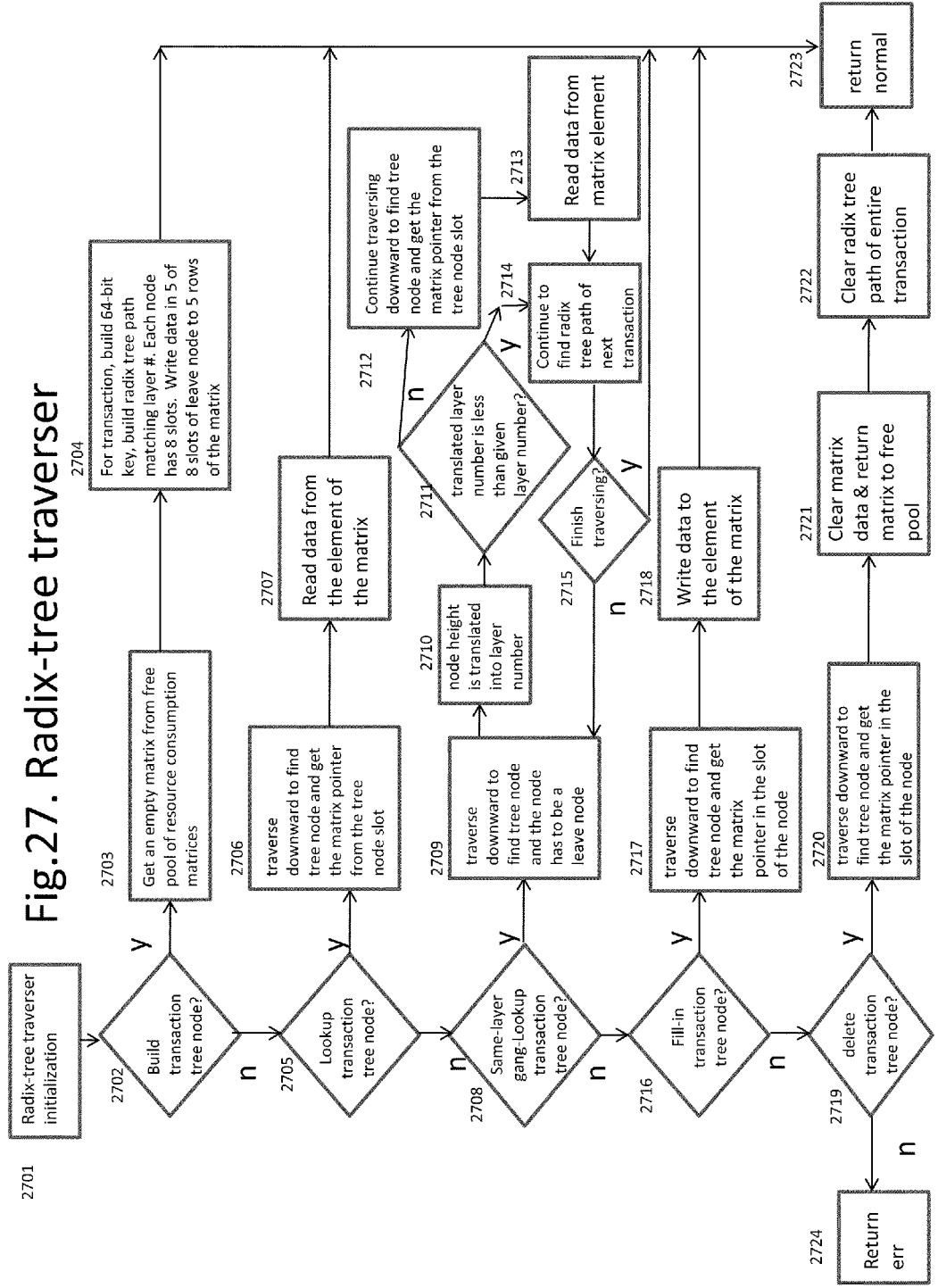
Fig.27. Radix-tree traverser

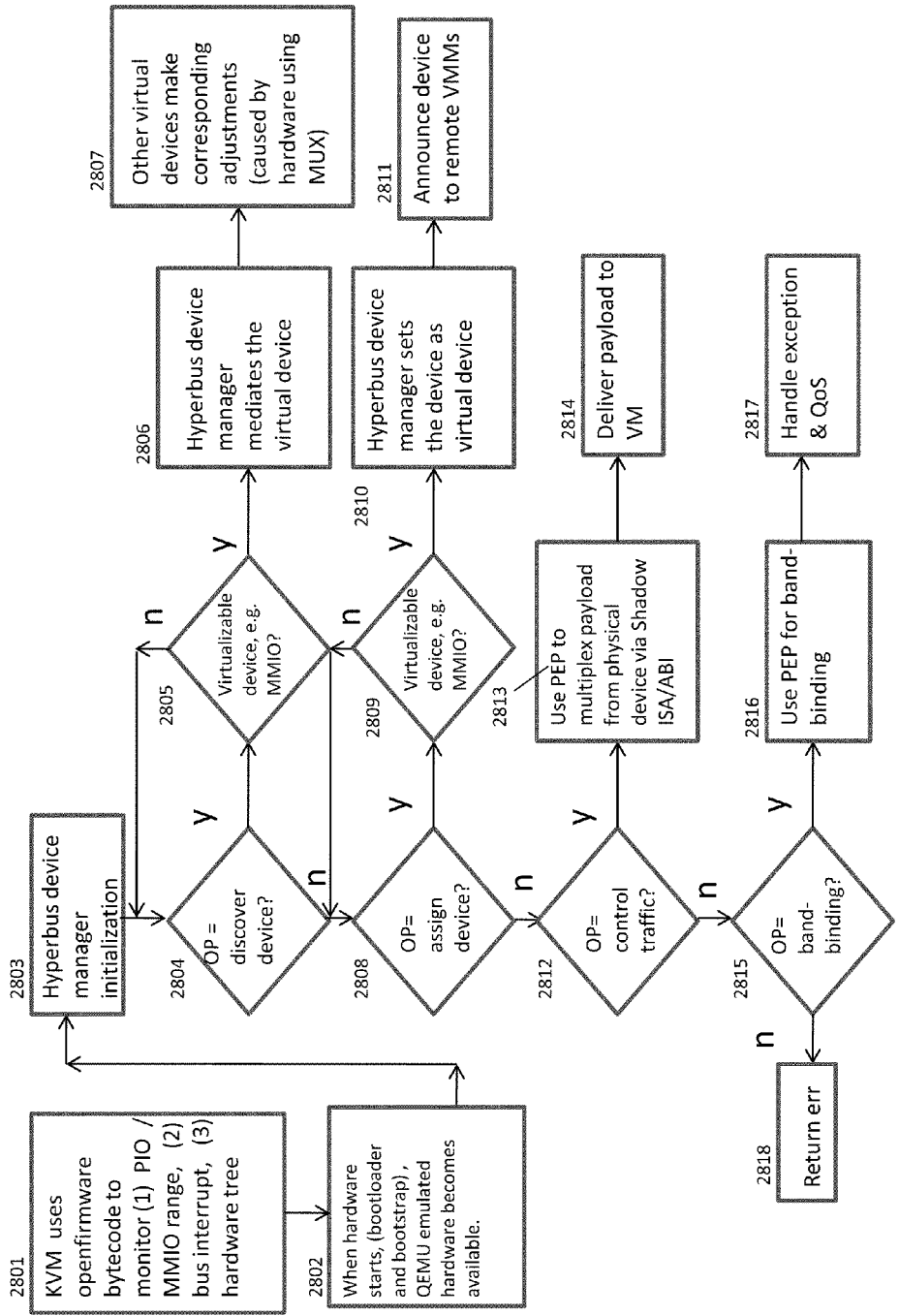
Fig.28. device manager with policy and shadow ISA/ABI

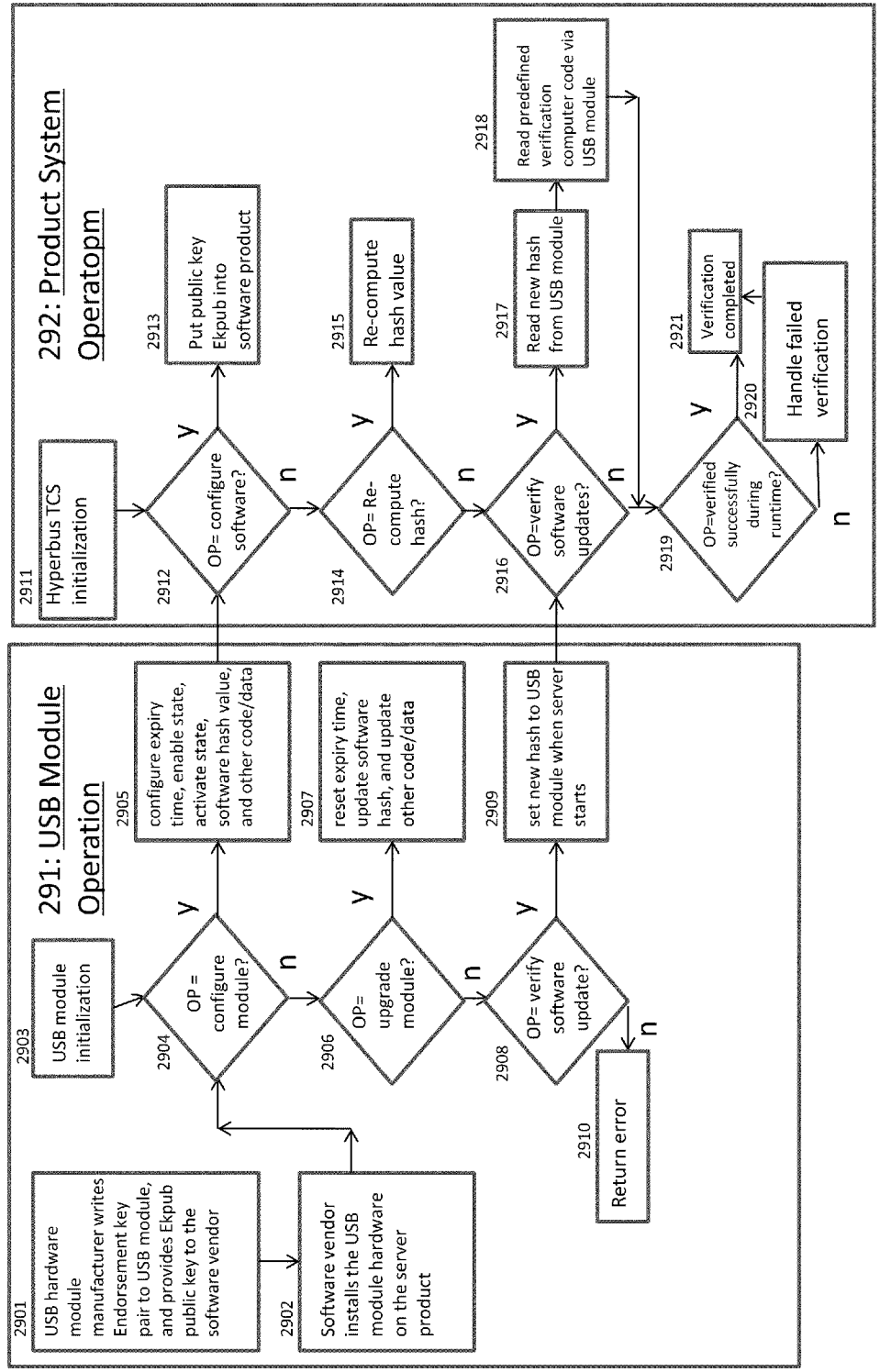
Fig.29. Trusted Computing System (TCS) Operation

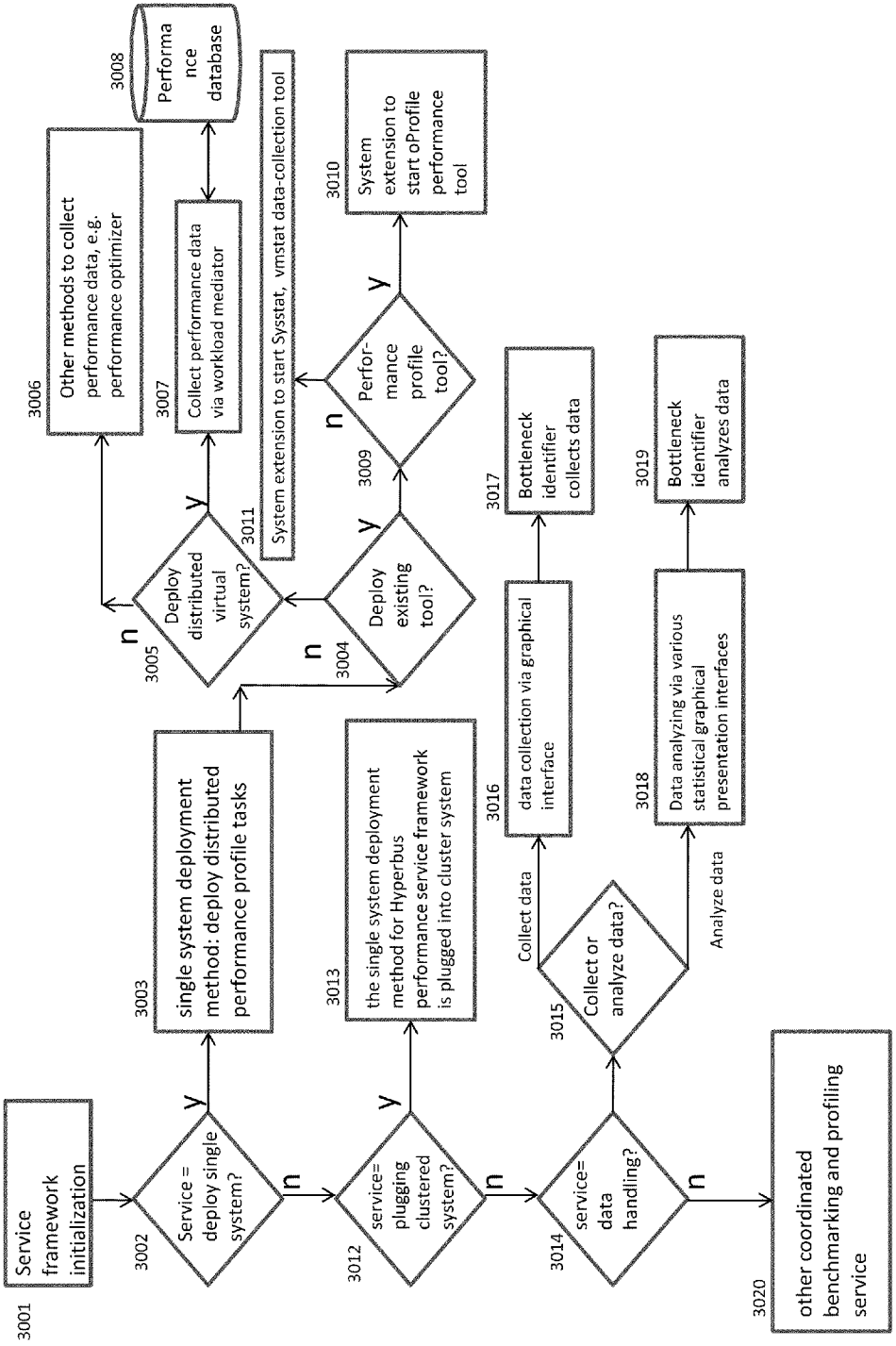

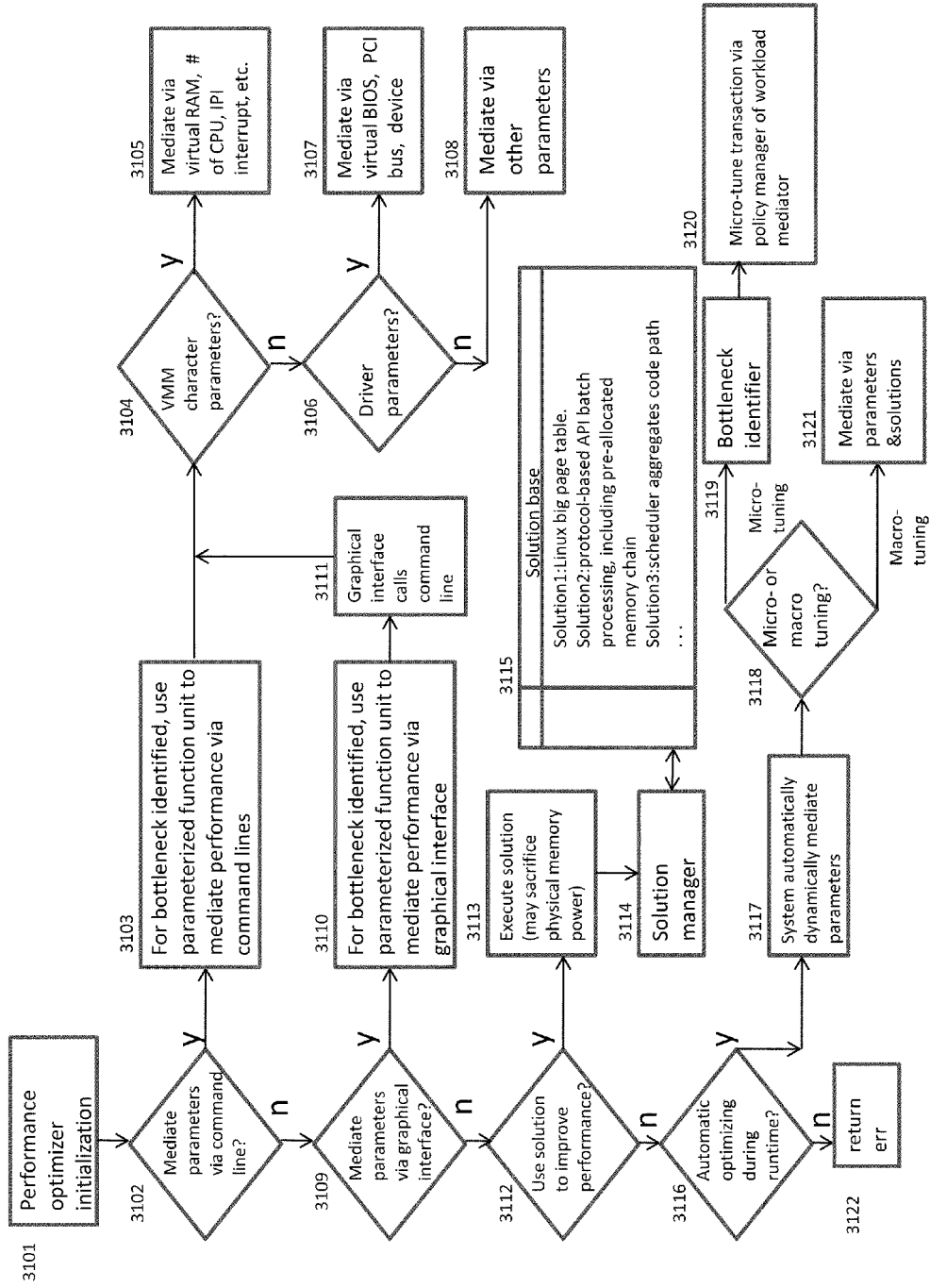
Fig.31. Performance Optimizer

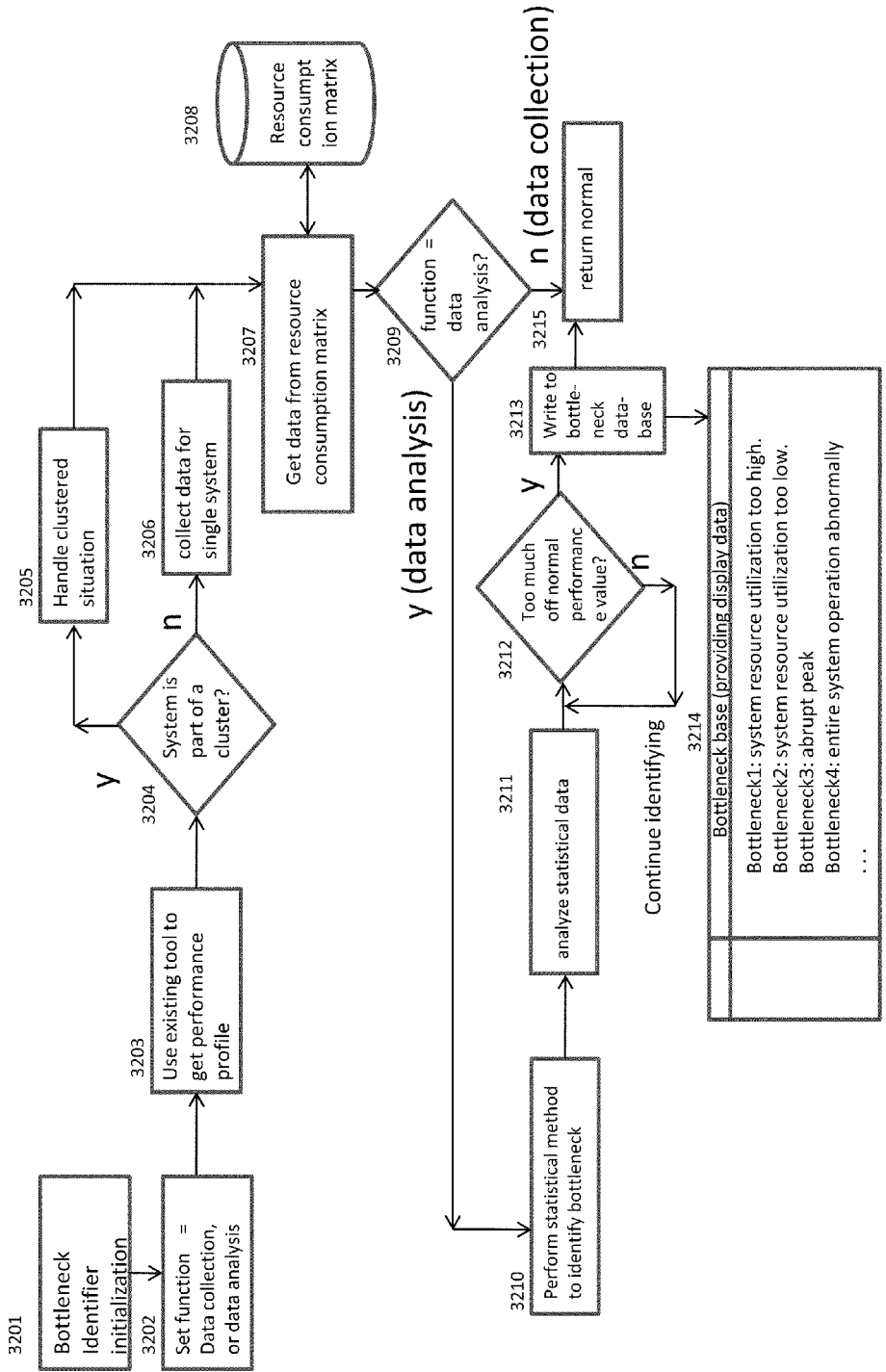
Fig. 32. Bottleneck Identifier

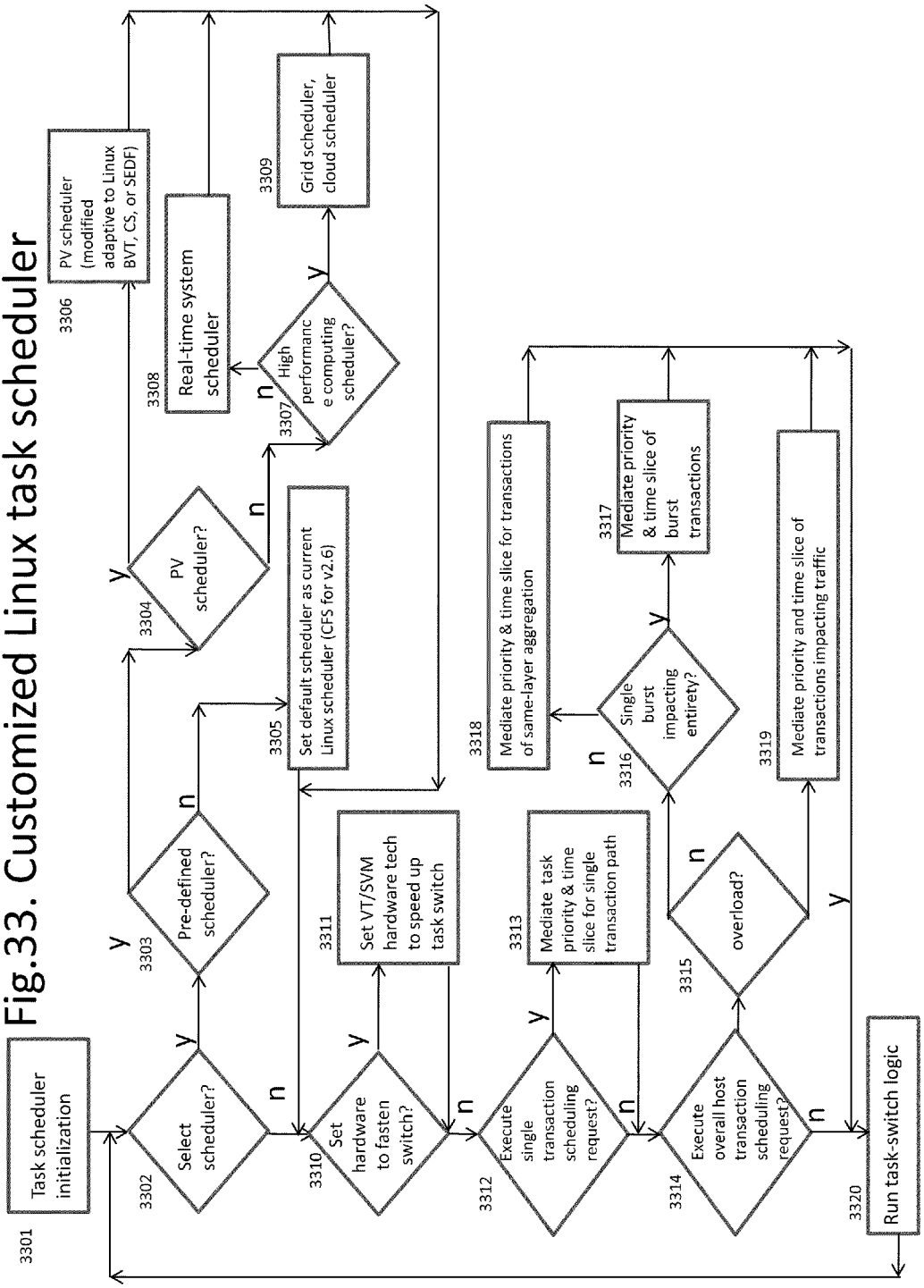
Fig.33. Customized Linux task scheduler

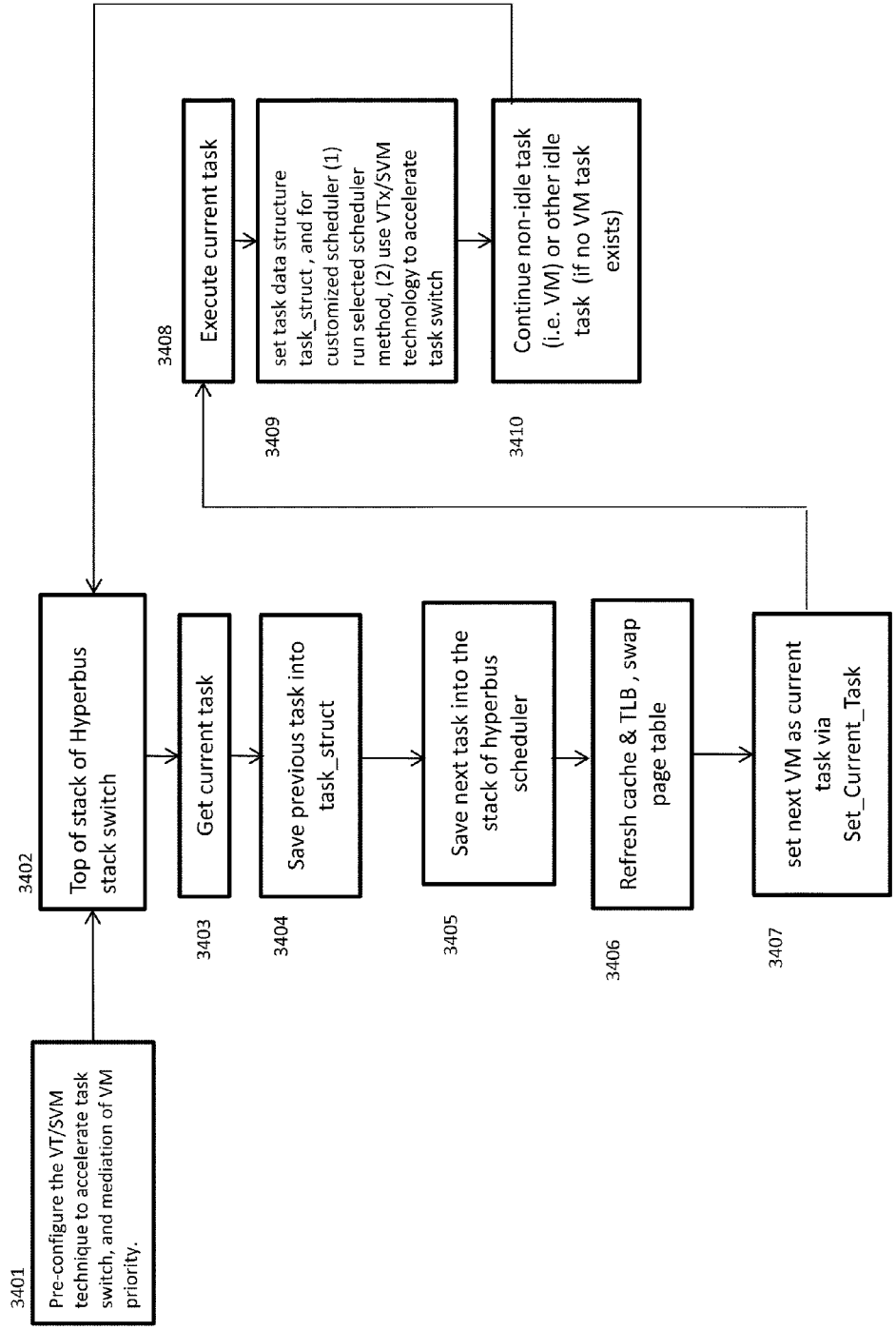
Fig. 34. Task switch logic

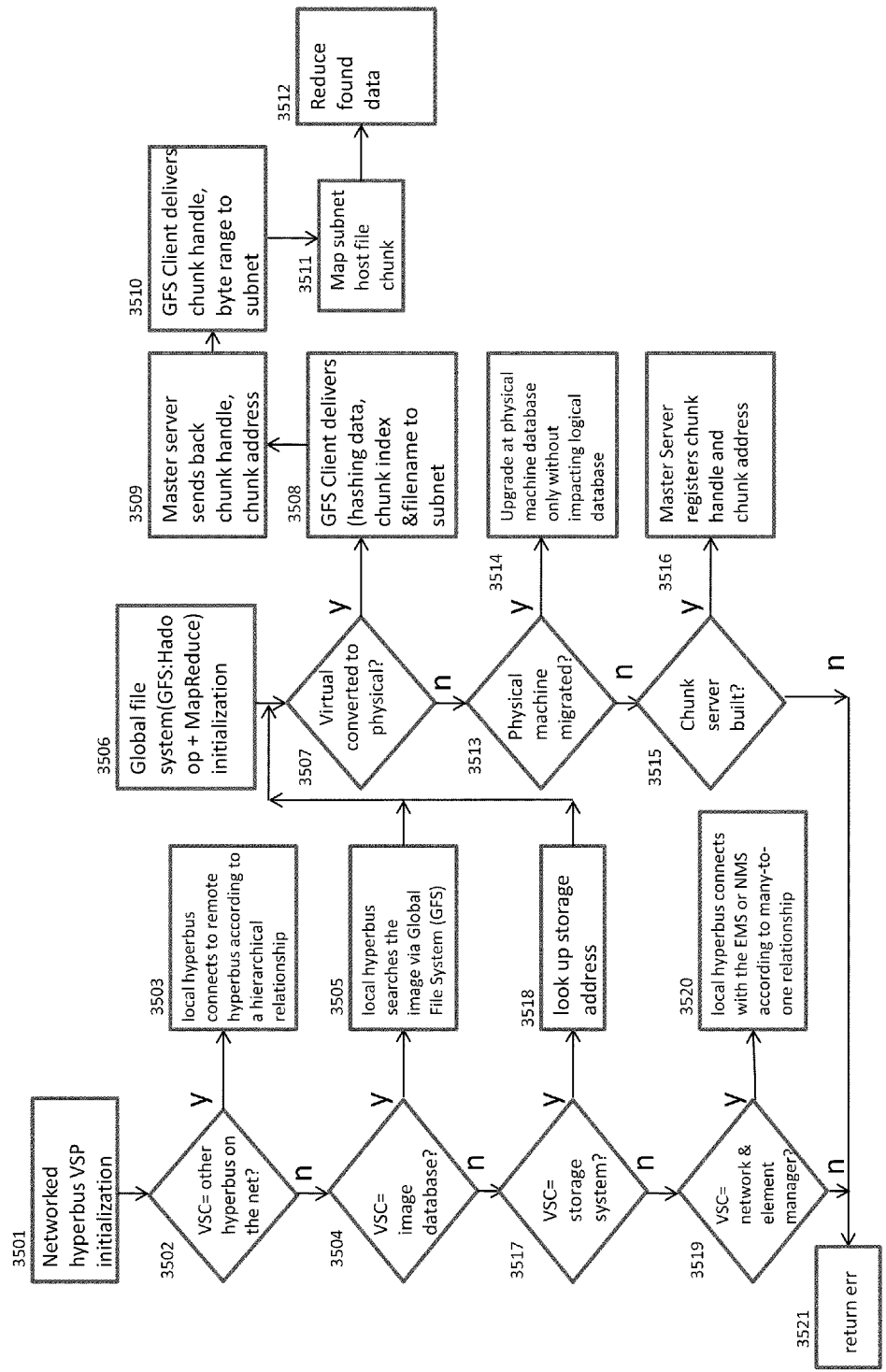
Fig.35. networked hyperbus virtual service producer (VSP)

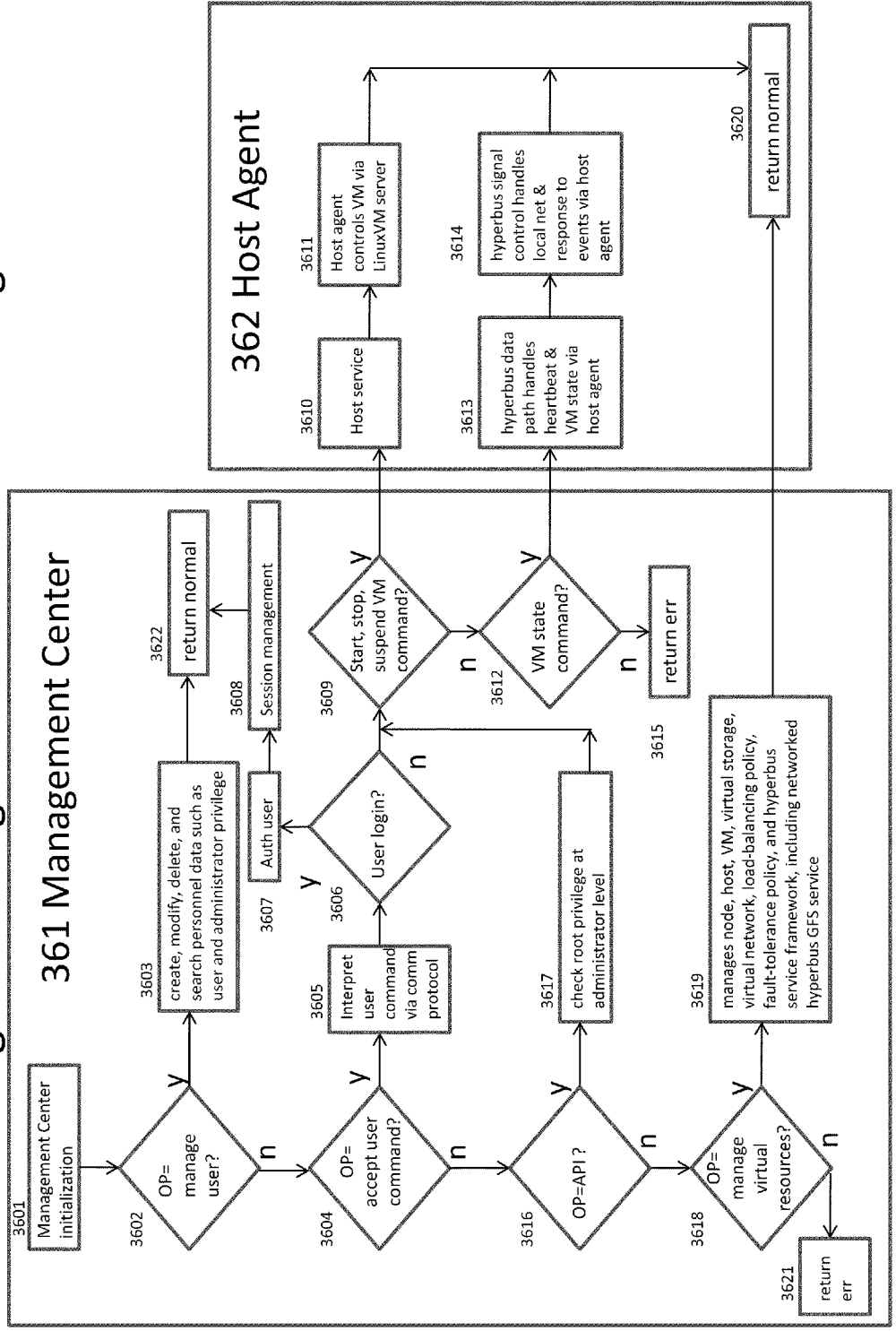
Fig.36. Management Center and Host Agent

KERNEL BUS SYSTEM WITH A HYBERBUS AND METHOD THEREFOR

FIELD OF THE INVENTION

The invention relates to generally computer hardware and software, and relates more particularly to kernel bus system and the method to build virtual machine monitor (VMM) via kernel bus system.

DESCRIPTION OF THE BACKGROUND

Operating system virtualization enables a host computer or server to run multiple operating systems on a single host computer. That is, operating system virtualization makes it possible to run multiple guest operating systems (e.g., virtual machines (VM) or guests) on top of a virtual machine monitor (VMM), while the VMM is running on a computer. Using operating system virtualization allows fully utilization the power of a single computer or servers in a data center, and reduces the amount of money spent on computer hardware. Thus, operating system virtualization has becomes very popular in recent years.

Many years ago, International Business Machines Corporation (IBM) of Armonk, N.Y. developed software configured to run multiple VMs on mainframe computers. However, IBM's software is not portable to computers using Intel® x86-based computer hardware.

In late 1990's, VMWare, Inc. (VMWare) of Palo Alto, Calif. developed a technology called binary code translation that provided x86-based operating system virtualization. VMWare's technology used translated binary code to catch the VM trap instruction, and is known as a full virtualization approach. A different approach, para-virtualization (PV) was developed by XenSource, Inc. In PV approach, privileged instruction in the VM source code are modified to build hypercalls, which produces better performance than full virtualization. Since 2006, Intel Corporation (Intel) of Santa Clara, Calif. and Advanced Micro Devices, Inc. (AMD) of Sunnyvale, Calif. have both released new computer hardware that supports virtualization. These computer hardware allows improved performance of full virtualization and para-virtualization systems. Furthermore, the Linux operating system includes a VMM, called KVM (kernel-based virtual machine). Linux's KVM relies the Intel/AMD computer hardware for its support.

In 2006, Qumranet, Inc. (now part of RedHat Inc. of Raleigh, N.C.) took advantage of a processor emulator called QEMU and VIRTIO technology to build most of the KVM of Linux 2.6. This KVM serves as the base of Linux virtualization. Specifically, QEMU is a processor emulator that relies on dynamic binary translation. VIRTIO, an I/O (input/output) standard for virtualization, runs inside of QEMU as a frontend, while VIRTIO backend runs inside of a kernel of the Linux operating system. This enables guests to get high performance network and disk operations, and gives most of the performance benefits of para-virtualization. KVM, on the other hand, takes advantage of the privilege instructions of Intel VTx and AMD SVM (VTx/SVM) technology to build a virtual environment. This privilege instruction can allow the VM kernel to have a higher privilege relative to its application under non-root operation, while it is able to maintain all the high-performance components of a Linux kernel (e.g., task scheduling and memory management).

The KVM process to generate a VM can involve a multi-activity process. First, when a modified QEMU is started as a normal Linux process, QEMU uses system calls to a virtual central processing unit (VCPU) provided by the KVM. The VCPU generates a VM, and also creates many additional virtual CPUs (e.g., each CPU is a QEMU thread), similar to the process used by an operating system of a real computer that is running a multi-core mainboard. At start-up, the kernel-mode KVM uses VTx/SVM instructions to convert the physical mainboard into a guest-mode to execute VCPU threads. Afterwards, KVM uses VTx/SVM instructions to interrupt x86 privileged instructions such as VM system error, interrupt, memory mapping I/O (or MMIO), etc. When an interrupt event occurs, the CPU exits from guest mode to enter host kernel mode, and executes KVM code. KVM handles a simple interrupt quickly. However, for I/O interrupts, the KVM exits from VCPU system call to enter QEMU, which handles the I/O interrupts. In some implementations, QEMU can run as a process under host user mode. For example, QEMU can translate VM virtual memory address, uses Linux system call to access hardware disk, completes VM virtual memory read/write, and then updates the state of its emulated registers. Thus, QEMU looks very much like a hardware disk and the emulated way by which QEMU handles I/O decreases system performance.

The KVM method described above can be considered a "limited para-virtualization" method, which is not of enterprise grade because its performance and functionalities cannot compare to any of the commercial operating system virtualization products in the market, such as VMWare®, Xen®, and Hyper-V.

Accordingly, a need or potential for benefit exists for an apparatus or system that provides an enterprise-grade VMM for the Linux operating system platform.

BRIEF DESCRIPTION OF THE DRAWINGS

To facilitate further description of the embodiments, the following drawings are provided in which:

FIG. 1 is the hyperbus diagram based on one embodiment of this invention.

FIG. 2 is the flowchart of the virtual service producer of hyperbus based on one embodiment.

FIG. 3 is the combined architecture diagram and flowchart for the basic function of hyperbus para-virtualization based on one embodiment.

FIG. 4 is the architecture diagram of the asymmetric, multipath, and fast control function of the hyperbus based on one embodiment of this invention.

FIG. 5 is the architecture diagram of the self-defined kernel entity function to access from KVM of the hyperbus based on one embodiment.

FIG. 6 is the architecture diagram of the fast switch function between guest and user tasks of the hyperbus based on one embodiment.

FIG. 7 is the architecture diagram of across-VM communication function of the hyperbus based on one embodiment.

FIG. 8 is the architecture diagram of virtual device management function of the hyperbus based on one embodiment.

FIG. 9 is the architecture diagram of PDF and PEP function of the hyperbus based on one embodiment.

FIG. 10 is the architecture diagram of manageable shadow ISA/ABI function of the hyperbus based on one embodiment.

FIG. 11 is the architecture diagram of security management function of the hyperbus based on one embodiment.

FIG. 12 is the block diagram of performance service function of the hyperbus based on one embodiment.

FIG. 13 is the block diagram of networked hyperbus function based on one embodiment.

FIG. 14 is the block diagram to describe hyperbus abstract function and its corresponding embodiment.

FIG. 15 is the flowchart of VSP of the inter-counterpart communication mechanism (ICCM VSP) of the hyperbus based on one embodiment. It is also a partial ICCM realization of block 1433 of FIG. 14, wherein ICCM realizes functions 0, 1, and 2 of the local hyperbus server in block 0133 of FIG. 1.

FIG. 16 is the flowchart of VSC of the inter counterpart communication mechanism (ICCM VSC) of the hyperbus based on one embodiment. It is also a partial ICCM realization of block 1433 of FIG. 14.

FIG. 17 is the combined block diagram and the flowchart of "VIRTIO shared memory mechanism" of activity 1614 of FIG. 16.

FIG. 18 is the flowchart of "address calculator of physical media (shared memory)" of activity 1608 of FIG. 16.

FIG. 19 is the flowchart of "Virtual machine (VM) I/O driver" of activity 1710, 1711 of FIG. 17. It is also the VM I/O driver of activity 2109 of FIG. 21.

FIG. 20 is the flowchart of "Zero Copy" of activity 1704 of FIG. 17.

FIG. 21 is the flowchart of "Upcall" of the hyperbus based on one embodiment. It is also a realization of the Upcall of block 1433 of FIG. 14, wherein Upcall realizes functions 3 and 4 of the local hyperbus server in block 0133 of FIG. 1.

FIG. 22 is the flowchart of "Virtual Interrupt" of activity 2109 of FIG. 21 Upcall.

FIG. 23 is the flowchart of "IO Ring Buffer Manager" of activity 2101, 2103, 2108, 2111, and 2114 of FIG. 21 Upcall.

FIG. 24 is the flowchart of "ICCM device management agent" for device manager of block 1411 and device service agent of block 1443 of FIG. 14. It also realizes one embodiment of hyperbus function 5 of FIG. 8, and realizes block 0111 device manager and block 0143 device service agent of FIG. 1.

FIG. 25 is the combined block diagram and the flowchart of "Workload Mediator based on Radix Tree," as an example for workload mediator of block 1431 FIG. 14. It also realizes one embodiment of hyperbus function 6 of FIG. 9, and realizes block 0131 device manager and block 0143 device service agent of FIG. 1.

FIG. 26 is the combined block diagram and the flowchart of "Resource consumption handler," as in the activity 2511 and 2512 FIG. 25.

FIG. 27 is the flowchart of "Radix Tree Traverser," as in the activity 2619 of FIG. 26.

FIG. 28 is the flowchart of "device manager using policy and shadow ISA/ABI," as an example for block 1411 device manager and block 1443 ICCM device service agent of FIG. 14. The flowchart realizes hyperbus function 7 of FIG. 10 and block 0111 device manager and block 0143 device service agent of FIG. 1.

FIG. 29 is the combined block diagram and flowchart of example of "hyperbus security device operation" of FIG. 11.

FIG. 30 is the flowchart "hyperbus performance service framework" realizing block 1431 of FIG. 14. It also realizes the abstract function 9 of FIG. 12 and block 0131 of FIG. 1.

FIG. 31 is the flowchart "performance optimizer" to realize activity 3005 of FIG. 30.

FIG. 32 is the flowchart "bottleneck Identifier" to realize activity 3103, 3110, and 3119 of FIG. 31.

FIG. 33 is the flowchart "Customized Linux Task Scheduler" to realize activity 2509 of FIG. 25.

FIG. 34 is the flowchart "Task Scheduler Operational Logic" to realize activity 3319 of FIG. 33.

FIG. 35 is the flowchart "Networked Hyperbus Server" to realize block 1432 of FIG. 14. It also realizes abstract function 10 of FIG. 13 and block 0132 of FIG. 1.

FIG. 36 is the combined block diagram and flowchart "Management Center and Host Agent" to realize block 1413 and 1414 of FIG. 14.

For simplicity and clarity of illustration, the drawing figures illustrate the general manner of construction, and descriptions and details of well-known features and techniques may be omitted to avoid unnecessarily obscuring the invention. Additionally, elements in the drawing figures are not necessarily drawn to scale. For example, the dimensions of some of the elements in the figures may be exaggerated relative to other elements to help improve understanding of embodiments of the present invention. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "couple," "coupled," "couples," "coupling," and the like should be broadly understood and refer to connecting two or more elements or signals, electrically, mechanically and/or otherwise. Two or more electrical elements may be electrically coupled but not be mechanically or otherwise coupled; two or more mechanical elements may be mechanically coupled, but not be electrically or otherwise coupled; two or more electrical elements may be mechanically coupled, but not be electrically or otherwise coupled. Coupling may be for any length of time, e.g., permanent or semi-permanent or only for an instant.

"Electrical coupling" and the like should be broadly understood and include coupling involving any electrical signal, whether a power signal, a data signal, and/or other types or combinations of electrical signals. "Mechanical coupling" and the like should be broadly understood and include mechanical coupling of all types.

DETAILED DESCRIPTION OF EXAMPLES OF EMBODIMENTS

Some embodiments concern a kernel bus system for building at least one virtual machine monitor. The kernel bus system is based on a kernel-based virtual machine. The kernel bus system is configured to run on a host computer. The host computer comprising one or more processors, one or more hardware devices, and memory. The kernel bus system can include: (a) a hyperbus; (b) one or more user space components; (c) one or more guest space components configured to interact with the one or more user space components via the hyperbus; (d) one or more VMM components having one or more frontend devices configure to perform I/O operations with the one or more hardware devices of the host computer using a zero-copy method or a non-pass-thru method; (e) one or more para-virtualization components having (1) a virtual interrupt configured to use one or more processor instructions to swap the one or more processors of the host computer between a kernel space and a guest space; and (2) a virtual I/O driver configured to enable synchronous I/O signaling, asynchronous I/O signaling and payload delivery, and pass-through delivery independent an QEMU emulation; and (f) one or more KVM components. The hyperbus, the one or more user space components, the one or more guest space components, the one or more VMM components, the one or more para-virtualization components, and the one or more KVM components are configured to run on the one or more processors of the host computer.

Other embodiments concern a method of building at least one virtual machine monitor via a kernel bus system. The method can include providing a hyperbus configured to run on at least one host computer; providing one or more user space components configured to run on at least one host computer; providing one or more guest space components configured to run on the at least one host computer and further configured to interact with the one or more user space components via the hyperbus; providing one or more VMM components configured to run on the at least one host computer and have one or more frontend devices configure to perform input/output operations with the one or more hardware devices of the host computer using a zero-copy method or a non-pass-thru method; providing one or more para-virtualization components configured to run on the at least one host computer and having a virtual interrupt configured to use one or more processor instructions to swap the one or more processors of the host computer between a kernel space and a guest space; and a virtual input/output driver configured to enable synchronous input/output signaling, asynchronous input/output signaling and payload delivery, and pass-through delivery substantially independent of a QEMU process emulation.

Still other embodiments concern a computer system configured to run on a host computer. The host computer comprising one or more processors, one or more hardware devices, and memory. The computer system including: (a) a hyperbus having: (1) one or more hyperbus service modules configured to run on the host computer; and (2) one or more hyperbus backend components configured to run on the host computer; and (b) one or more guest space components configured to run on the host computer and having: (1) one or more virtual machines comprising one or more virtual machine applications, the one or more virtual machine applications configured to perform one or more input/output operations; (2) one or more virtual machine operating system kernels comprising one or more drivers, the one or more drivers are configured to interact with the one or more hyperbus service modules to facilitate the one or more virtual machines performance of the one or more input/output operations; and (3) one or more VIRTIO devices. The one or more virtual machine operating system kernels can be configured to enter the one or more hyperbus backend components using at least one trap instruction. The one or more hyperbus backend components can be configured to choose a code path from one or more code path to interact with the one or more VIRTO device.

In some examples, a kernel bus system for building VMM can include: (a) Kernel bus system, said kernel bus system is realized based on KVM, said kernel bus system includes performance service, networked kernel bus system and local kernel bus system; (b) KVM components; (c) Guest space components, including operating system VM driver; (d) User space components, including user space application library, policy manager, device manager, external interfaces, host agent and management center; (e) Para-virtualization components, including virtual interrupt, virtual IO driver and pass-thru device, where the virtual interrupt is based on VMExit and VMEntry to swap between kernel mode and guest mode, IO driver bypasses QEMU emulation code to enable sync and async IO signaling and payload delivery, and pass-through device realizes pass-through delivery.

In various embodiments, the local kernel bus further includes: multi-path component, user-defined kernel component, fast switch between user task and guest task, across-VM communication component, Instruction Set Architecture/Application Binary Interface (ISA/ABI) manager component, ISA/ABI policy decision function PDF and policy execution point PEP components, shadow ISA/ABI component, and security service component, and the components are optionally realized based on the model of virtual service consumer VSC vs. virtual service producer VSP, with the VSP providing one or more said components in response to VSC request.

In many embodiments, the multi-path component further includes building multiple selectable code paths by splitting signal and bearer IO transmission; the multiple selectable code paths include one or more of the following operations: sync-read, sync-write, async-read and async-write.

In some embodiments, the multi-path component further includes: inter-counterpart communication mechanism ICCM is realized using the model of VSC and VSP to perform IO operations; and ICCM completes IO operations via host VIRTIO shared-memory virtual device, limited para-virtualization method without shared-memory virtual device, or traditional none-virtualization method without trapping into VMM.

In various embodiments, the VIRTIO shared memory virtual device includes mechanism to swap between VM-QEMU-KVM spaces or modes (the word "space" and "mode" can be used exchangeable herein); AIO service agent includes operations to write to or read from disk via Linux block device driver, optionally with cache, such that after read/write operation is completed, the daemon process is used to inform the VSP task in Linux user space.

In numerous embodiments, the multi-path component further includes a two-pass translation of physical media or shared memory address, wherein the virtual VM address is first translated to physical VM address, then the physical VM address is translated to physical host address.

In some embodiments, the VSP not only delivers the policies of workload media to the virtual file system VFS, but deals with VSP sync and async IO commands, and further to complete IO operations with Linux kernel IO functions.

In many embodiments, the VSC dispatches sync and async read and write operations via Linux kernel threads, and split the IO task into different paths according to the workload policies.

In numerous embodiments, the user-defined kernel component controls the self-defined application realized by kernel entities via kernel bus system, and accessed out of KVM.

In various embodiments, the fast switch component switches user-mode Linux task and guest-mode VM task, in which the Linux task uses VM virtual driver to deliver IO data by signaling and bearer payload via shared-memory virtual device.

In many embodiments, the across-VM communication component broadcasts or multiplexes the signal and/or bearer payload IO operation from a Linux task to one or more VM via upcall.

In some embodiments, the upcall includes: host agent delivers signaling and bearer payload to upcall via shared memory; upcall delivers signaling and bearer payload to one or more VM via broadcaster or multiplexor; and artificial virtual interrupt activates VM virtual driver to complete the signaling and bearer IO operation in the shared memory.

In numerous embodiments, the shared memory further includes: the IO ring buffer manager to setup and release of IO ring buffer, a shared memory; and the queuing operation of IO ring buffer manager wherein the manager traverses the queue to advance the position of queue element with higher interrupt privilege, facilitated by another privilege queue.

In various embodiments, the ISA/ABI manager component interacts with VM virtual device and controls data traffic, bandwidth, fault tolerance, and band-binding to guarantee QoS for payload read from/written to physical device via shared physical memory and VMM/KVM accepting IO payload as part of the kernel bus system.

In some embodiments, the ISA/ABI manager component further includes: KVM utilizing the bytecode of openfirmware to monitor (1) PIO/MMIO range, (2) kernel bus system interrupts, and (3) hardware tree; when hardware boot-loads and bootstraps, QEMU emulated hardware becomes available. Operations include discovering device, assigning device, controlling traffic, and band-binding, wherein the operation of controlling traffic utilizes multiplexing rule to multiplex payload coming from physical device via ISA/ABI.

In many embodiments, the Policy decision function PDF and policy execution point PEP components select and deploy PDFs and PEPs, pre-define PDF, and dynamically deploy and deliver policy to PEPs, wherein the selecting and deploying PDFs and PEPs, and dynamically deploying and delivering policy to PEPs are trigged by events.

In numerous embodiments, the PDF and PEP are realized by workload mediator, where the workload mediator includes: 3 PDFs to read data from different rule bases and/or resource consumption matrix, in order to execute: (1) KVM natural law PDFs, (2) individual transaction performance PDFs, and (3) overall transaction performance PDFs. 4 workload mediator PEPs, acquiring policies from the above three PDFs, to execute: (1) initial transaction layering and path-division, (2) Linux task scheduler for re-layering and path-re-division, (3) Linux task scheduler to handle overload, burst traffic that impacts the entire system, same-layer aggregation, and (4) dispatching transaction according to the data from resource consumption matrix.

In various embodiments, the PDF/PEP component further includes resource consumption handler, which reads from and writes to data in the resource consumption matrix with radix tree traverser, integrates the rules from individual transaction rule base, decides the sufficient conditions of the following policies: whether the DMA bandwidth too big? whether the memory size of QEMU IO ring buffer big enough? whether Virtual and non-virtual QEMU bridge out-of-band control signal too slow? whether shared memory big enough? whether the batch handling of dual translations of Global Virtual Address GVA to global physical address GPA, and global physical address GPA to host physical address HPA takes too long? whether the miss-hit of the cache page of virtual TLB is too much? whether the batch handling of KVM IRQfd interrupt injection takes too long? whether the GPU frame buffer out-of-band control signal (to delegate the work to None-Virtual processes) too slow? whether the traffic of concurrent access too big? whether thread/process running too long? whether the user stack is big enough?

In many embodiments, the radix tree traverser further includes fives layers of code path with VM SCSI/NDIS as first layer, QEMU as second layer, Linux kernel and virtual driver as third layer, the non-virtual driver as fourth layer, and physical machine as fifth layer; the traverser generates a 64-bit key for the transaction, builds radix tree path according to the layer number with 8 tree slots per tree node and 5 out of 8 leave-node slots filled with the pointers to the 5 rows of each layer of the resource consumption matrix. During transaction gang-lookup for tree node, if the layer number transformed by node height is smaller than the given layer number, the traverser continues to traverse downward to find tree node, gets the matrix pointer from the tree slot of the node, and reads out the data in the matrix element.

In various embodiments, the shadow ISA/ABI component manages virtual devices with PDF and PEP. The component interacts with various VMs to complete multiple reads/writes in one IO operation.

In some embodiments, the said shadow ISA/ABI component uses the bytecode of openfirmware to monitor (1) PIO/MMIO range, (2) kernel bus system interrupts, and (3) hardware tree; when hardware boot-loads and bootstraps, the hardware emulated by QEMU becomes available; and operations includes discovering devices, assigning devices, controlling traffic, and band-binding, wherein the operation of controlling traffic uses PEP to split payload delivered from physical device via shadow ISA/ABI, and the band-binding operation uses PEP to combine communication channels.

In many embodiments, the said security service component is realized at the external modules, including storage device USB or other peripheral device, wherein the product-ID-included hash values are computed at the host local hypervisor and the external modules, and are periodically checked for the signature compatibility via a query-response fashion. One or more products including remote hypervisor and other application products are supported with the said security mechanism so as to form a security chain, wherein the signature check can be propagated through all product items in the chain.

In numerous embodiments, the said security service component includes the USB external module manufacturer embeds the endorsement key pair into the USB module, and provides the public key Ekpub to the software developer, wherein the software developer installs the USB hardware module at the hardware server product, then proceeds to configure the security module, updates the security module, and authenticates the upgrades via the said security mechanism.

In various embodiments, the performance service includes workload mediator, wherein the workload mediator applies radix tree model to the data collected at one or more PEPs in the code path of a transaction, controls the performance of the hypervisor components during their execution, and optimize the performance with statistical results.

In some embodiments, the said performance service further includes the single-host deployment method of the performance service framework can be plugged into a cluster of hosts; the said framework uses existing tools of sysstate, vmstate, and oProfile; and the said framework executes problem solutions via performance optimizer, collects performance data, mediates workload via workload mediator, and analyzes data via bottleneck identifier.

In many embodiments, the said performance optimizer mediates performance for the parameterized functional unit via manual command lines or graphical user interfaces, wherein VMM characteristic parameters includes virtual memory sizes, number of virtual CPU cores, and virtual IPI interrupts; and driver parameters includes virtual BIOS, virtual PCI bus, and virtual devices; transaction performance is micro-tuned through policy manager of workload mediator, and macro-tuned through parameter and problem solutions; the said problem solutions further include Linux big-pagetable API batch processing based on protocols, including Pre-allocated memory chain, and code-path aggregation scheduler.

In numerous embodiments, the bottleneck identifier includes data collected from the resource consumption matrix of a cluster of hosts or single-host; and statistical data to tell if current system performance is far beyond the norm, or far exceed the range defined by the bottleneck rule base.

In various embodiments, the Linux task scheduler includes: a socket plugs in scheduler algorithm, configurable para-virtualization scheduler, real-time scheduler, and grid-computing scheduler. The default Linux kernel scheduler CFS is substituted by the said algorithms for their respective situations; for single transaction code path, the priority and time-slice is rescheduled; for the entire system, if overload happens, same layer transaction is rescheduled, or the priority and time slice of tasks with burst traffic are rescheduled; otherwise, the priority and time slice of the transactions worsening the traffic are rescheduled via task switch logic.

In some embodiments, the task switch logic provides common logic for the said scheduler algorithms, including the use of generalized task switch logic, and common architecture for the said scheduler algorithms. The task switch logic further includes accelerated mode-switching via VTx/SVM technology; and priority-tuning of VMs according to configuration.

In many embodiments, the virtual interrupt of para-virtualization component includes: artificially-generated interrupt; VMM is able to handle VMCS registers not loaded by VM by configuring VMCS; and Hypercall.

In numerous embodiments, the pass-through device handles sync/async disk/network data delivery, acquires IO ring buffer address, processes dual address translation and memory lock, finds physical page upon page-missing using Linux system call mmap( ), realizes DMA read/write, returns to user, unlocks memory and releases ring buffer.

In various embodiments, the virtual IO driver operations are: (1) receive virtual device IO command to read/write data from/to shared memory, disk, and network; (2) receive non-device IO command to read/write data from/to shared memory, disk, and network; (3) provide VIRTIO interface, utilize path division and realize zero-copy, or use TCP/UDP-IP over Infiniband to complete communication; and (4) provide functions to suspend and dismount the device.

In some embodiments, the networked kernel bus system includes a Virtual Service Consumer-Virtual Service Producer (VSC-VSP) architecture wherein the local kernel bus system is the VSP. VSP combines virtualization and telecommunication management network (TMN) standard, combines virtualization and Hadoop/MapReduce Global File System, uses standard interface to connect with virtualization server, manages VMs of multiple hosts, and manages multiple host groups.

In many embodiments, the networked kernel bus system includes: when the VSC is a remote kernel bus system on the net, local kernel bus system connects to that remote kernel bus system according to a hierarchical relationship; when the VSC is image database, local kernel bus system searches the image via Global File System (GFS); when the VSC is storage system, local kernel bus system searches the file location via GFS, meaning that a virtual object is transformed to a physical object, wherein GFS client sends out hashing chunk index and file name to the subnet using MapReduce methods as follows: first, Master server sends back chunk handle and chunk address. Second, GFS client sends chunk handle and byte range to subnet. Lastly, GFS client maps subnet host file chunks (so-called "Map") and sends back the found data (so-called "Reduce"); and when the VSC is an EMS (element management system) or NMS (network management system), local kernel bus system connects with the EMS or NMS according to many-to-one relationship.

In various embodiments, the management center includes: (1) handles creating, editing, deleting and searching personnel data including user and administrator privilege, (2) uses graphical user interface and/or command-line to handle user and administrator commands, including user session, VM state, VM start/shutdown, and (3) manages node, host, VM, virtual storage, virtual network, load-balancing policy, fault-tolerance policy, and kernel bus system service framework, including networked kernel bus system GFS service.

In numerous embodiments, the host agent includes: (1) handles heartbeat and VM state according to the transaction code path that delivers payload, (2) handles local net communication and VM responses to events via kernel bus system signal & control, and (3) manages VM via Linux VM server, using standard Linux API LibVirt to control Redhat enterprise VM server, Transoft QServer, or Citrix Xen server.

In some embodiments, a method of building VMM via kernel bus system, to convert a Linux KVM-based system into a complete para-virtualized VMM, including: build kernel bus system, wherein the said bus is realized based on KVM, and includes performance service, networked bus and local bus; build KVM components; build guest space components, including operating system VM driver; build user space components, including user space application library, policy manager, device manager, external interfaces and VM manager; and build para-virtualization components, including virtual interrupt, IO driver and pass-thru device, where the virtual interrupt is based on VMExit and VMEntry to swap between kernel mode and guest mode, IO driver bypasses QEMU emulation code to enable sync and async IO signaling and payload delivery, and pass-through device realizes pass-through delivery.

In many embodiments, a method of building performance service framework, including: the single-host deployment method of the performance service framework can be plugged into a cluster of hosts; the said framework uses existing tools of sysstate, vmstate, and oProfile; and the said framework executes problem solutions via performance optimizer, collects performance data, mediates workload via workload mediator, and analyzes data via bottleneck identifier.

In various embodiments, the said problem solutions further include Linux big-page-table API batch processing based on protocols, including Pre-allocated memory chain, and code-path aggregation scheduler. The performance optimizer mediates performance for the parameterized functional unit via manual command lines or graphical user interfaces, wherein VMM characteristic parameters includes virtual memory sizes, number of virtual CPU cores, and virtual IPI interrupts; and driver parameters includes virtual BIOS, virtual PCI bus, and virtual devices; transaction performance is micro-tuned through policy manager of workload mediator, and macro-tuned through parameter and problem solutions; and the said problem solutions further include Linux big-page-table API batch processing based on protocols, including Pre-allocated memory chain, and code-path aggregation scheduler.

In some embodiments, the bottleneck identifier includes data collected from the resource consumption matrix of a cluster of hosts or single-host; and statistical data to tell if current system performance is far beyond the norm, or far exceed the range defined by the bottleneck rule base.

In numerous embodiments, the workload mediator includes: 3 PDFs to read data from different rule bases and/or resource consumption matrix, in order to execute: (1) KVM natural law PDFs, (2) individual transaction performance PDFs, and (3) overall transaction performance PDFs. Four workload mediator PEPs, acquiring policies from the above three PDFs, to execute: (1) initial transaction layering and path-division, (2) Linux task scheduler for re-layering and path-re-division, (3) Linux task scheduler to handle overload, burst traffic that impacts the entire system, same-layer aggregation, and (4) dispatching transaction according to the data from resource consumption matrix.

In various embodiments, the resource consumption handler reads from and writes to data in the resource consumption matrix with radix tree traverser, integrates the rules from individual transaction rule base, decides the sufficient conditions of the following policies: whether the DMA bandwidth too big? whether the memory size of QEMU IO ring buffer big enough? whether Virtual and non-virtual QEMU bridge out-of-band control signal too slow? whether shared memory big enough? whether the batch handling of dual translations of Global Virtual Address GVA to global physical address GPA, and global physical address GPA to host physical address HPA takes too long? whether the miss-hit of the cache page of virtual TLB is too much? whether the batch handling of KVM IRQfd interrupt injection takes too long? whether the GPU frame buffer out-of-band control signal (to delegate the work to None-Virtual processes) too slow? whether the traffic of concurrent access too big? whether thread/process running too long? whether the user stack is big enough?

In various embodiments, the radix tree traverser further includes fives layers of code path with VM SCSI/NDIS as first layer, QEMU as second layer, Linux kernel and virtual driver as third layer, the non-virtual driver as fourth layer, and physical machine as fifth layer; the traverser generates a 64-bit key for the transaction, builds radix tree path according to the layer number with 8 tree slots per tree node and 5 out of 8 leave-node slots filled with the pointers to the 5 rows of each layer of the resource consumption matrix. During transaction gang-lookup for tree node, if the layer number transformed by node height is smaller than the given layer number, the traverser continues to traverse downward to find tree node, gets the matrix pointer from the tree slot of the node, and reads out the data in the matrix element.

In some embodiments, the Linux task scheduler includes: a socket plugs in scheduler algorithm, configurable para-virtualization scheduler, real-time scheduler, and grid-computing scheduler. The default Linux kernel scheduler CFS is substituted by the said algorithms for their respective situations; for single transaction code path, the priority and time-slice is rescheduled; and for the entire system, if overload happens, same layer transaction is rescheduled, or the priority and time slice of tasks with burst traffic are rescheduled; otherwise, the priority and time slice of the transactions worsening the traffic are rescheduled via task switch logic.

In numerous embodiments, the task switch logic provides common logic for the said scheduler algorithms, including the use of generalized task switch logic, and common architecture for the said scheduler algorithms. The task switch logic further includes accelerated mode-switching via VTx/SVM technology; and priority-tuning of VMs according to configuration.

Some embodiments provide a kernel bus system for building virtual machine monitor, based on Linux KVM. The kernel bus includes kernel local bus, kernel networked bus, and performance service. Local bus includes but not limited to functions: para-virtualization fundamentals, multi-pathing, across-task communication, fast switch between user task & guest task, virtual device manager, policy decision function, policy execution point, and security measurement. These are realized by examples like inter-counterpart communication service producer and consumer, upcall, and workload mediator. The kernel networked bus connects kernel local bus to remote kernel bus of another host or groups of hosts, and is realized by examples such as networked bus service producer, management center, and host agent. The performance service framework controls performance resulted from virtual machine monitor, takes advantage of local bus system examples like workload mediator, performance optimizer, and bottleneck identifier, and forms its own process.

Some embodiments can provide a kernel bus system through which a VMM can be built, and thus, realizing an enterprise-grade VMM for the Linux® operating system platform. In some examples, this kernel bus system can be hereafter referred to as "hyperbus system." The word "bus" does not necessarily refer to any hardware bus line, but rather indicates a software system that connects to various software components. The hyperbus system can include of a group of software components or modules that are running on a computer system, with single- or multi-core CPU (central processing unit) and memory. In various embodiments, the CPU can be equipped with x86 virtualization technology such as VTx/SVM.

In some examples, a local hyperbus system can refer to a kernel bus system that runs on top of KVM system (e.g., a KVM of the Linux® operating system) installed on a host computer, which can simultaneously be hosting several VMs. In the same or different examples, a remote hyperbus system can refer to a kernel bus system running on a remote host computer (usually a server), and be coupled via a network to the local hyperbus using, for example, a networked hyperbus mechanism at the local host computer.

In order to provide improved performance, some embodiments can use many data structures (such as a matrix), databases, and/or rule bases. Runtime data structures can be incorporated into the source code of some embodiments of the hyperbus system. Databases and rule bases can be open-source or commercially-available third party software and can, in some examples, be hosted in different computer systems because of their persistence nature.

A hyperbus system can be used to build a VMM. The hyperbus system can include: (a) a hyperbus that is realized on a modified Linux KVM, the hyperbus can include a performance virtual service provider (VSP), a networked hyperbus, and a local hyperbus; (b) KVM components; (c) guest space (a/k/a guest mode) components, including operating system VM driver; (d) user space (a/k/a user mode) components, including user space application library, policy manager, device manager, external interfaces and VM manager; (e) para-virtualization (PV) components including virtual interrupt, I/O driver and pass-thru device, where the virtual interrupt is based on VMExit and VMEntry to swap between kernel mode and guest mode, I/O driver bypasses QEMU emulation code to enable sync and async I/O signaling and payload delivery, and pass-through device realizes pass-through delivery.

In some embodiments, the local hyperbus can include: (a) multiple code path components ("multi-path components"); (b) self-defined kernel component (c) a fast switch between user task and guest task across a VM communication component; (d) a device manager; (e) ISA/ABI (Instruction Set Architecture/Application Binary Interface) policy decision function (PDF) and policy execution point (PEP) components; (f) shadow ISA/ABI component; and (g) a security service component. These components can be optionally realized based on the model of virtual service consumer (VSC) vs. virtual service producer (VSP), with the VSP providing one or more these components in response to VSC request.

The multiple-code-path component can build multiple selectable code paths to split signaling and bearer I/O transmission. The multiple selectable code paths can include at least one of the following operations: sync-read, sync-wire, async-read and async-write.

In some examples, the multi-code-path component can include inter-counterpart communication mechanism (ICCM), which can be realized using the model of VSC and VSP to perform I/O operations; the ICCM completes I/O operations via host VIRTIO shared-memory virtual device, limited para-virtualization method without shared-memory virtual device, or traditional none-virtualization method (without trap into VMM). These multi-path component can further include a two-pass translation of physical media or shared memory address, where the virtual VM address is first translated to physical VM address, then the physical VM address is translated to physical host address. The VSP can not only convey the policies of workload media to the virtual file system (VFS), but also deal with VSP sync and async I/O commands, and further to complete I/O operations with Linux kernel I/O functions. The VSC dispatches sync and async read/write operations via Linux kernel threads, and split the I/O task into different paths according to the workload policies. VIRTIO shared memory virtual device includes mechanism to swap between VM-QEMU-KVM spaces (modes). An AIO service agent includes operations to write to or read from disk via Linux block device driver, optionally with catch, such that after read/write operation is completed, the daemon process is used to inform the VSP task in Linux user space.

In various embodiments, the kernel component controls the self-defined application realized by kernel entities via hyperbus. Fast switch component can switch Linux task and VM task, in which the Linux task uses VM virtual driver to convey signaling and bearer payload via shared-memory virtual device.

Across-VM communication component can broadcast or multiplex the signal and/or bearer payload I/O operation from a Linux task to one or more VM via an upcall, wherein the upcall includes: host agent delivers signaling and bearer payload to upcall via shared memory; upcall delivers signaling and bearer payload to one or more VM via broadcaster or multiplexor; artificial virtual interrupt activates VM virtual driver to complete the signaling and bearer I/O operation in the shared memory. Shared memory further includes the I/O ring buffer manager to setup and release of I/O ring buffer (a kind of shared memory); the queuing operation of I/O ring buffer manager in which the manager traverses the queue to advance the position of queue element with higher interrupt privilege, facilitated by another privilege queue.

ISA/ABI manager component interacts with VM virtual device and control data traffic, bandwidth, fault tolerance, and band-binding (meaning that multiple media can be bound and transmitted in less number of channels) to guarantee quality of service (QoS) for payload read from/written to physical device via shared physical memory and VMM/KVM accepting I/O payload as part of the hyperbus. The Manageable ISA/ABI component further includes KVM utilizing the bytecode of openfirmware to monitor (1) PIO/MMIO range, (2) hyperbus interrupt, (3) hardware tree. When hardware boot-loads and bootstraps, QEMU emulated hardware becomes available. Operations include discovering device, assigning device, controlling traffic, and band-binding, wherein the operation of controlling traffic utilizes multiplexing rule to multiplex payload coming from physical device via ISA/ABI.

Policy decision function (PDF) and policy execution point (PEP) components select and deploy PDFs and PEPs, predefine PDF, and dynamically deploy and deliver policy to PEPs, wherein the selecting and deploying PDFs and PEPs, and dynamically deploying and delivering policy to PEPs are trigged by events. In one embodiment of the invention, PDF and PEP are realized by workload mediator, where the workload mediator includes 3 PDFs to read data from different rule bases and/or resource consumption matrix, in order to handle: (1) KVM natural law PDFs, (2) individual transaction performance PDFs, and (3) overall transaction performance PDFs. Workload mediator further includes 4 workload mediator PEPs, acquiring policies from the above three PDFs, to execute: (1) initial transaction layering and path-division, (2) Linux task scheduling to re-layering and path-re-division, (3) handle overload, burst traffic that impact the entire system, same-layer aggregation, and other overall-system problem, and (4) dispatch transaction according to the data from resource consumption matrix. The PDF/PEP component further includes resource consumption handler, which reads from and writes to data in the resource consumption matrix with radix tree traverser, integrates the rules from individual transaction rule base, decides the sufficient conditions of the following policies: whether the DMA bandwidth is too big? Whether the memory size of QEMU I/O ring buffer is big enough? Whether Virtual and non-virtual QEMU bridge out-of-band control signal is too slow? Whether shared memory is big enough? Whether the batch handling of dual translations of Global Virtual Address (GVA) to global physical address (GPA), and global physical address (GPA) to host physical address (HPA) takes too long? Whether the miss-hit of the cache page of virtual TLB is too much? Whether the batch handling of KVM IRQfd (means IRQ file descriptor, from its underlying event source) interrupt injection takes too long? Whether the GPU frame buffer out-of-band control signal (to delegate the work to None-Virtual processes) is too slow? Whether the traffic of concurrent access is too big? Whether thread/process is running too long? Whether the user stack is big enough? The radix tree traverser further includes five layers of code path with VM SCSI/NDIS as first layer, QEMU as second layer, Linux kernel and virtual driver as third layer, the non-virtual driver as fourth layer, and physical machine as fifth layer; the traverser generates a 64-bit key for the transaction, builds radix tree path according to the layer number with 8 tree slots per tree node and 5 out of 8 leave-node slots filled with the pointers to the 5 rows of each layer of the resource consumption matrix. During transaction gang-lookup for tree node, if the layer number transformed by node height is smaller than the given layer number, the traverser continues to traverse downward to find tree node, gets the matrix pointer from the tree slot of the node, and reads out the data in the matrix element.

Shadow ISA/ABI component manages virtual devices with PDF and PEP. The component interacts with various VMs to complete multiple reads/writes in one I/O operation, wherein the KVM uses the bytecode of openfirmware to monitor (1) PIO/MMIO range, (2) hyperbus interrupt, (3) hardware tree; when hardware boot loads and bootstraps, the hardware emulated by QEMU becomes available; operations includes discovering devices, assigning devices, controlling traffic, and band-binding, wherein the operation of controlling traffic uses PEP to split payload delivered from physical device via Shadow ISA/ABI, and the band-binding operation uses PEP to combine communication channels.

The security service component is realized at the external modules, including hardware storage device USB or other peripheral hardware device, wherein the product-ID-included hash values are computed at the host local hypervisor and the external modules, and are periodically checked for the signature compatibility via a query-response fashion. One or more products including remote hypervisor and other application products are supported with the said security mechanism so as to form a security chain, wherein the signature check can be propagated through all product items in the chain. In one embodiment, the USB external module manufacturer embeds the endorsement key pair into the USB module, and provides the public key Ekpub to the software developer, wherein the software developer installs the USB hardware module at the hardware server product, then proceeds to configure the security module, updates the security module, and authenticates the upgrades via the said security mechanism.

Performance service includes workload mediator, wherein the workload mediator applies radix tree model to the data collected at one or more PEPs in the code path of a transaction, controls the performance of the hypervisor components during their execution, and optimize the performance with statistical results. In one embodiment the performance service further includes the single-host deployment method of the performance service framework can be plugged into a cluster of hosts; the said framework uses existing tools of sysstate, vmstate, and oProfile; and the said framework execute problem solutions via performance optimizer, collect performance data and mediate workload via workload mediator, and analyze data via bottleneck identifier. The said performance optimizer mediates performance for the parameterized functional unit via manual command lines or graphical user interfaces, wherein VMM characteristic parameters includes virtual memory sizes, number of virtual CPU cores, and virtual IPI interrupts; and driver parameters includes virtual BIOS, virtual PCI bus, and virtual devices. Transaction performance is micro-tuned through policy manager of workload mediator, and macro-tuned through parameter and problem solutions. The said problem solutions further include Linux big-page-table API batch processing based on protocols, including Pre-allocated memory chain, and code-path aggregation scheduler. The bottleneck identifier includes data collected from the resource consumption matrix of a cluster of hosts or single-host; and statistical data to tell if current system performance is far beyond the norm, or far exceed the range defined by the bottleneck rule base. Linux task scheduler includes a socket to plug in scheduler algorithm, configurable para-virtualization scheduler, real-time scheduler, and grid-computing scheduler. The default Linux kernel scheduler CFS is substituted by the said algorithms for their respective situations; for single transaction code path, the priority and time-slice is rescheduled; for the entire system, if overload happens, same layer transaction is rescheduled, or the priority and time slice of tasks with burst traffic are rescheduled; otherwise, the priority and time slice of the transactions worsening the traffic are rescheduled via task switch logic, wherein the task switch logic provides common logic for the said scheduler algorithms, including the use of generalized task switch logic, and common architecture for the said scheduler algorithms. The task switch logic further includes accelerated mode-switching via VTx/SVM technology; and priority-tuning of VMs according to configuration.

The networked hyperbus includes a VSC-VSP architecture wherein the local hyperbus is the VSP. VSP combines virtualization and telecommunication management network (TMN) standard, combines virtualization and Hadoop/ MapReduce Global File System, uses standard interface to connect with virtualization server, manages VMs of multiple hosts, and manages multiple host groups. When the VSC is a remote hyperbus on the net, local hyperbus connects to that remote hyperbus according to a hierarchical relationship; when the VSC is image database, local hyperbus searches the image via Global File System (GFS); when the VSC is storage system, local hyperbus searches the file location via GFS, meaning that a virtual object is transformed to a physical object, wherein GFS client sends out hashing chunk index and file name to the subnet using MapReduce methods as follows: first, Master server sends back chunk handle and chunk address; second, GFS client sends chunk handle and byte range to subnet. Lastly, GFS client maps subnet host file chunks (so-called "Map") and sends back the found data (so-called "Reduce"); when the VSC is an EMS (element management system) or NMS (network management system), local hyperbus connects with the EMS or NMS according to many-to-one relationship. The management center (1) handles creating, editing, deleting and searching personnel data including user and administrator privilege, (2) uses graphical user interface and/or command-line to handle user and administrator commands, including user session, VM state, VM start/shutdown, and (3) manages node, host, VM, virtual storage, virtual network, load-balancing policy, fault-tolerance policy, and hyperbus service framework, including networked hyperbus GFS service. The host agent (1) handles heartbeat and VM state according to the transaction code path that delivers payload, (2) handles local net communication and VM responses to events via hyperbus signal & control, and (3) manages VM via Linux VM server, using standard Linux API LibVirt to control Redhat enterprise VM server, Transoft QServer, or Citrix Xen server.

The virtual interrupt of para-virtualization component can include: (a) an artificially-generated interrupt; (b) VMM is able to handle VMCS registers not loaded by VM when configuring VMCS; (c) a Hypercall; (d) Zero-copy (pass-thru device) handles sync/async disk/network data delivery, acquires I/O ring buffer address, processes dual address translation and memory lock, finds physical page upon page-missing using Linux system call mmap( ) realizes DMA read/write, returns to user, unlocks memory and releases ring buffer.

Virtual I/O driver operations can include: (1) receive virtual device I/O command to read/write data from/to shared memory, disk, and network; (2) receive non-device I/O command to read/write data from/to shared memory, disk, and network; (3) provide VIRTIO interface, utilize path division and realize zero-copy, or use TCP/UDP-IP over Infiniband to complete communication; (4) provide functions to suspend and dismount the device.

Some examples include a method to build VMM using hyperbus and a performance service framework, in order to realize an enterprise-grade VMM running on open-source Linux operating system. Some embodiments can be based on KVM and use eleven abstract functions to speed up the performance of Linux operating system virtualization.

Embodiments of the hyperbus system include para-virtualization characteristics that can create multiple mechanisms to elevate performance. In one embodiment, the hyperbus system can be combined with the existing limited virtualization system (e.g., a virtualization system from Qumranet) to realize a multi-path system. In another embodiment, the hyperbus system can deliver commands from a user application library with multiplexing or broadcasting technique to multiple VMs. A further embodiment can use pass-thru or tunneling to rapidly deliver data. Additionally, enterprise administrator is able to manually or automatically optimize performance of the computer system using workload mediating method.

In some examples, the preceding concepts form the following abstract functions, which is realized via the hyperbus system and/or the VSC/VSP architecture: (a) Abstract function 0, a para-virtualization method as a basic function, such that a transaction code path is able to bypass most of the QEMU procedure logic, process synchronous and asynchronous I/O operations, and speed up I/O via pass-thru mechanism; (b) Abstract function 1, asymmetric multipath fast control; (c) Abstract function 2, user-defined kernel entity to access from KVM; (d) Abstract function 3, fast switching between guest-space tasks and user-space tasks; (e) Abstract function 4, across-VM communication using broadcasting and virtual interrupts to simultaneously talk to multiple VMs; (f) Abstract function 5, a hyperbus device manager; (g) Abstract function 6, policy decision function (PDF) and policy execution point (PEP) systems and methods; (h) Abstract function 7, a manageable shadow ISA/ABI; (i) Abstract function 8, security management; (j) Abstract function 9, performance service; and (k) Abstract function 10, a networked hyperbus.

In order to realize these eleven abstract functions, a hyperbus can be configured such that a VMM is built via this hyperbus. FIG. 1 is a block diagram of hyperbus system 100, according to a first embodiment. Hyperbus system 100 is merely exemplary and is not limited to the embodiments presented herein. Hyperbus system 100 can be employed in many different embodiments or examples not specifically depicted or described herein.

Referring to FIG. 1, a hyperbus system 100 can include: (a) one or more user space components 011; (b) one or more guest space components 012; (c) a hyperbus 013 (d) one or more operating system components in Linux kernel 014; (e) one or more VMM components in VMM 015; (f) para-virtualization VMM 016; (g) one or more KVM components in KVM 017. Hyperbus system 100 can run on hardware equipment 018 of one or more host computers. In the example shown in FIG. 1, non-shaded blocks can be the components or modules of an example of hyperbus system 100, while shaded blocks can be components or modules of the operating system (e.g., Linux® or Microsoft Window®) or the hardware of the one or more host computers.

Computer operating systems can segregate virtual memory into guest space and user space. Guest space is strictly reserved for running the kernel of the operating system, kernel extensions, and most device drivers. In contrast, user space is the memory area where all user mode applications operate. In hyperbus system 100, user space components 011 can interacts with guest space components 012 via hyperbus 013. In some examples, local hyperbus 0133 of hyperbus 013 can interact with Linux kernel 014, VMM 015, and para-virtualization VMM 016. Virtual interrupt 0172 of KVM 017 can enable the task switch among user space and guest space. Thus, frontend device 0121 is able to process I/O (input/output) operations to the assigned or shared hardware device 018 via a pass-thru (i.e., zero-copy) method or non-pass-thru method. In some examples, backend shadow device 0161 of VMM 0015, backend virtual device 0162 of para-virtualization VMM 016, AIO service agent 0141 of Linux kernel 014, and I/O service 0164 of para-virtualization VMM 016 can all participate in I/O operations. In one embodiment, the participation of modules of para-virtualization VMM 016 illustrate that hyperbus is able to co-operate with the para-virtualization modules of Linux kernel 014. Further, device manager 0111 of user space components 011 and device service agent 0143 of Linux kernel 014 can be configured to bind channel and control traffic. The description above provides a brief introduction to abstract functions zero through eight.

Additionally, hyperbus 013 can have another component, performance service module 0131. Performance service module 0131 can be configured to enable the administrator to automatically or manually adjust the performance of the computer system. User space application library 0114 of user space components 011 can be configured to control performance service module 0131 via policy manager 01141. Memory manager 0163 of para-virtualization VMM 016 is used to collect performance information within the Linux kernel, as well as change a task time slice via Linux kernel task scheduler 0142 of Linux kernel 014. The description above provides a brief introduction to abstract function nine of a performance service module 0131 of hyperbus 013.

Some embodiments of hyperbus system 100 also include a networked hyperbus 0132 of hyperbus 013. Because local hyperbus 0133 works on the host computer only, networked hyperbus 0132 can be configured to operate on the storage and image database of a remote host computer, as well as hosts in the hierarchical network tree. The description above provides a brief introduction to abstract function ten of a networked hyperbus 0132 of hyperbus 013.

FIG. 2 is the flowchart of a method 200 of realizing the hyperbus virtual service producer, according to an embodiment. Method 200 is merely exemplary and is not limited to the embodiments presented herein. Method 200 can be employed in many different embodiments or examples not specifically depicted or described herein. In some embodiments, the activities, the procedures, and/or the processes of method 200 can be performed in the order presented. In other embodiments, the activities, the procedures, and/or the processes of the method 200 can be performed in any other suitable order. In still other embodiments, one or more of the activities, the procedures, and/or the processes in method 200 can be combined or skipped.

In some examples, method 200 can describe an implementation of abstract functions zero to ten. FIG. 2 can also provide the workflow of hyperbus 013, with a Virtual Service Consumer (VSC)/Virtual Service Producer (VSP) architecture. VSC/VSP architecture is different from the more familiar Client/Server architecture where network communication is between a client and a server. In VSC/VSP architecture, the VSP communicates with the VSC using a much faster procedure call or system call. FIGS. 15 and 16 demonstrate an example of an implementation of VSC/VSP architecture. On the other hand, FIG. 2 provides method 200 that covers abstract hyperbus functions zero to ten. The workflow of virtual service producer of local hyperbus can include the following activities.

In some examples, the VSP contains a PV method bypassing QEMU and interacting with the QEMU-limited-PC method. Method 200 is not only a VSP method but a workload mediator. ICCM VSP (inter-counterpart communication mechanism virtual service producer) is only an example of a method to provide service. Upcall and path shortening are two other examples that can be used. In these examples, ideas of MUXing, iMUXing, and tunneling are prevalent. ICCM is also an example of shared memory. In these examples the idea of shared memory is prevalent.

Referring to FIG. 2, method 200 includes an activity 0201 of initializing of the hyperbus virtual service producer.

Method 1100 in FIG. 11 continues with an activity 0202 of determining if the transaction operation over the local hyperbus. If the transaction operation is over the local hyperbus, the next activity is activity 0203. Otherwise, the next activity is activity 0220.

Subsequently, method 200 of FIG. 2 includes an activity 0203 of determining if the service consumer is a guest operating system. If the service consumer is a guest operating system, the next activity is activity 0204. Otherwise, the next activity is activity 0205.

Next, method 200 of FIG. 2 includes an activity 0204 of processing a asymmetric multipath frontend device driver or processing an across-VM communication frontend device driver.

Method 200 in FIG. 2 continues with activity 0205 of determining if the service consumer is VMM or KVM. If the service consumer is VMM or KVM, the next activity is activity 0206. Otherwise, the next activity is activity 0207.

Subsequently, method 200 of FIG. 2 includes an activity 0206 of VMM processing an asymmetric multipath backend device driver or an virtual memory management for a VMM process or processing virtual timer and virtual interrupt for KVM.

Next, method 200 of FIG. 2 includes an activity 0207 of determining if the service consumer is a Linux kernel. If the service consumer is a Linux kernel, the next activity is activity 0208. Otherwise, the next activity is activity 0209.

Method 200 in FIG. 2 continues with activity 0208 of processing a para-virtualization function, or processing a user-defined kernel entity access from KVM.

Subsequently, method 200 of FIG. 2 includes an activity 0209 of determining if the service consumer is physical hardware. If the service consumer is physical hardware, the next activity is activity 0210. Otherwise, the next activity is activity 0211.

Next, method 200 of FIG. 2 includes an activity 0210 processing a hyperbus device manager, processing the PDF (e.g., PDF is the VSP) and PEP (e.g., PEP as VSC), or manageable shadow ISA/ABI.

Method 200 in FIG. 2 continues with an activity 0211 of determining if the service consumer is a Linux task. If the service consumer is a Linux task, the next activity is activity 0212. Otherwise, the next activity is activity 0217.

Subsequently, method 200 of FIG. 2 includes an activity 0212 of determining if the Linux task is user-defined application. If the Linux task is not a user-defined application, the next activity is activity 0213. Otherwise, the next activity is activity 0216.

Next, method 200 of FIG. 2 includes an activity 0213 of determining if the Linux task is a management center application. If the Linux task is a management center application, the next activity is activity 0214. Otherwise, the next activity is activity 0215.

Method 200 in FIG. 2 continues with an activity 0214 of implementing process management center and host agent, or implementing performance optimizer/performance service.

Subsequently, method 200 of FIG. 2 includes an activity 0215 of implementing process virtual desktop (VDI) application. Next, method 200 of FIG. 2 includes an activity 0216 of processing the user-defined application, as a bridge between the Linux task and the VMM.

Method 200 in FIG. 2 continues with an activity 0217 determining if the task is communications between the Linux task and the guest task. If the task is communications between the Linux task and the guest task, the next activity is activity 0218. Otherwise, the next activity is activity 0219.

Subsequently, method 200 of FIG. 2 includes an activity 0218 of processing a fast switch between Linux task and guest task.

Method 200 of FIG. 2 includes an activity 0219 of returning with an error.

Method 200 in FIG. 2 includes an activity 0220 of determining if the hyperbus service producer is the networked hyperbus. If the hyperbus service producer is the networked hyperbus, the next activity is activity 0221. Otherwise, the next activity is activity 0222.

Subsequently, method 200 of FIG. 2 includes an activity 0221 of processing the service producer of networked hyperbus.

Next, method 200 of FIG. 2 includes an activity 0222 of processing the performance service module.

FIG. 3 is illustrates a combined block diagram and flowchart of the para-virtualization basic function, according to the first embodiment. The combined block diagram and flowchart of FIG. 3 is merely exemplary and is not limited to the embodiments presented herein. The combined block diagram and flowchart of FIG. 3 can be employed in many different embodiments or examples not specifically depicted or described herein. In some embodiments, the activities, the procedures, and/or the processes of the combined block diagram and flowchart of FIG. 3 can be performed in the order presented. In other embodiments, the activities, the procedures, and/or the processes of the combined block diagram and flowchart of FIG. 3 can be performed in any other suitable order. In still other embodiments, one or more of the activities, the procedures, and/or the processes in the combined block diagram and flowchart of FIG. 3 can be combined or skipped.

FIG. 3 illustrates an implementation of the abstract function zero using para-virtualization VMM 016 to bypassing most of the logic of QEMU emulator. In the embodiment of FIG. 3, para-virtualization VMM logic 034 of VMM 0016 bypasses most of the logic of QEMU emulator through normal Linux system calls from the user-space management application 031 (e.g., a hosting agent), or through VMCALL from Linux glibc/Windows system call layer of the VM 032.

In various examples, para-virtualization VMM 0016 can include one or more elements or modules (e.g., Backend shadow device 0161, Backend virtual device 0162, memory manager 0163, and/or I/O service 1064) to perform each of the activities 0301-0313 of method 300 as described below. Method 300 is merely exemplary and is not limited to the embodiments presented herein. Method 300 can be employed in many different embodiments or examples not specifically depicted or described herein. In some embodiments, the activities, the procedures, and/or the processes of method 300 can be performed in the order presented. In other embodiments, the activities, the procedures, and/or the processes of the method 300 can be performed in any other suitable order. In still other embodiments, one or more of the activities, the procedures, and/or the processes in method 300 can be combined or skipped.

Referring to FIG. 3, method 300 includes an activity 0301 of entering para-virtualization logic from VMCALL by guest kernel 0322. In some examples, VMEXIT is handled by an virtual interrupt. Afterwards, the next activity is activity 0302.

Method 300 in FIG. 3 continues with an activity 0302 of determining if the virtual driver needs to be called. In other embodiments, activity 0302 can be entered from Linux user-space management application 031 via a normal system call (e.g., a normal system call by the management application (i.e., the host agent)).

If the virtual driver is to be called, the next activity is an activity 0303. Otherwise, the next activity is an activity 0314 of using the Linux kernel and VMM to handle a transaction. In some examples, the Linux kernel and VMM can use a kernel call to handle the transaction. Use of the kernel call illustrates the ability of hyperbus to co-operate with the existing Linux open-source KVM.

Subsequently, method 300 of FIG. 3 includes an activity 0303 of calling kernel service threads by VMM and the kernel. At this point in time, the hyperbus can be considered as a PCI (Peripheral Component Interconnect) device, and needs to interact with the virtual driver 03221. Depending on the implementation, virtual driver 03221 can be a Window or Linux virtual driver in some examples. After the VMM and kernel entities call the kernel service threads, the next activity is activity 0304.

Next, method 300 of FIG. 3 includes an activity 0304 of determining if the operations of the kernel service threads are synchronous or asynchronous. If the operations of the kernel service threads are synchronous, the next activity is activity 0310. If the operations of the kernel service threads are asynchronous, the next activity is activity 0305.

Method 300 in FIG. 3 continues with an activity 0305 of handling VMENTRY with a virtual interrupt and then the operations of the kernel service threads are switched to VM where the VM driver is triggered. Because these operations are asynchronous operations, the para-virtualization logic continues with activity 0306.

Subsequently, method 300 of FIG. 3 includes an activity 0306 of determining if the operations of the kernel service threads are I/O. If the operations of the kernel service threads are I/O, the next activity is activity 0309. Otherwise, the next activity is activity 0307.

Next, method 300 of FIG. 3 includes an activity 0307 of completing the non-I/O operation. The next activity is activity 0308. Method 300 in FIG. 3 continues with an activity 0308 of signaling to the VM that asynchronous operations of the kernel service threads are completed.

Subsequently, method 300 of FIG. 3 includes an activity 0309 of completing the I/O operation of the kernel service threads. Completing the operations can include a zero-copy via the pass-thru device. The next activity is activity 0308.

Next, method 300 of FIG. 3 includes an activity 0310 of determining if the operation is I/O operation. If the operation is I/O operation, the next activity is activity 0312. Otherwise, the next activity is activity 0311.

Method 300 in FIG. 3 continues with an activity 0311 of completing the non-I/O operation. Afterwards, next activity is activity 0313.

Subsequently, method 300 of FIG. 3 includes an activity 0312 of complete the I/O operation. In some examples, the I/O operation can be completed using a zero-copy via a pass-thru device. The next activity is activity 0313.

Method 300 include an activity 0313 of waiting to the operation (either the non-I/O or I/O operation) is complete and then using handle one or more processor instructions (e.g., VMENTRY) to switch back to VM.

FIG. 4 is a block diagram describing the components used to implement local hyperbus function 1 of asymmetric multipath fast control, according to an embodiment. In some embodiments, as used herein, "multipath" means the code path of the transaction can have multiple choices, ranging from low to high performance, wherein the performance of the "old" code path using Linux open-source other than hyperbus is the lowest. The transaction code paths taken by various VMs are asymmetric because each VM may choose to take different paths to optimize its performance.

Referring to FIG. 4, when VM application 0411 of VM 041 executes an I/O operation, VM operating system kernel 0412 of the guest space components 012 (FIG. 1) enters hyperbus 042 via at least one trap instruction. Hyperbus KVM backend components 042 chooses among multiple code paths, which inform the VIRTIO devices 1, ..., n (e.g., device 04131 and 04132 in FIG. 4) of the QEMU 0413 after VMEXIT. This triggers VM drivers 1, ..., n (e.g., driver 04121 and 04122 in FIG. 4). The drivers in turn interact with hyperbus services 1, ..., n, and thus, deliver payload through ISA/ABI to complete a hardware read/write operation. One of the hyperbus services that interacts with the example of ICCM VSP/VSC file system. Another hyperbus service can be the example of AIO service agent.

Using the components described in FIG. 4, QEMU emulator cannot be bypassed completely. A little amount of QEMU code is still used. That is, the synchronous I/O operations, asynchronous I/O operations and payload delivery, and pass-through delivery substantially independent the QEMU process emulator.

In the switch between guest mode and kernel mode, after a call VMEXIT to VM, the hyperbus system goes through VMRESUME to be get back to KVM backend component. The hyperbus system then returns to VM none-root operation via VMENTRY, such that guest operating system can continue to run from a previous interrupt point. The above mode-switching can be completed through self-defined hypercall without any VTx/SVM instruction, because hypercall improves performance. The creation of multipath is in conformance to the performance principle of "transaction handling switches from in-box to out-box." The out-box object can even be a Linux process (i.e., local hyperbus function 3). An example, of this function is ICCM VSP/VSC with a focus on multipath and shared memory.

Local hyperbus function 2: user-defined kernel entity access from KVM:

FIG. 5 is a block diagram describing the components used to implement local hyperbus function 2 of user-defined kernel entity access from KVM, according to an embodiment. User-defined kernel entity is supposed to be independent of the hyperbus and controlled by KVM/VMM. Function 2 enables the kernel entity to be controlled by hyperbus, such that the entity enjoys the benefits of multi-pathing, multiplexing, and tunneling. An example of function 2 is a workload mediator.

As shown in FIG. 5, VM 051 can include: (a) VM application 0511; (b) VM kernel 0512; and (c) QEMU emulator 0513. Similar to the implantation of function 1, when VM 051 execute I/O operations, the hyperbus system enter into hyperbus 052 using para-virtualization mechanism. Hyperbus 052 can inform VM and deliver a directly to self-defined kernel entity 053 according to Hyperbus agenda. This kernel entity actively accesses KM/VMM 054 to complete I/O operations. The hyperbus system can divide the operation into multipaths via multiplexor 055, or zero-copies data via tunnel 056, and/or read/write data via ISA/ABI 057. Thus, hyperbus 052 is able to control this user-defined kernel entity. One example of kernel entity is a policy execution point of a workload mediator.

FIG. 6 is a block diagram describing the components used to implement local hyperbus function 3 of fast switching between user-space task and guest-space task, according to an embodiment. The I/O operation of VM in guest space often has lower performance because of QEMU emulation. If this I/O operation is switched to Linux user space, the performance is elevated. Therefore, the purpose of this function is to let Linux task use VM virtual driver by replacing VM task through shared memory to complete the delivery of signal and payload. An example of this function is AIO service agent.

Referring to FIG. 6, user space task 061 is pre-configured to be switchable. When user-space application 0621 of VM 062 executes I/O operations, VM kernel 0622 interacts with hyperbus component 063 via the trap interrupt 0631 of paravirtualization. The shared physical media 0631 of hyperbus component 063 becomes a common access media between user space and guest space. Hyperbus component 063 switches I/O signal and payload from guest space to user space. Lastly, the application of Linux user space is able to deliver the payload of the shared physical media of network or disk storage to the physical hardware. Alternatively, the path can also be DMA or multiplexing, instead of shared physical media.

FIG. 7 is a block diagram describing the components used to implement local hyperbus function 4 of across-VM communication, according to an embodiment. Through multiplexing or broadcasting, the hyperbus simultaneously operates on multiple guest-space VMs, thus utilizes the local kernel call and shared memory, instead of TCP/IP network communication. Thus, a Linux task can complete an I/O delivery of signal and payload by multiplexing or broadcasting to multiple VMs via upcall. For example, an application can be simultaneously deployed to multiple VMs, or a DNS (domain name service) lookup of IP (internet protocol) addresses of multiple VMs. An example of an implementation of function 4 is upcalls and virtual interrupts with an emphasis on multiplexing/broadcasting.

Referring to FIG. 7, in some examples, user-space management application can be a task in need of speed (e.g., a host agent). User-space management application 071 (e.g., the "host agent" of FIG. 36) delivers signal and payload into component 0731 of hyperbus 073 using Linux system call. Alternatively, one VM 0721 within a group of VMs in the guest space 072 starts a PV system call to enter hyperbus 073 and deliver signal and payload into hyperbus component 0731 (e.g., the upcall of FIG. 21). Component 0731 in turn delivers virtual interrupt 07321 (e.g., the virtual interrupt of FIG. 22) to driver 1 (07221), . . . , driver n, (07231) of VM1, 0722, . . . , VMn, 0723, respectively, through multiplexor or broadcaster 0732. These drivers read/write payload from network or hard disk via shared physical memory 0733 (e.g., the I/O ring buffer of FIG. 23), and send the result to VM 1, . . . , VMn. Alternatively the system may also use DMA instead of shared physical memory.

FIG. 8 is a block diagram describing the components used to implement local hyperbus function 5 of hyperbus manageable ISA/ABI, according to an embodiment. In systems without a hyperbus, the KVM delivers payload from VM directly to ISA/ABI. But, in embodiments with hyperbus 0082 and device manager 081 ISA/ABI can make more intelligent decisions and become more manageable through use of device management functions such as discovering, assigning, traffic-controlling, and band-binding for virtual devices.

Referring to FIG. 8, the user-space device manager 081 can send the following commands to VM devices via Linux system call: discovering device, assigning device, traffic controlling and band-binding. Hyperbus 083 has a device management agent 0831 which broadcasts to the virtual device frontend 0821 of multiple VMs 082 via broadcaster 0832, in order to deliver commands from device manager 081.

During the phase of value pre-setting, these virtual devices are discovered, name-assigned, and result reported back to device manager 081 via device management agent 0831. Device manager 081 in turn announces these virtual devices to the wide-area VMMs. Device management agent 0831 also treats the shared physical media 0833 as the virtual device backend of the ISA/ABI 084. This treatment allows device management agent 0831 to manage ISA/ABI 084.

Next, when VM 082 has an I/O operation which requires ISA/ABI 084 to read or write payload for a real hardware device, under the hyperbus management, the shared physical media 0833: (a) accepts the payload via VMM/KVM; (b) interacts with the virtual device frontend 0821 of the VM 082; (c) controls data traffic; (d) controls bandwidth; (e) tolerates faults; (f) binds channels of various media; and (g) provides QoS via traffic controller 08331. The traffic controller 08331 reports the results back to the device management agent 0831, which in turn informs device manager 081. An example of a hyperbus device manager is the ICCM device management agent of FIG. 24.

Local hyperbus function 6: Policy decision function (PDF) and policy execution point (PEP):

FIG. 9 is a block diagram describing the components used to implement of local hyperbus function 6 of use of policy decision function (PDF) and policy execution point (PEP), according to an embodiment. The hyperbus system produces policy from a rule engine and deploy policy using various PEPs. In some examples, the hyperbus system can include two or more PDFs, and each PDF can include or own two or more PEPs. The content of rules include multiple knowledge domains, including, for example, the domain of device management policies, the domain of performance service policies, etc. The combination of PDFs and PEPs can be deployed in multiple configurations, and this block diagram demonstrates one out of many possible configurations. Policy deployment and delivery can happen during pre-configuration or runtime. For individual PEPs, policy deployment and delivery can be triggered by events, and are subscribed from service consumer PEP to service producer PDF. PDF and PEP can streamline the functional pipeline.

Referring to FIG. 9, user-space component 091 includes policy rule base 0911 and policy graphical interface 0912. An administrator manages policy rule base 0911 through rule based user interface 0921. For those policies for which decision need to be made, the administrator delivers them to the PDF 0931 of the hyperbus. The PDF 0931 then makes the decision according to the rules in the policy rule base 0911. PDF 0931 can control two or more PEPs, which are deployed in the kernel space and the guest space. PDF 0931 can first deploy ISA/ABI PEP 094. PDF 0931 can then deploys PEPs at the shared physical media, KVM/VMM, and VMs. Whenever there is an I/O operation, or a device is discovered, assigned, or traffic needs to be controlled, or media channels are to be bound, the VM PEP 0921, shared-media PEP 0934, KVM/VMM PEP 0933, and/or ISA/ABI PEP 094 are triggered by the events, and start executing the policy. The policy manager in FIG. 25 is an example of PDF. The workload mediator of FIG. 25 is a first example of PEP. The shadow ISA/ABI device manager of FIG. 28 is a second example of PEP.

FIG. 10 is a block diagram describing the components used to implement local hyperbus function 7 of using policy and a shadow ISA/ABI to manage policy, according to an embodiment. In some examples, function 7 combines function 5 and function 6 to manage virtual (logic) device(s) by policy. Additionally, implementing function 7 allows construction of a shadow ISA/ABI to interact with the VM to deliver signal and payload to the real ISA/ABI. Accordingly, implementing function 7 allows combination of multiple I/O operations into one hardware read/write operation.

Referring to FIG. 10, user-space component 101 includes policy rule base 1011, rule base graphical interface 1012, and device manager 1013. In some examples, hyperbus 103 can include; (a) a device management agent 1031; (b) a hyperbus PDF 1032; (c) a shadow ISA/ABI 1033; (d) a KVM/VMM hyperbus component 1034; (e) a shared physical media 1035 that controls traffic and binds media channels; and (f) a real ISA/ABI 104.

During pre-configuration, an administrator can pre-set the policies for the hyperbus PDF 1032 from the rules in policy rule base 1011 through rule base graphical interface 1012. These policies can be deployed/delivered to shadow ISA/ABI PEP 10331, KVM/VMM PEP 10341, shared physical media PEP 10351, and ISA/ABI PEP 1041.

During runtime, device manager 1013 can send the commands of device discovering, device assigning, traffic controlling, and band-binding to various components of hyperbus 103, using device management agent 1013. Shadow ISA/ABI 1033 is configured to broadcast and interact with multiple VMs 102. Whenever a VM has an I/O operation, the above PEPs are triggered by the I/O operation to execute received policies under the monitoring of traffic and media channels. Shadow ISA/ABI 1033 consolidates the result of many I/O operations and reads from or writes to the real ISA/ABI in one operation. Examples of implementation of this function are a device manager with policy and shadow ISA/ABI. Another example is the manageable shadow ISA/ABI of FIG. 28.

FIG. 11 is a block diagram describing the components used to implement local hyperbus function 8 of security management, according to an embodiment. One of the purposes of hyperbus security management is to protect hyperbus system 100 from hackers, and guarantee the operation of product license. The security protection is undertaken below ring 2 (ring 0 or ring 1) of the operating system mode. Accordingly, the probability of being attacked is relatively low. Hyperbus system 100 features a Trusted Platform Module (TPM) technology to compute hash value at two ends: host vs. storage or peripheral USB. Periodically, the hash values of two ends are compared. If not equal, hyperbus system 100 ceases functioning. This management mechanism is called Trusted Computing System (TCS). TCS also supports remote checking to expand the technology to various chained products such as VDI (virtual desktop infrastructure) and remote hyperbus.

Referring to FIG. 11, user-space component 111 can include: (a) a remote application 1111; (b) a local application 1112 (e.g., a VDI product); (c) a remote security TCS gate 1113; and (d) a local security TCS gate 1114. Hyperbus 113 can include an application software hash calculator 1131, the signed application software hash 1132, and hyperbus security TCS agent 1133. Hyperbus security TCS agent 1133 can include: MMIO/PIO (Memory Mapping I/O (MMIO) or Port I/O (PIO)) operation 11331 and security monitor 11332. Hardware 018 can include peripheral module 114 (e.g., an USB) and storage 115. Peripheral device module 114 can include a secured TCS sealed storage 1141.

In some examples, in order to check the hash value, remote application 1111 uses remote TCS gate 1113 and local application 1112 uses local TCS gate 1114. Application software hash calculator 1131 calculates a temporary hash value according to the public attestation identification key (NONCE PUB_AIK). Application software hash calculator 1131 also signs the signed application software hash value, and sends the signed value to hyperbus TCS agent 1133. TCS agent 1133 uses the protocol of MMIO/PIO 11331 to obtain the hash value from peripheral device module 114 or storage 115. Peripheral device module 114 and storage 115 rely on TCS sealed storage 1141 and 1151, respectively, to load the signed application hash and NONCE PUB_AIK in response the inquiry. The security monitor 11332 stops the execution of hyperbus system 100 if there is error when periodically checking the hash values. An example of an implementation of function 4 is TCS operation of FIG. 29.

FIG. 12 is a block diagram describing the components used to implement local hyperbus function 9 of monitoring a performance service, according to an embodiment. A performance service module can provide service components that enhance VM performance via administrator manual and automatic operations. In some examples, performance service module can use open-source or third-party performance tools, but the workload mediator provided by hyperbus can be key to the enhanced performance. The workload mediator uses radix-tree mathematical model to utilize the data collected at various PEPs along the code path. The mediator is able to control the performance of various hyperbus functions and optionally combine statistical methods to optimize performance.

Referring to FIG. 12, user-space component 121 can include: (a) existing performance tools 1211; (b) performance service framework graphical interface 1212; (c) bottleneck identifier 1213; (d) performance optimizer 1214; (e) workload mediator (i.e., a PDF) 1212; (f) policy manager 1216; (g) rule base 1217; and (f) history/statistical performance database 1218. Hyperbus 123 can include: (a) task scheduler 1231; (b) virtual memory manager 1232; (c) two or more PEPs 1233 (PEP1, . . . , PEPn); and (d) radix tree traverser 1234. Hardware can include memory 124.

An administrator using the graphical interface 1212 is able to use existing open-source or third-party tools 1211 to manage performance. The administer can also use the manual function of optimizer 1214 to manage performance, or configure automatic performance management. Regardless if the management is manual or automatic, the service relies on bottleneck identifier 1213 and workload mediator 1215 to provide data or policy. In some examples, to manage performance, bottleneck identifier 1213 needs to access history and statistical performance database 1218 and workload mediator 1215 needs to access rule base 1217 via policy manager 1216.

In operation, performance data is obtained via various hyperbus PEPs 1233 which read/write resource consumption matrix linked by a radix tree using radix tree traverser 1234. A radix tree is a special data structure, running under modified virtual memory manager 1232, which reads/writes performance data according to the layered code path. Workload mediator 1215 can reconfigure task time slices via modified Linux task scheduler 1231 with respect to the nodes of some code-path layer. An example of an implementation of function 9 is the hyperbus performance of FIG. 30.

FIG. 13 is a block diagram describing the components used to implement local hyperbus function 10 of providing a networked hyperbus, according to an embodiment. A networked hyperbus can provide VM network management and live migration, in order to further the objectives of fault tolerance, load balance, energy saving, and VM performance improvement for entire system. This function can meet several international standards including, but not limited to, Telecommunication Management Network (TMN), Global File System (GFS) based on Hadoop/MapReduce, and the virtualization interface library, LibVirt, commonly used for Linux.

Referring to FIG. 13, user-space component 131 can include: (a) network management system (NMS)/element management system (EMS) 1311; (b) remote hyperbus management center 1312; (c) VM server 1313; (d) host agent 1314; (e) remote image database 1315; (f) remote storage 1316; (g) local image database 1317; (h) local storage 1318; and (g) virtual storage manager 1319. Local hyperbus 133 can include: (a) elements to implement functions 0-10 as described herein (i.e., function 0, . . . , function 10) 1331; and (b) virtual shared memory device 1332.

NMS and EMS is shown in one block 1311 of FIG. 13. NMS and EMS are actually two different modules. EMS manages multiple VM servers (e.g., Transoft QServer, VMWare ESX server) 1313. NMS manages multiple EMSs. Hyperbus host agent 1314 interacts with VM server 1313 via LibVirt, and communicates with remote hosts for local hyperbus 133 via remote hyperbus management center 1312. VM migration involves local VM image data 1317 to interact with remote image data 1315. Remote storage application involves local storage 1318 that interacts with remote storage 1316 via virtual storage manager 1319.

The local hyperbus 133 relies on host agent 1314 to execute various hyperbus function 1331 (function 0, . . . , function 10). For example, when a remote VM migrates to local VM 132, the shared memory device 1332 is able to make I/O operations bypassing and independent of QEMU emulator such that accessing directly to ISA/ABI 134 becomes possible. An example of an implementation of function 10 is the networked hyperbus service producer of FIG. 35.

FIG. 14 is a block diagram of hyperbus examples, corresponding to the abstract functions described above. FIG. 14 is drawn in order to explain how the abstract concepts of FIG. 1 can be realized. The hyperbus examples has a architecture that includes user-space component 141, guest-space component 142, hyperbus itself 143, Linux kernel 144, VMM 145, par-virtualization VMM 146, KVM 147 and hardware device 148. Solid-line blocks are software involving this embodiment of the invention; dotted-line blocks are existing Linux open-source components or Windows operating system software. Therefore, dotted-line blocks are not explained much here.

FIG. 14 shows that user-space component 141 interacts with the VM in guest-space component 142 via the hyperbus itself 143, wherein the hyperbus 143 component "local hyperbus" 1433 interacts with Linux kernel 144, VMM 145, and para-virtualization VMM 146, while the virtual interrupt 1472 of ICCM/Upcall of KVM 147 provides switching mechanism amongst user space, guest space, and kernel space. As such, VM ICCM/Upcall driver 1421 is able to process the I/O operations for shared or assigned hardware device 148 via either pass-thru (i.e., zero-copy) or non-pass-thru method. The following components all involve the I/O operation: ICCM/KVM backend shadow device 1461, ICCM/QEMU backend virtual device 1462, ICCM AIO service agent 1441, and VIRTIO service 1464. In one example, the participation of para-virtualization VMM 1416 demonstrates the entire hyperbus operation is able to encapsulate the original Linux open-source limited para-virtualization method. Further, device manager 1411 and ICCM device service agent 1443 is able to bind media channels and control traffic. The above explanation covers the examples of ICCM (FIGS. 15 and 16), Upcall (FIG. 21), PDF/PEP (FIG. 25 or FIG. 28), as well as TCS operation (FIG. 29) for local hyperbus 1433.

Another hyperbus 1413's component, "hyperbus performance service framework/workload mediator" 1431, lets an administrator to manually or automatically mediate the system performance. Host agent 1414 is able to operate via policy manager 14141. Radix-tree traverser 1463 is used to collect performance information inside of Linux kernel, and may change task time slice via a custom-made Linux kernel task scheduler. The above explanation covers all examples of hyperbus performance service framework 1431 (FIG. 30).

One embodiment also explains the operation of hyperbus 143's component "networked hyperbus service producer." Because local hyperbus works on the local host only, networked hyperbus is able to work with storage and image of other remote hosts, and manages all the hosts on the hierarchical network tree. The above explanation covers all examples of networked hyperbus service producer 1432 (FIG. 35).

Inter-counterpart Communication Mechanism Virtual Service Producer (ICCM VSP):

FIG. 15 is the flowchart of ICCM VSP. The VSP delivers policy from workload mediator to the virtual file system, handles the commands for sync and async I/O operation, and accomplishes the goal using existing Linux I/O function. This example partially realizes hyperbus function 1: asymmetric multipath fast control (FIG. 4). The activities are:

Activity 1501, ICCM service producer initialization.

Activity 1502, determine if the operation (abbr. as OP in all diagrams) is to monitor VSP behavior (as a normal process in user mode). If yes, the next activity is activity 1503. Otherwise the next activity is activity 1505.

Activity 1503, receive workload mediator policy, and proceed to activity 1504.

Activity 1504, deliver commands to virtual file system (VFS).

Activity 1505, determine if the operation is to control node (kernel-mode character device acts as a control node). If yes, the next activity is activity 1506. Otherwise the next activity is activity 1515.

Activity 1506, determine if VSP is to control the start/stop of kernel service thread(s). If yes, the next activity is activity 1512. Otherwise the next activity is activity 1507.

Activity 1507, determine if a VSC service request is received. If yes, the next activity is activity 1509. Otherwise the next activity is activity 1508.

Activity 1508, wakeup via wakeup mechanism, read from or write to file system or physical device, and inform VSC when read/write is completed. The next activity is activity 1506.

Activity 1509, determine if the VSC service request is sync or async. If sync, the next activity is activity 1510. If async, the next activity is activity 1511.

Activity 1510, build sync interrupt work queue, and inform VSC upon the completion of reading from or writing to file system or physical device. The next activity is activity 1506.

Activity 1511, build AIO read/write work queue, and insert the task into the wakeup queue via the wakeup mechanism. The next activity is activity 1506.

Activity 1512, determine if to start or stop kernel service thread(s). If start, the next activity is activity 1513. If stop, the next activity is activity 1514.

Activity 1513, start the kernel service thread(s). The next activity is activity 1506.

Activity 1514, stop the kernel service thread(s). The next activity is activity 1506.

Activity 1515, return with error.

Inter-counterpart Communication Mechanism Virtual Service Consumer (ICCM VSC).

FIG. 16 is the flowchart of ICCM VSC. VSC dispatches sync and async read/write requests to VSP via kernel service threads, and divides the operation into multi-paths according to workload policy. From the diagram the multiple code paths are:

(a) ICCM completes I/O read/write via VSC/VSP;

(b) ICCM completes I/O read/write directly via host VIRTIO shared memory virtual device;

(c) Traditional limited para-virtualization method (without using shared memory virtual device); and (d) Traditional non-virtualization method (without trapping into VMM).

This example realizes partially the hyperbus function 1: asymmetric multipath fast control (FIG. 4). The activities are:

Activity 1601, ICCM VSC initialization.

Activity 1602, determine if the operation is to dispatch request to VSP. If yes, the next activity is activity 1603. Otherwise the next activity is activity 1606.

Activity 1603, determine if the request is async. If yes, the next activity is activity 1605. Otherwise the next activity is activity 1604.

Activity 1604, dispatch sync read/write request to VSP via kernel service thread(s). The next activity is activity 1602.

Activity 1605, dispatch AIO read/write request to VSP via kernel service thread(s). The next activity is activity 1602.

Activity 1606, determine if the operation is to divide transaction into different paths according to the workload. If yes, the next activity is activity 1607. Otherwise the next activity is activity 1619.

Activity 1607, obtain workload data from workload mediator, and switch the in-box workload to out-box workload. The next activity is activity 1608.

Activity 1608, dispatch and calculate the address of physical media (shared memory). The next activity is activity 1609.

Activity 1609, determine if the data in conformance with time-sharing principle. If yes, the next activity is activity 1610. Otherwise, the next activity is activity 1611.

Activity 1610, use the traditional non-virtualization method (without trapping into VMM).

Activity 1611, determine if VIRTIO disk or VIRTIO NET. If VIRTIO disk, the next activity is activity 1613. If VIRTIO net, the next activity is activity 1612.

Activity 1612, complete the I/O read/write via VIRTIO NET.

Activity 1613, determine if BlockIO or VIRTIO shared memory driver. If BlockIO, the next activity is activity 1615. If VIRTIO shared memory drive, the next activity is activity 1614.

Activity 1614, complete I/O read/write via host VIRTIO shared memory mechanism (FIG. 17). The next activity is activity 1602.

Activity 1615, VM-QEMU-KVM (FIG. 17) uses Intel or AMD virtualization mechanism. The next activity is activity 1616.

Activity 1616, determine if VFS decides to deliver payload to VSC file system. If yes, the next activity is activity 1618. Otherwise, the next activity is activity 1617.

Activity 1617, VFS delivers payload to Ext3 or Proc file system. The next activity is activity 1616.

Activity 1618, VSC file system dispatches the task to VSP. The next activity is activity 1603.

Activity 1619, return with error.

VIRTIO shared memory mechanism:

FIG. 17 is a combined block diagram and flowchart for VIRTIO shared memory mechanism. There are two modules, VM-QEMU-KVM para-virtualization mechanism and AIO service agent 172.

VM-QEMU-KVM provides switching mechanism to allow task switching amongst user space, guest space and kernel space.

AIO service agent uses Linux host block device driver to read/write disk or network, or optionally read/write cache. Therefore, upon completion of the read/write operation, a Linux daemon program may be used to inform Linux user-space management task.

The activities are:

Activity 1701, enter VM-QEMU-KVM virtualization switching mechanism 171. A VM has an I/O operation, and needs trap into hypervisor.

Activity 1702, Linux kernel shared memory backend emulates receiving-trap, then VMExits to QEMU VIRTIO share memory device.

Activity 1703, QEMU VIRTIO shared memory device trigger VM shared memory backend driver.

Activity 1704, shared memory backend driver completes zero-copy operation to shared memory.

Activity 1705, Linux user-space application makes AIO system call using shared memory.

Activity 1706, enter into AIO service agent 172. Determine if Cache is to be used. If yes, the next activity is activity 1708. Otherwise, the next activity is activity 1707.

Activity 1707, cache manager read/write data from/to block device driver. The next activity is activity 1708.

Activity 1708, block device driver read/write data from/to disk or network. The next activity is activity 1709.

Activity 1709, determine if Cache is to be used. If yes, the next activity is activity 1710. Otherwise, the next activity is activity 1711.

Activity 1710, block device driver inform cache manager the completion of read/write operation.

Activity 1711, block device driver inform service daemon the completion of read/write operation. The next activity is activity 1712.

Activity 1712, service daemon inform user-space management task the completion of read/write operation.

Physical media (shared memory) address calculation:

FIG. 18 is the flowchart of Physical media (shared memory) address calculation. The calculator realizes shared memory address dual translation: first the VM virtual address is translated into VM physical address, and then the VM physical address is translated into host physical address. The activities are:

Activity 1801, physical media (shared memory) address calculator initialization. The next activity is activity 1802.

Activity 1802, determine if the operation is to define dual address-translation. If yes, the next activity is activity 1803. Otherwise, the next activity is activity 1805.

Activity 1803, define VM region physical address initial pointer. The next activity is activity 1804.

Activity 1804, define VM memory relative address initial pointer. The next activity is activity 1816.

Activity 1805, determine if the operation is to allocate random access memory module. If yes, the next activity is activity 1806. Otherwise, the next activity is activity 1813.

Activity 1806, allocate new memory module from mmap big page. The next activity is activity 1816.

Activity 1807, determine if the memory is allocated. If yes, the next activity is activity 1809. Otherwise, the next activity is activity 1808.

Activity 1808, allocate memory module from normal mmap. The next activity is activity 1809.

Activity 1809, insert the new memory module at the end of the memory chain. The next activity is activity 1810.

Activity 1810, KVM sets up memory slot and renews shadow mmu. The next activity is activity 1811.

Activity 1811, renews dual page description table PDT. The next activity is activity 1812.

Activity 1812, each CPU records its memory module address into the TLB. The next activity is activity 1816.

Activity 1813, determine if the operation is dual address-translation. If yes, the next activity is activity 1804. Otherwise, the next activity is activity 1817.

Activity 1814, the VM virtual address is translated into VM physical address. The next activity is activity 1815.

Activity 1815, the VM physical address is translated into host physical address. The next activity is activity 1816.

Activity 1816, normal return.

Activity 1817, return with error.

VM virtual driver:

FIG. 19 is the flowchart of VM virtual driver. The flowchart depicts an abstract driver which represents different drivers running under various environments: different operating systems (e.g., Windows and Linux), different shared memory devices (e.g., multipath shared memory device, ring buffer, or pass-thru device). The abstract operations are:

(1) Receive virtual device I/O command to read/write data from/to shared memory, disk, and network;

(2) Receive non-device I/O command to read/write data from/to shared memory, disk, and network;

(3) Provide VIRTIO interface, utilize path division and realize zero-copy, or use TCP/UDP-IP over Infiniband to complete communication; and (4) Provide functions to suspend and dismount the device.

The activities are:

Activity 1901, VM virtual driver initialization. The next activity is 1902.

Activity 1902, determine if the operation is to receive I/O interrupt. If yes, the next activity is activity 1903. Otherwise, the next activity is activity 1905.

Activity 1903, deliver data to disk or the shared memory device. The next activity is activity 1904.

Activity 1904, inform VM operation completed. The next activity is activity 1919.

Activity 1905, determine if the operation is to handle data. If yes, the next activity is activity 1906. Otherwise, the next activity is activity 1909.

Activity 1906, determine if BlockIO or shared memory. If shared memory, the next activity is activity 1907. If BlockIO, the next activity is activity 1908.

Activity 1907, read/write shared memory. The next activity is activity 1919.

Activity 1908, read/write disk or network. The next activity is activity 1919.

Activity 1909, determine if the operation is to receive Upcall interrupt and handle data. If yes, the next activity is activity 1910. Otherwise, the next activity is activity 1912.

Activity 1910, deliver data to disk. The next activity is activity 1911.

Activity 1911, inform VM operation completed, and release I/O ring buffer. The next activity is activity 1906.

Activity 1912, determine if the operation is VIRTIO interface. If yes, the next activity is activity 1913. Otherwise, the next activity is activity 1917.

Activity 1913, determine if disk I/O or network I/O. If disk I/O, the next activity is activity 1914. If network I/O, the next activity is activity 1916.

Activity 1914, deliver VIRTIO disk driver-related data speedily and bi-directionally to Linux. The next activity is activity 1915.

Activity 1915, realize zero-copy, using multiplexing DMA and IOMMU. The next activity is activity 1919.

Activity 1916, complete TCP/UDP-IP over Infiniband or zero-copy communication. The next activity is activity 1919.

Activity 1917, determine if the operation is to suspend (or dismount) device. If yes, the next activity is activity 1918. If network I/O, the next activity is activity 1920.

Activity 1918, realize suspend (or dismount) device. The next activity is activity 1919.

Activity 1919, normal return.

Activity 1920, return with error.

Figure 20:
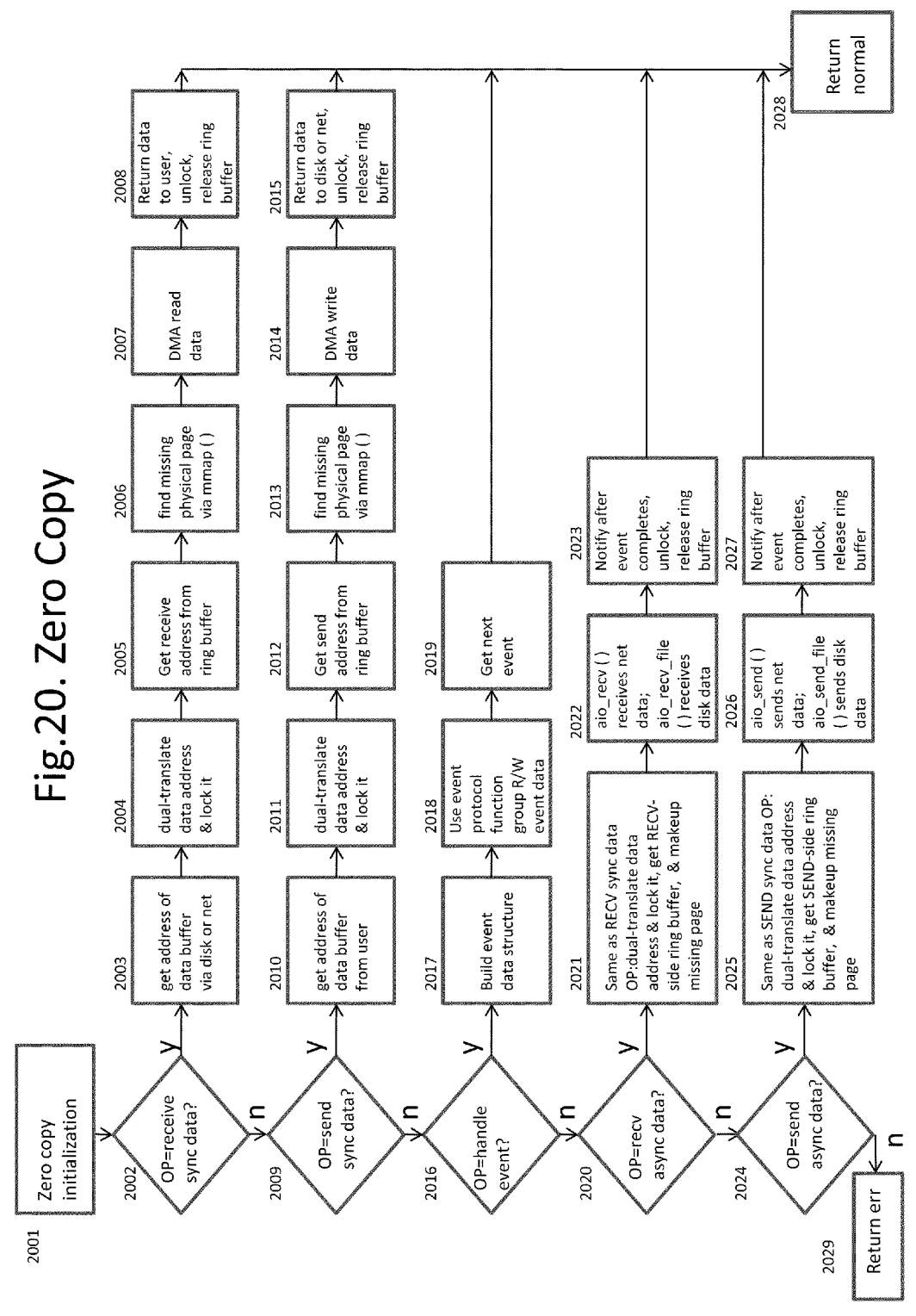

FIG. 20 is the flowchart of a method 2000 of zero-coping, according to an embodiment. Method 2000 is merely exemplary and is not limited to the embodiments presented herein. Method 2000 can be employed in many different embodiments or examples not specifically depicted or described herein. In some embodiments, the activities, the procedures, and/or the processes of method 200 can be performed in the order presented. In other embodiments, the activities, the procedures, and/or the processes of the method 2000 can be performed in any other suitable order. In still other embodiments, one or more of the activities, the procedures, and/or the processes in method 2000 can be combined or skipped.

Zero-copy can be computer method of copying data from one memory area to another that does not use the CPU to perform the copying. In various embodiments, zero-coping can handles sync/async disk/network data delivery, acquires I/O ring buffer address, processes dual address translation and memory lock, finds physical page upon page-missing using Linux system call mmap( ) realizes DMA read/write, returns to user, unlocks memory and/or releases ring buffer. In some examples, zero-coping can utilizes user-space (instead of kernel-space) task as much as possible to avoid procedure complication and low performance. Method 200 can be an examples of implementing one or more of function 0, 1, 2, 3, and 4.

The first activity in Activity 2001, initialize zero-copy. The next activity is 2002.

Activity 2002, determine if the operation is to receive sync data. If yes, the next activity is activity 2003. Otherwise, the next activity is activity 2009.

Activity 2003, acquire data buffer address from disk or network. The next activity is 2004.

Activity 2004, realize dual address translation to get physical address and lock the memory. The next activity is 2005.

Activity 2005, obtain receiving ring address from I/O ring buffer manager. The next activity is 2006.

Activity 2006, find physical page via mmap( ) upon page-missing. The next activity is 2007.

Activity 2007, realize DMA read-in. The next activity is 2008.

Activity 2008, return to user, unlock memory, and release ring buffer. The next activity is 2008.

Activity 2009, determine if the operation is to send sync data. If yes, the next activity is activity 2010. Otherwise, the next activity is activity 2016.

Activity 2010, acquire data buffer address from user. The next activity is 2011.

Activity 2011, realize dual address translation to get physical address and lock the memory. The next activity is 2012.

Activity 2012, obtain sending ring address from I/O ring buffer manager. The next activity is 2013.

Activity 2013, find physical page via mmap( ) upon page-missing. The next activity is 2014.

Activity 2014, realize DMA write-out. The next activity is 2015.

Activity 2015, return to user, unlock memory, and release ring buffer. The next activity is 2028.

Activity 2016, determine if the operation is to handle event. If yes, the next activity is activity 2017. Otherwise, the next activity is activity 2020.

Activity 2017, build event data structure. The next activity is 2018.

Activity 2018, read/write event data using functions in the event protocol function group. The next activity is 2019.

Activity 2019, get next event. The next activity is 2019.

Activity 2020, determine if the operation is to receive async data. If yes, the next activity is activity 2021. Otherwise, the next activity is activity 2024.

Activity 2021, similar to the operation of receiving sync data: realize dual address translation to get physical address and lock memory, acquire receiving-side ring buffer, and makeup missing page. The next activity is 2022.

Activity 2022, aio_recv( ) accepts network data; and aio_recv_file( ) receive disk data. The next activity is 2023.

Activity 2023, notify upon event completion, unlock memory, and release ring buffer. The next activity is 2028.

Activity 2024, determine if the operation is to send async data. If yes, the next activity is activity 2025. Otherwise, the next activity is activity 2029.

Activity 2025, similar to the operation of sending sync data: realize dual address translation to get physical address and lock memory, acquire sending-side ring buffer, and makeup missing page. The next activity is 2026.

Activity 2026, aio_send( ) sends out network data; and aio_send_file( ) sends out disk data. The next activity is 2027.

Activity 2027, notify upon event completion, unlock memory, and release ring buffer. The next activity is 2028.

Activity 2028, normal return.

Activity 2029, return with error.

Upcall:

FIG. 21 is the flowchart of Upcall. The host agent first delivers signal and payload to Upcall via shared memory. Upcall in turn broadcasts signal and payload to one or more VMs. Artificial virtual interrupt lets VM virtual driver to complete the I/O operation of signal/payload in the shared memory. The activities are:

Activity 2101, Upcall ring buffer queue initialization. The next activity is activity 2102.

Activity 2102, host agent acquires ring buffer queue via OpenMmap( ). The next activity is activity 2103.

Activity 2103, host agent sets data into the acquired ring buffer queue. The next activity is activity 2104.

Activity 2104, host agent inform virtual device with send_signal_event( ). The next activity is activity 2105.

Activity 2105, virtual device sets the ordinal number of broadcasted VM as 0. The next activity is activity 2106.

Activity 2106, ordinal number of broadcasted VM=ordinal number of broadcasted VM+1. The next activity is activity 2107.

Activity 2107, set interrupt privilege (higher than Linux task scheduler) via KVM. The next activity is activity 2108.

Activity 2108, handle concurrency of I/O ring buffer queue, and sync/async broadcasting. The next activity is activity 2109.

Activity 2109, virtual device interrupts the I/O driver of broadcasted VM. The next activity is activity 2110.

Activity 2110, determine if finish pushing the driver process messages into stack. If yes, the next activity is activity 2111. Otherwise, the next activity is activity 2109.

Activity 2111, copy the host agent ring queue data into VM driver ring queue. The next activity is activity 2112.

Activity 2112, determine if the above copying is finished. If yes, the next activity is activity 2113. Otherwise, the next activity is activity 2112.

Activity 2113, pop up the driver process messages from stack so that the process is able to continue from the interrupt point. The next activity is activity 2114.

Activity 2114, notify host agent to release its ring buffer queue. The next activity is activity 2115.

Activity 2115, determine if broadcasting to VMs is finished. If yes, the next activity is activity 2116. Otherwise, the next activity is activity 2106.

Activity 2116, normal return.

Virtual Interrupt:

FIG. 22 is the flowchart of virtual interrupt. Virtual interrupt means an interrupt can be artificially injected by management layer. In the following activities, the virtual interrupt may also be used in VTx/SVM interrupt handling, and not necessarily an artificial injection. For the purpose of explanation, it features Intel VT-x. However, AMD SVM technology has similar operation. Virtual interrupt is an example of all hyperbus functions 0 to 10.

It should be noted that VTx/SVM technology makes room for hyperbus to elevate the performance. For example, in activity 2203 as follows, when non-root operation of VMX becomes root operation, VM-execution control fields can be configured in VMCS. Therefore, VMM is used to avoid the overhead of high-frequency guest accesses to the TPR register by configuring VMCS.

The activities are:

Activity 2201, initialize VMM/KVM (in KVM bios) and the next activity is activity 2202.

Activity 2202, determine if the operation is VMExit. If yes, the next activity is activity 2203. Otherwise, the next activity is activity 2212.

Activity 2203, when non-root operation of VMX becomes root operation, VM-execution control fields can be configured in VMCS: processor state=VM state+host state; VMM is used to handle those registers not loaded by VM when configuring VMCS. The next activity is activity 2204.

Activity 2204, preserve processor state; load processor state from host state. The next activity is activity 2205.

Activity 2205, determine if the VM is executing NMI interrupt. If yes, the next activity is activity 2206. Otherwise, the next activity is activity 2220.

Activity 2206, determine if the instruction is related to TPR. If yes, the next activity is activity 2207. Otherwise, the next activity is activity 2209.

Activity 2207, determine if the VMCS TPR shadow is less than its threshold. If yes, the next activity is activity 2208. Otherwise, the next activity is activity 2220.

Activity 2208, stop the interrupt and then send out virtual interrupt. The next activity is activity 2220.

Activity 2209, determine if the interrupt-window exiting or external-interrupt exiting. If interrupt-window exiting, the next activity is activity 2210. If external-interrupt exiting, the next activity is activity 2211.

Activity 2210, set interrupt-window exiting; VM is ready to accept interrupt. The next activity is activity 2220.

Activity 2211, set external-interrupt exiting; VM is ready to accept external interrupt, no matter VM already stopped interrupt. The next activity is activity 2220.

Activity 2212, determine if the operation is VMEntry. If yes, the next activity is activity 2213. Otherwise, the next activity is activity 2218.

Activity 2213, send out virtual interrupt: KVM injects event/interrupt. The next activity is activity 2214.

Activity 2212, determine if the VM is ready to be interrupted. If yes, the next activity is activity 2216. Otherwise, the next activity is activity 2215.

Activity 2215, set interrupt-window exiting; VM is ready to accept interrupt at the next VMExit. The next activity is activity 2203.

Activity 2216, VM is ready to load processor state. The next activity is activity 2203; however, in time sequence, VM code proceeds to activity 2217.

Activity 2217, after interrupt, the processor enters into VM code. This is how VM operates: VMX root operation becomes non-root operation; processor state=VM state+host state; VMM considers the performance situation to handle register loading.

Activity 2218, determine if the operation is hypercall. If yes, the next activity is activity 2219. Otherwise, the next activity is activity 2222.

Activity 2219, process hypercall.

Activity 2220, system error; exception handling, and then the next activity is activity 2221.

Activity 2221, determine if VMX NM#6 is set. If yes, the next activity is activity 2219. Otherwise, the next activity is activity 2222.

Activity 2222, other interrupt operations; and then the next activity is activity 2202.

IO Ring Buffer Manager:

FIG. 23 is the flowchart of I/O Ring Buffer Manager. FIG. 4 is an example realizing partially hyperbus function 4. In order to handle interrupt concurrency, there is an additional queue for interrupt privilege beyond the queue for I/O ring buffer. Every element of the interrupt privilege queue contains interrupt privilege data and a pointer pointing to ring buffer. When an interrupt occurs, interrupt handler rapidly traverses the privilege queue, and advances the queue element according to the interrupt privilege. In other words, if the privilege queue element corresponding to the interrupt privilege is larger than current element privilege, the privilege queue element is advanced forward. Otherwise, no advancing is needed.

The activities are:

Activity 2301, initialize I/O ring buffer manager and then the next activity is activity 2302.

Activity 2302, determine if operation is to set I/O ring buffer queue. If yes, the next activity is activity 2303. Otherwise, the next activity is activity 2305.

Activity 2303, Open_MMAP( ) from empty pool get one queue from the ring buffer of which the Mapbox structure includes interrupt marking, id #, sending address, receiving address, offset, index, instruction, pointer to next Mapbox, etc. The next activity is activity 2304.

Activity 2304, determine if setting of all elements in Mapbox structure is finished. If yes, the next activity is activity 2318. Otherwise, the next activity is activity 2304 (looping until setting completes).

Activity 2305, determine if the operation is to release I/O ring queue. If yes, the next activity is activity 2306. Otherwise, the next activity is activity 2309.

Activity 2306, reset interrupt privilege marking as empty. The next activity is activity 2307.

Activity 2307, determine if the operation is to clear all element with Mapbox structure. If yes, the next activity is activity 2308. Otherwise, the next activity is activity 2307 (looping until all clear).

Activity 2306, reset ring buffer queue into the empty pool. The next activity is activity 2318.

Activity 2309, determine if the operation is to handle concurrency of the queue. If yes, the next activity is activity 2310. Otherwise, the next activity is activity 2319.

Activity 2310, determine if the next queue interrupt privilege marking is empty. If yes, the next activity is activity 2312. Otherwise, the next activity is activity 2311.

Activity 2311, determine if the next queue interrupt privilege is smaller than current queue interrupt privilege. If yes, the next activity is activity 2313. Otherwise, the next activity is activity 2314.

Activity 2312, advance one queue element. The next activity is activity 2310.

Activity 2313, current queue inserts element before the next queue element. The next activity is activity 2311.

Activity 2314, call para-virtualization basic function. The next activity is activity 2315.

Activity 2315, determine if sync or async. If sync, the next activity is activity 2316. If async, the next activity is activity 2317.

Activity 2316, call para-virtualization basic function according to sync method. The next activity is activity 2318.

Activity 2317, call para-virtualization basic function according to async method. The next activity is activity 2318.

Activity 2318, normal return.

Activity 2319, return with error.

ICCM device management agent:

FIG. 24 is the flowchart of ICCM device management agent. Its initialization starts with KVM uses bytecode of openfirmware to monitor (1) PIO/MMIO range, (2) bus interrupt, (3) hardware tree; when hardware boot-loads and bootstraps, QEMU emulator becomes available.

The operations of ICCM device management agent include discovering hardware, assigning hardware, controlling traffic, and band-binding, wherein the operation of traffic control uses multiplexing rule to divide payload from physical device via ISA/ABI.

The flowchart is an example of hyperbus function 5. The activities are:

Activity 2401, KVM uses bytecode of openfirmware to monitor (1) PIO/MMIO range, (2) bus interrupt, (3) hardware tree. The next activity is activity 2402.

Activity 2402, when hardware boot-loads and bootstraps, QEMU emulator becomes available. The next activity is activity 2403.

Activity 2403, hyperbus device manager initializes itself. The next activity is activity 2404.

Activity 2404, determine if the operation is to discover hardware. If yes, the next activity is activity 2405. Otherwise, the next activity is activity 2409.

Activity 2405, determine if the device is virtual (e.g., MMIO). If yes, the next activity is activity 2406. Otherwise, the next activity is activity 2404.

Activity 2406, hyperbus device manager mediates the virtual device. The next activity is activity 2407.

Activity 2407, other virtual devices mediates themselves accordingly (the mediation is caused by multiplexing of the physical hardware).

Activity 2408, determine if the operation is to assign device. If yes, the next activity is activity 2409. Otherwise, the next activity is activity 2412.

Activity 2409, determine if the device is virtual (e.g., MMIO). If yes, the next activity is activity 2410. Otherwise, the next activity is activity 2408.

Activity 2410, hyperbus device manager assign the device as virtual device. The next activity is activity 2411.

Activity 2411, announce this device to the wide-area global VMMs.

Activity 2412, determine if the operation is to control traffic. If yes, the next activity is activity 2413. Otherwise, the next activity is activity 2416.

Activity 2413, traffic control uses multiplexing rule to divide payload from physical device via ISA/ABI. The next activity is activity 2415.

Activity 2414, control shared physical media payload traffic. The next activity is activity 2415.

Activity 2415, deliver payload to VM.

Activity 2416, determine if the operation is band-binding. If yes, the next activity is activity 2417. Otherwise, the next activity is activity 2419.

Activity 2417, operate band-binding. The next activity is activity 2418.

Activity 2418, handle error and quality of service (QoS).

Activity 2419, return with error.

Workload Mediator:

FIG. 25 is the combined block diagram and flowchart. This is the example realizing function 2, 6, and 8. The figure shows 3 policy manager as PDFs 252 and 4 workload mediators as PEPs 251, described as follows:

The three policy managers PDFs read data from various rule bases and/or resource consumption matrix, to handle (1) KVM natural rule decision function, (2) individual transaction performance decision function, and (3) overall transaction performance decision function.

The four workload mediators PEPs acquire policies from the above three PDFs, to execute (1) initial transaction layering and path-division, (2) Linux task scheduling to re-layering and path-re-division, (3) handle overload, burst traffic that impact the entire system, same-layer aggregation, and other entirety problem, and (4) dispatch transaction according to the data from resource consumption matrix.

The activities are:

Activity 2501, workload mediator initializes itself then wait for transaction request. Upon request, proceed to activity 2502.

Activity 2502, determine if transaction needs initial static layering and path-division. If yes, the next activity is 2503. Otherwise, the next activity is activity 2508.

Activity 2503, perform layering and path-division according to transaction KVM natural rules. The next activity is activity 2504.

Activity 2504, create nodes of radix-tree. The next activity is 2505.

Activity 2505, radix-tree traverser creates nodes. The next activity is activity 2508.

The above activities 2503, 2504, and 2505 are the logic of first workload mediator PEP 1.

Block 2506 is the KVM natural rule policy base.

Activity 2507, policy manager handles KVM natural rules. The next activity is activity 2508. This means to deliver KVM natural rule to the first workload mediator PEP 1.

The above block 2506 and activity 2507 comprise the first policy manager PDF1.

Activity 2508, determine if transaction needs to be dynamically scheduled. If yes, the next activity is activity 2509. Otherwise, the next activity is activity 2513.

Activity 2509, Linux task scheduler perform transaction re-layering and path-re-dividing. The next activity is activity 2510.

Activity 2510, radix-tree traverser deletes the old node in individual transaction radix tree and creates a new node. The next activity is activity 2513.

The above activities 2509 and 2510 are logic of the second workload mediator PEP2.

Block 2511 is the individual transaction performance policy base. Below are a few sample policies:

Policy 1: DMA bandwidth usage must be constrained.

Policy 2: QEMU I/O ring buffer must have enough memory.

Policy 3: The maximum concurrent traffic must be constrained.

Activity 2512, policy manager triggers policy, read out matrix data from resource consumption handler, and calculate individual transaction performance data (for detail see FIG. 26 resource consumption handler/reader). The next activity is activity 2509, which means delivering the individual transaction performance policies to the second workload mediator PEP2.

The above block 2511 and activity 2512 comprise the second policy manager PDF2.

Activity 2513, determine if the system needs to eliminate overall host performance obstacles and mediate payload. If yes, the next activity is activity 2514. Otherwise, the next activity is activity 2518.

Activity 2514, use the tree-node slot and label of the radix tree to handle overload, single-point Burst impacting entirety, same layer aggregation, and other overall host problems. The next activity is 2515.

Activity 2515, radix-tree traverser deletes the old nodes for a group of transactions, and then creates new nodes. The next activity is activity 2518.

The above activities 2514 and 2515 comprise the logic of third workload mediator PEP3.

Block 2516 is the overall system performance policy base. Below are a few sample policies:

Policy 1: workload moves to deeper layer to increase efficiency.

Policy 2: mediate same-layer transactions only.

Policy 3: transaction avoids interrupt as much as possible.

Activity 2517, policy manager triggers policy, read out matrix data from resource consumption handler, calculate overall-system performance data, and then the next activity is 2514, which means delivering the performance policy of a group of transactions to the third workload mediator PEP3.

The above block 2516 and activity 2517 comprise the third policy manager PDF3.

Activity 2518, determine if the system needs to dispatch transaction. If yes, the next activity is activity 2519. Otherwise, the next activity is activity 2522.

Activity 2519, read matrix data from resource consumption handler. The next activity is activity 2520.

Activity 2520, dispatch transaction according to the data from resource consumption matrix and then the next activity is activity 2521.

Activity 2521, start transaction (ICCM multipath, upcall, etc.).

The above activities 2519, 2520, and 2521 comprise the logic of fourth workload mediator PEP4.

Activity 2522, return with error.

Resource Consumption Handler:

FIG. 26 is the combined block diagram and flowchart of Resource Consumption Handler. The figure is an example of hyperbus function 6. It includes two policy execution points. The left-hand-side block 261 is performance data writer PEP1, and the right-hand-side block 262 is the performance data reader PEP2.

Resource consumption handler uses radix-tree traverser to write to and read from the data in resource consumption matrix, analyze the rules in individual transaction rule base, and decide the sufficient conditions of the following policies:

DMA bandwidth usage is constrained?

QEMU I/O ring buffer have enough memory?

Virtual and non-virtual QEMU bridge out-of-band control signal is too slow?

Shared memory big enough?

The batch handling of dual translations of Global Virtual Address (GVA) to global physical address (GPA), and global physical address (GPA) to host physical address (HPA) takes too long?

The miss-hit of the cache page of virtual TLB is too much?

The batch handling of KVM IRQfd interrupt injection takes too long?

The GPU frame buffer out-of-band control signal (to delegate the work to None-Virtual processes) is too slow?

The traffic of concurrent access is too big?

Thread/process running are too long?

The user stack is big enough?

The activities are:

Activity 2601, perform radix-tree writer initialization, including radix-tree traverser initialization and the building of resource consumption matrix pool. The next activity is activity 2602.

Activity 2602, determine if running the first layer: VM SCSI/NDIS function. If yes, the next activity is activity 2603. Otherwise, the next activity is activity 2604.

Activity 2603, write DMA bandwidth and QEMU I/O ring buffer memory size. The next activity is activity 2619.

Activity 2604, determine if running the second layer: QEMU function. If yes, the next activity is activity 2605. Otherwise, the next activity is activity 2606.

Activity 2605, write out-of-band control signal time length of virtual and non-virtual QEMU bridge, and shared memory size. The next activity is activity 2619.

Activity 2606, determine if running the third layer: kernel and virtual driver function. If yes, execute activities 2607, 2608, and 2609. Otherwise, the next activity is activity 2611.

Activity 2607, write the time required to complete dual address-translation. The next activity is activity 2619.

Activity 2608, write the number of miss-hit of virtual TLB cache page. The next activity is activity 2619.

Activity 2609, write the time required to batch-process KVM IRQfd interrupt injection. The next activity is activity 2619.

Activity 2610, write the time length of out-of-band control signal of GPU frame buffer, and shared memory size. The next activity is activity 2619.

Activity 2611, determine if running the fourth layer: non-virtual driver function. If yes, the next activity is activity 2612. Otherwise, the next activity is activity 2613.

Activity 2612, write maximum concurrent traffic and total bandwidth. The next activity is activity 2619.

Activity 2613, determine if running the fifth layer: physical machine function. If yes, the next activity is activity 2614. Otherwise, the next activity is activity 2615.

Activity 2614, write thread/process time and user stack size. The next activity is activity 2619.

Activity 2615, determine if the entire transaction is committed. If yes, the next activity is activity 2616. Otherwise, the next activity is activity 2621.

Activity 2616, write the total time of the entire transaction to the resource consumption matrix. The next activity is activity 2617.

Activity 2617, write the data in resource consumption matrix to history database. The next activity is activity 2618.

Activity 2618, delete corresponding radix-tree node. The next activity is activity 2619.

Activity 2619, enter into radix-tree traverser. The next activity is activity 2620.

Activity 2620, normal return.

Activity 2621, return with error.

The above activities 2601 to 2621 comprise the logic of performance data writer PEP 1.

Activity 2622, individual transaction policy manager, or PDF, often validates various individual transaction policies 2624, 2628, 2630, 2632, 2634, 2638. When a policy matches the current condition, the PFD transfers control to PEP2 in FIG. 25 to execute corresponding policy. In order to realize such validation, each policy triggers its PEP activities 2625, 2627, 2629, 2631, 2633, 2635, 2637, and 2639.

Activity 2623, radix-tree handler reader initialize itself, and then the next activity is activity 2625.

Activity 2624, validate policies "DMA bandwidth usage too much?" and "QEMU I/O ring buffer memory enough?" The next activity is activity 2625.

Activity 2625, read DMA bandwidth and QEMU I/O ring buffer memory size. The next activity is activity 2619.

Activity 2626, validate policies "virtual and non-virtual QEMU bridge out-of-band control signal takes too long?" and "shared memory enough?" The next activity is activity 2627.

Activity 2627, read virtual and non-virtual QEMU bridge out-of-band control signal time length and shared memory size. The next activity is activity 2619.

Activity 2628, validate policy "virtual MMU dual address-translation GVA→GPA, GPA→HPA batch processing too slow?" The next activity is activity 2629.

Activity 2629, read virtual MMU dual address-translation GVA→GPA, GPA→HPA batch processing time. The next activity is activity 2619.

Activity 2630, validate policy "virtual TLB cache page miss-hit too much?" The next activity is activity 2631.

Activity 2631, read the number of TLB cache page miss-hit. The next activity is activity 2619.

Activity 2632, validate policy "KVM IRQfd interrupt injection takes too long?" The next activity is activity 2633.

Activity 2633, read the time length of KVM IRQfd interrupt injection. The next activity is activity 2619.

Activity 2634, validate policies "GPU frame buffer out-of-band control signal too slow?" and "shared memory big enough" The next activity is activity 2635.

Activity 2635, read the time length of GPU frame buffer out-of-band control signal, and shared memory size. The next activity is activity 2619.

Activity 2636, validate policies "maximum concurrent traffic too big?" and "bandwidth big enough" The next activity is activity 2637.

Activity 2637, read the maximum concurrent traffic and bandwidth size. The next activity is activity 2619.

Activity 2638, validate policies "threads and processes too long?" and "user stack big enough" The next activity is activity 2639.

Activity 2639, read the thread/process time and user stack size. The next activity is activity 2619.

The above activities 2622 to 2639 comprise the logic of performance data reader PEP2.

Radix-tree traverser:

FIG. 27 is the flowchart of radix-tree traverser.

The number of layers of a radix-tree represents the number of code layers, five (5) in total: (Layer 1) VM SCSI/NDIS; (Layer 2) QEMU; (Layer 3) kernel and virtual driver; (Layer 4) non-virtual driver; and (Layer 5) physical machine; The tree generates a 64-bit key for a transaction. It builds a radix-tree path according to its layer number. Each node has 8 slots. The 5 out of 8 slots of a leave node are filled in with the pointers to 5 rows of the matrix.

During the "same layer gang-lookup" the tree-node of the transaction, if the layer number translated from node height is less than given layer number, then continue to traverse downward to find tree node, get the matrix pointer in the slot of the node, and read the data from the element of the matrix pointed.

The activities are:

Activity 2701, radix tree traverser initialize itself and the next activity is 2702.

Activity 2702, determine if building transaction tree node. If yes, the next activity is activity 2703. Otherwise, the next activity is activity 2705.

Activity 2703, get an empty matrix from resource consumption matrix free pool. The next activity is activity 2704.

Activity 2704, the tree generates a 64-bit key for a transaction. It builds a radix-tree path according to its layer number. Each node has 8 slots. The 5 out of 8 slots of a leave node are filled in with the pointers to 5 rows of the matrix. The next activity is activity 2723.

Activity 2705, determine if looking up transaction tree node. If yes, the next activity is activity 2706. Otherwise, the next activity is activity 2708.

Activity 2706, traverse downward to find tree node. Get the matrix pointer in the slot of the node. The next activity is activity 2707.

Activity 2707, read the data from the element of the matrix pointed. The next activity is activity 2723.

Activity 2708, determine if "same layer gang-looking up" transaction tree node. If yes, the next activity is activity 2709. Otherwise, the next activity is activity 2715.

Activity 2709, traverse downward to find tree node and the node has to be a leave node. The next activity is activity 2710.

Activity 2710, node height is translated into layer number. The next activity is activity 2711.

Activity 2711, determine if the translated layer number is less than given layer number. If yes, the next activity is activity 2714. Otherwise, the next activity is activity 2712.

Activity 2712, traverse downward to find tree node and get the matrix pointer in the slot of the node. The next activity is activity 2714.

Activity 2713, read the data from the element of the matrix pointed. The next activity is activity 2714.

Activity 2714, continue to search the tree-node path of the transaction. The next activity is activity 2715.

Activity 2715, determine if the traversing is completed. If yes, the next activity is activity 2713. Otherwise, the next activity is activity 2709.

Activity 2716, determine if filling up tree-slot of the transaction. If yes, the next activity is activity 2717. Otherwise, the next activity is activity 2719.

Activity 2717, traverse downward to find tree node and get the matrix pointer in the slot of the node. The next activity is activity 2714.

Activity 2718, write the data into the element of the matrix pointed. The next activity is activity 2723.

Activity 2719, determine if deleting tree-slot of the transaction. If yes, the next activity is activity 220. Otherwise, the next activity is activity 2723.

Activity 2720, traverse downward to find tree node and get the matrix pointer in the slot of the node. The next activity is activity 2721.

Activity 2721, clear the data in all the elements of the matrix pointed. Return the matrix into free pool. The next activity is activity 2722.

Activity 2722, clear all the nodes of the transaction path in the radix tree. The next activity is activity 2723.

Activity 2723, normal return.

Activity 2724, return with error.

The device manager that has a manageable shadow ISA/ABI

FIG. 28 is the flowchart of the device manager that has a manageable shadow ISA/ABI. Its initialization starts with KVM uses bytecode of openfirmware to monitor (1) PIO/MMIO range, (2) bus interrupt, (3) hardware tree; when hardware boot-loads and bootstraps, QEMU emulator becomes available.

The operations of ICCM device management agent include discovering hardware, assigning hardware, controlling traffic, and band-binding, wherein the operation of traffic control uses PEP to divide payload from physical device via shadow ISA/ABI. The band-binding also use PEP to bind multiple communication channel.

The flowchart is an example of hyperbus function 7. The activities are:

Activity 2801, KVM uses bytecode of openfirmware to monitor (1) PIO/MMIO range, (2) bus interrupt, (3) hardware tree. The next activity is activity 2802.

Activity 2802, when hardware boot-loads and bootstraps, QEMU emulator becomes available. The next activity is activity 2803.

Activity 2803, hyperbus device manager initializes itself. The next activity is activity 2804.

Activity 2804, determine if the operation is to discover hardware. If yes, the next activity is activity 2805. Otherwise, the next activity is activity 2809.

Activity 2805, determine if the device is virtual (e.g., MMIO). If yes, the next activity is activity 2806. Otherwise, the next activity is activity 2804.

Activity 2806, hyperbus device manager mediates the virtual device. The next activity is activity 2807.

Activity 2807, other virtual devices mediates themselves accordingly (the mediation is caused by multiplexing of the physical hardware).

Activity 2808, determine if the operation is to assign device. If yes, the next activity is activity 2809. Otherwise, the next activity is activity 2812.

Activity 2809, determine if the device is virtual (e.g., MMIO). If yes, the next activity is activity 2810. Otherwise, the next activity is activity 2808.

Activity 2810, hyperbus device manager assign the device as virtual device. The next activity is activity 2811.

Activity 2811, announce this device to the wide-area global VMMs.

Activity 2812, determine if the operation is to control traffic. If yes, the next activity is activity 2813. Otherwise, the next activity is activity 2816.

Activity 2813, traffic control uses multiplexing rule to divide payload from physical device via shadow ISA/ABI. The next activity is activity 2814.

Activity 2814, deliver payload to VM.

Activity 2815, determine if the operation is band-binding. If yes, the next activity is activity 2816. Otherwise, the next activity is activity 2818.

Activity 2816, operate band-binding using PEP. The next activity is activity 2817.

Activity 2817, handle error and quality of service (QoS).

Activity 2818, return with error.

Trusted Computing System (TCS) operation:

FIG. 29 is the combined block diagram and flowchart for TCS operation. The figure is an example of hyperbus function 8. The figure includes two modules. The left-hand-side block 291 is USB module operation; the right-hand-side block 292 is product system operation. USB hardware module manufacturer writes Endorsement key pair to USB module, and provides Ekpub public key to the software vendor. Software vendor installs the USB module hardware on the server product, and proceed to configure hardware module, upgrade hardware module, and validate software updates.

The activities are:

Activity 2901, USB hardware module manufacturer writes Endorsement key pair to USB module, and provides Ekpub public key to the software vendor. The next activity is activity 2902.

Activity 2902, Software vendor installs the USB module hardware on the server product. The next activity is activity 2904.

Activity 2903, USB module initializes itself. The next activity is activity 2904.

Activity 2904, determine if operation is module configuration. If yes, the next activity is activity 2905. Otherwise, the next activity is activity 2906.

Activity 2905, configure expiry time, enable state, activate state, software hash value, and other code/data. The next activity is activity 2912.

Activity 2906, determine if operation is module upgrading. If yes, the next activity is activity 2907. Otherwise, the next activity is activity 2908.

Activity 2907, reset expiry time, update software hash, and update other code/data.

Activity 2908, determine if operation is validating upgrading. If yes, the next activity is activity 2909. Otherwise, the next activity is activity 2910.

Activity 2909, upon the start of server, reset the hash value of USB as new. The next activity is activity 2916.

Activity 2910, return with error.

The above activities 2901 to 2910 comprise the logic of USB module operation.

Activity 2911, hyperbus TCS initializes itself. The next activity is activity 2912.

Activity 2912, determine if operation is software configuration. If yes, the next activity is activity 2913. Otherwise, the next activity is activity 2914.

Activity 2913, input the public key Ekpub into software.

Activity 2914, determine if operation is re-calculating hash value. If yes, the next activity is activity 2915. Otherwise, the next activity is activity 2916.

Activity 2915, re-calculate hash value.

Activity 2916, determine if operation is validating software upgrading. If yes, the next activity is activity 2917. Otherwise, the next activity is activity 2919.

Activity 2917, read new hash value from USB module. The next activity is activity 2918.

Activity 2918, read pre-stalled validation computer code from USB module. The next activity is activity 2919.

Activity 2919, determine if validation success during system running. If yes, the next activity is activity 2921. Otherwise, the next activity is activity 2920.

Activity 2920, handle validation failure. The next activity is activity 2921.

Activity 2921, validation is completed.

The above activities 2911 to 2921 comprise the logic of product system operation.

Hyperbus Performance Service Framework:

FIG. 30 is the flowchart of Hyperbus Performance Service Framework. FIG. 30 is an example of hyperbus function 9.

The single system deployment method for Hyperbus performance service framework can be plugged into cluster system.

The service framework uses existing performance tools sysstate, vmstate, and oProfile.

The service framework uses performance optimizer to perform problem solutions; the workload mediator collects performance data and mediates workload; and bottleneck identifier collects and analyzes data.

The activities are:

Activity 3001, service framework initializes itself. The next activity is activity 3002.

Activity 3002, determine if deploying service. If yes, the next activity is activity 3003. Otherwise, the next activity is activity 3012.

Activity 3003, single system deployment method: deploy distributed performance profile tasks. The next activity is activity 3004.

Activity 3004, determine if deploying existing tools. If yes, the next activity is activity 3005. Otherwise, the next activity is activity 3009.

Activity 3005, determine if deploying distributed virtual system. If yes, the next activity is activity 3007. Otherwise, the next activity is activity 3006.

Activity 3006, collect performance data via methods such as performance optimizer.

Activity 3007, collect performance data via workload mediator.

Activity 3008, performance database interacts with workload mediator.

Activity 3009, determine if performance profile tool. If yes, the next activity is activity 3010. Otherwise, the next activity is activity 3011.

Activity 3010, allow easy extensibility to incorporate existing profiling tools (e.g., Oprofile).

Activity 3011, allow easy extensibility to incorporate existing data gathering tools (e.g., Sysstat, vmstat).

Activity 3012, determine if plugging the service into cluster system. If yes, the next activity is activity 3013. Otherwise, the next activity is activity 3014.

Activity 3013, the single system deployment method for Hyperbus performance service framework is plugged into cluster system.

Activity 3014, determine if the service data handling. If yes, the next activity is activity 3015. Otherwise, the next activity is activity 3020.

Activity 3015, determine if the service data collection or data analyzing. If data collection, the next activity is activity 3016. If data analyzing, the next activity is activity 3018.

Activity 3016, operate data collection via service framework graphical user interface. The next activity is activity 3017.

Activity 3017, operate data collection via bottleneck identifier.

Activity 3018, operate data analyzing via service framework graphical user interface displaying statistical presentations. The next activity is activity 3019.

Activity 3019, operate data analyzing via bottleneck identifier.

Activity 3020, other coordinated benchmarking and profiling service.

Performance optimizer:

FIG. 31 is the flowchart of performance optimizer. The figure is an example of hyperbus function 9.

The performance optimizer mediates performance for the parameterized functional unit via manual command lines or graphical user interfaces, wherein VMM characteristic parameters includes virtual memory sizes, number of virtual CPU cores, and virtual IPI interrupts; and driver parameters includes virtual BIOS, virtual PCI bus, and virtual devices. Transaction performance is micro-tuned through policy manager of workload mediator, and macro-tuned through parameter and problem solutions. The said problem solutions further include Linux big-page-table API batch processing based on protocols, including Pre-allocated memory chain, and code-path aggregation scheduler.

The activities are:

Activity 3101, performance optimizer initializes itself. The next activity is 3102.

Activity 3102, determine if adjusting parameter with command line. If yes, the next activity is activity 3103. Otherwise, the next activity is activity 3109.

Activity 3103, mediate performance for the parameterized functional unit via command lines. The next activity is 3104.

Activity 3104, determine if adjusting VMM feature parameters. If yes, the next activity is activity 3105. Otherwise, the next activity is activity 3106.

Activity 3105, mediate performance via virtual memory sizes, number of virtual CPU cores, and virtual IPI interrupts.

Activity 3106, determine if mediating driver parameters. If yes, the next activity is activity 3107. Otherwise, the next activity is activity 3108.

Activity 3107, mediate performance via virtual BIOS, virtual PCI bus, and virtual devices.

Activity 3108, mediate performance via other parameters.

Activity 3109, determine if mediating performance parameters via graphical interface. If yes, the next activity is activity 3110. Otherwise, the next activity is activity 3112.

Activity 3110, mediate performance for the parameterized functional unit via graphical interface. The next activity is 3111.

Activity 3111, graphical interface uses command lines functions. The next activity is Activity 3104.

Activity 3112, determine if improving performance by tech solutions. If yes, the next activity is activity 3113. Otherwise, the next activity is activity 3116.

Activity 3113, execute tech solutions (may sacrifice some physical memory). The next activity is Activity 3114.

Activity 3114, solutions manager executes solutions using solution base.

Activity 3115, solution base interacts with solutions manager. A few sample solutions are:
  Solution 1: use Linux big page table.
  Solution 2: Protocol-based API batch, including Pre-allocated memory chain.
  Solution 3: Code-path aggregation scheduler.

Activity 3116, determine if auto optimization during runtime. If yes, the next activity is activity 3117. Otherwise, the next activity is activity 3121.

Activity 3117, system automatically and dynamically mediates parameters. The next activity is activity 3118.

Activity 3118, determine if macro-tuning or micro-tuning. If micro-tuning, the next activity is activity 3119. If macro-tuning, the next activity is activity 3121.

Activity 3119, use bottleneck identifier. The next activity is activity 3120.

Activity 3120, micro-tuning via workload mediator/policy manager.

Activity 3121, macro-tuning via parameter and tech solution.

Activity 3122, return with error.

Bottleneck Identifier:

FIG. 32 is the flowchart of bottleneck identifier. Bottleneck identifier collects data from clustered- or single system-resource consumption matrix. Bottleneck identifier performs statistical analysis to tell if current system performance is far beyond the norm, or far exceed the range defined by the bottleneck rule base. The figure is an example of hyperbus function 9.

The activities are:

Activity 3201, bottleneck identifier initializes itself. The next activity is 3202.

Activity 3202, set a flag variable to be data collection or data analyzing. The next activity is 3203.

Activity 3203, acquire performance profile via existing tools. The next activity is Activity 3204.

Activity 3204, determine if system clustered. If yes, the next activity is activity 3205. Otherwise, the next activity is activity 3206.

Activity 3205, deal with cluster situation. The next activity is Activity 3207.

Activity 3206, consider single-system situation to collect data. The next activity is Activity 3207.

Activity 3207, collect data via resource consumption handler.

Activity 3208, resource consumption matrix interacts with resource consumption handler.

Activity 3209, determine if flag variable is data analyzing. If yes, the next activity is activity 3210. Otherwise, the next activity is activity 3215.

Activity 3210, perform statistical analysis to identify bottleneck. The next activity is Activity 3211.

Activity 3211, perform statistical analysis on the collected data. The next activity is Activity 3212.

Activity 3212, determine if current system performance is far beyond the norm. If yes, the next activity is activity 3213. Otherwise, the next activity is activity 3212 to continue identifying.

Activity 3213, write data into bottleneck database. The next activity is Activity 3215.

Activity 3214, bottleneck database receiving/displaying data; Here are a few sample bottlenecks:
  Bottleneck 1: system resource utilization is too high.
  Bottleneck 2: system resource utilization is too low.
  Bottleneck 3: there is abrupt performance peak.
  Bottleneck 4: overall system operation is abnormal.

Activity 3215, normal return.

Customized Linux task scheduler:

FIG. 33 is the flowchart of customized Linux task scheduler. The figure is an example of hyperbus function 9. Customized Linux task scheduler includes a socket to plug in scheduler algorithm, configurable para-virtualization scheduler, real-time scheduler, and grid-computing scheduler. The default Linux kernel scheduler CFS is substituted by the said algorithms for their respective situations; for single transaction code path, the priority and time-slice is rescheduled; for the entire system, if overload happens, same layer transaction is rescheduled, or the priority and time slice of tasks with burst traffic are rescheduled; otherwise, the priority and time slice of the transactions worsening the traffic are rescheduled via task switch logic.

The activities are:

Activity 3301, task scheduler initializes itself. The next activity is Activity 3302.

Activity 3302, determine if a scheduler is to be selected. If yes, the next activity is activity 3303. Otherwise, the next activity is activity 3310.

Activity 3303, determine if there is a pre-set scheduler. If yes, the next activity is activity 3304. Otherwise, the next activity is activity 3305.

Activity 3304, determine if pre-set scheduler is PV (para-virtualization) scheduler. If yes, the next activity is activity 3306. Otherwise, the next activity is activity 3307.

Activity 3305, set the default scheduler as the current Linux task scheduler (Linux edition 2.6 is CFS, or Completely Fair Scheduler). The next activity is Activity 3310.

Activity 3306, set the PV scheduler (the modified Linux BVT or CS or SEDF). The next activity is Activity 3310.

Activity 3307, determine if high-performance computing scheduler. If yes, the next activity is activity 3308. Otherwise, the next activity is activity 3309.

Activity 3308, set the real-time scheduler. The next activity is Activity 3310.

Activity 3309, set the grid-computing scheduler or cloud-computing scheduler. The next activity is Activity 3310.

Activity 3310, determine if setting hardware method to accelerate task switching. If yes, the next activity is activity 3311. Otherwise, the next activity is activity 3312.

Activity 3311, set VTx/SVM hardware technology to accelerate task switching. The next activity is Activity 3310.

Activity 3312, determine if executing single-transaction scheduling request. If yes, the next activity is activity 3313. Otherwise, the next activity is activity 3314.

Activity 3313, adjust the priority and time-slice of single-transaction path. The next activity is Activity 3314.

Activity 3314, determine if executing entire-system-transaction scheduling request. If yes, the next activity is activity 3315. Otherwise, the next activity is activity 3320.

Activity 3315, determine if performance situation is overload. If yes, the next activity is activity 3316. Otherwise, the next activity is activity 3319.

Activity 3316, determine if performance situation is single burst impacting entirety. If yes, the next activity is activity 3317. Otherwise, the next activity is activity 3318.

Activity 3317, adjust the priority and time-slice of burst-transaction. The next activity is Activity 3320.

Activity 3318, adjust the priority and time-slice of same-layer-aggregation transactions. The next activity is Activity 3320.

Activity 3319, adjust the priority and time-slice of the transaction impacting traffic. The next activity is Activity 3320.

Activity 3317, run selected scheduler. The next activity is Activity 3302.

Task switch operation logic:

FIG. 34 is the flowchart of task switch operation logic. The figure is an example of hyperbus function 9. It is a relatively generalized task switch logic, in conformance to the logic structure of various schedulers (e.g., CFS, completely fair scheduler) in FIG. 33. It also utilizes VTx/SVM technology to accelerate task switch, and adjust VM priority according to pre-configuration data.

The activities are:

Activity 3401, pre-configure the VTx/SVM technology to accelerate task switch, and to adjust VM priority. The next activity is activity 3402.

Activity 3402, set the top of task scheduler stack. The next activity is activity 3403.

Activity 3403, get current task. The next activity is activity 3404.

Activity 3404, get previous task, and store it into data structure task_struct. The next activity is activity 3405.

Activity 3405, push next task onto scheduler stack. The next activity is activity 3406.

Activity 3406, refresh cache and TLB, switch page table. The next activity is activity 3407.

Activity 3407, use the method set_current_task to set the next VM as current task. The next activity is activity 3408.

Activity 3408, execute current task. The next activity is activity 3409.

Activity 3409, set task data structure task_struct, and for customized scheduler (1) run selected scheduler method, (2) use VTx/SVM technology to accelerate task switch. The next activity is activity 3410.

Activity 3410, continue non-idle task (i.e., VM), or idle task (if no more VM). The next activity is activity 3402 until interrupt occurs, in which case the loop starts again.

Networked hyperbus service producer:

FIG. 35 is the flowchart of networked hyperbus service producer. The figure is an example of hyperbus function 10.

The networked hyperbus includes a VSC-VSP architecture wherein the local hyperbus is the VSP. VSP combines virtualization and telecommunication management network (TMN) standard, combines virtualization and Hadoop/MapReduce Global File System, uses standard interface to connect with virtualization server, manages VMs in multiple hosts, and manages multiple host groups.

When the VSC is a remote hyperbus on the net, local hyperbus connects to that remote hyperbus according to a hierarchical relationship; when the VSC is image database, local hyperbus searches the image via Global File System (GFS); when the VSC is storage system, local hyperbus searches the file location via GFS, meaning that a virtual object is transformed to a physical object, wherein GFS client sends out hashing chunk index and file name to the subnet using MapReduce methods as follows: first, Master server sends back chunk handle and chunk address. Second, GFS client sends chunk handle and byte range to subnet. Lastly, GFS client maps subnet host file chunks (so-called "Map") and sends back the found data (so-called "Reduce"); when the VSC is an EMS (element management system) or NMS (network management system), local hyperbus connects with the EMS or NMS according to many-to-one relationship.

The activities are:

Activity 3501, networked hyperbus as a service producer initializes itself. The next activity is activity 3502.

Activity 3502, determine if VSC is a remote hyperbus on the net. If yes, the next activity is activity 3503. Otherwise, the next activity is activity 3504.

Activity 3503, local hyperbus connects to the remote hyperbus according to a hierarchical relationship.

Activity 3504, determine if the VSC is image database. If yes, the next activity is activity 3505. Otherwise, the next activity is activity 3517.

Activity 3505, local hyperbus searches the image via Global File System (GFS). The next activity is activity 3507.

Activity 3506, Global File System (GFS: Hadoop+MapReduce) initializes itself. The next activity is activity 3507.

Activity 3507, determine if Virtual-o-Physical (V2P) conversion. If yes, the next activity is activity 3508. Otherwise, the next activity is activity 3513.

Activity 3508, GFS client sends hashing data, chunk index and filename to subnet. The next activity is activity 3509.

Activity 3509, Master Server returns chunk handle and chunk address. The next activity is activity 3510.

Activity 3510, GFS client sends chunk handle and byte range to subnet. The next activity is activity 3511.

Activity 3511, map subnet host file chunks (Map). The next activity is activity 3512.

Activity 3512, subnet returns the search result (Reduce).

Activity 3513, determine if physical machine migration. If yes, the next activity is activity 3514. Otherwise, the next activity is activity 3515.

Activity 3514, upgrade at the physical machine database only without impacting logical database.

Activity 3515, determine if chunk server already built up. If yes, the next activity is activity 3516. Otherwise, the next activity is activity 3521.

Activity 3516, Master Server registers chunk handle and chunk address.

Activity 3517, determine if VSC is a storage system. If yes, the next activity is activity 3518. Otherwise, the next activity is activity 3519.

Activity 3518, look up storage address. The next activity is activity 3507.

Activity 3519, determine if VSC is an EMS/NMS. If yes, the next activity is activity 3520. Otherwise, the next activity is activity 3521.

Activity 3520, local hyperbus connects with the EMS or NMS according to many-to-one relationship.

Activity 3521, return with error.

Management Center and Host Agent:

FIG. 36 is a combined block diagram and flowchart for management center and host agent. The figure is an example of hyperbus function 10. Block 361 is the management center and block 362 is the host agent.

The management center (1) handles creating, editing, deleting and searching personnel data such as user and administrator privilege, (2) uses graphical user interface and/or command-line to handle user and administrator commands, including user session, VM state, VM start/shutdown, and (3) manages node, host, VM, virtual storage, virtual network, load-balancing policy, fault-tolerance policy, and hyperbus service framework, including networked hyperbus GFS service.

The host agent (1) handles heartbeat and VM state according to the transaction code path that delivers payload, (2) handles local net communication and VM responses to events via hyperbus signal & control, and (3) manages VM via Linux VM server, using standard Linux API LibVirt to control Redhat enterprise VM server, Transoft QServer, or Citrix Xen server.

The activities are:

Activity 3601, management center initializes itself. The next activity is activity 3602.

Activity 3602, determine if managing users. If yes, the next activity is activity 3603. Otherwise, the next activity is activity 3604.

Activity 3603, create, modify, delete, and search personnel data such as user and administrator privilege. The next activity is activity 3622.

Activity 3604, determine if the operation is to accept user command. If yes, the next activity is activity 3605. Otherwise, the next activity is activity 3616.

Activity 3605, analyze user command via communication protocol. The next activity is activity 3606.

Activity 3606, determine if the command is user authentication. If yes, the next activity is activity 3607. Otherwise, the next activity is activity 3609.

Activity 3607, authenticate user. The next activity is activity 3608.

Activity 3608, manage user session. The next activity is activity 3622.

Activity 3609, determine if command is to start, shutdown, suspend VM. If yes, the next activity is activity 3610. Otherwise, the next activity is activity 3612.

Activity 3610, manage host service. The next activity is activity 3611.

Activity 3611, manages VM via Linux VM server, using standard Linux API LibVirt to control Redhat enterprise VM server, Transoft QServer, or Citrix Xen server. The next activity is activity 3620.

Activity 3612, determine if command is VM state. If yes, the next activity is activity 3613. Otherwise, the next activity is activity 3615.

Activity 3613, handles heartbeat and VM state according to the transaction code path that delivers payload. The next activity is activity 3614.

Activity 3614, handles local net communication and VM responses to events via hyperbus signal & control. The next activity is activity 3620.

Activity 3615, return with error.

Activity 3616, determine if the operation is application interface (API) activities. If yes, the next activity is activity 3617. Otherwise, the next activity is activity 3618.

Activity 3617, check root privilege at administrator level. The next activity is activity 3609.

Activity 3618, determine if the operation is to manage VM resources. If yes, the next activity is activity 3619. Otherwise, the next activity is activity 3621.

Activity 3619, manages node, host, VM, virtual storage, virtual network, load-balancing policy, fault-tolerance policy, and hyperbus service framework, including networked hyperbus GFS service. The next activity is activity 3620.

Activity 3620, normal return.

Activity 3621, return with error.

Activity 3622, normal return.

In actual deployment environment, because most of the hyperbus functions have nothing to do with VM operating system, the said method is suited for Windows, Linux, Android, etc. as long as there are drivers compatible to respective guest OS that is supported by KVM. Further, for the situation where hyperbus method applies to other VMM beyond Linux KVM, (e.g., Xen), any embodiment of hyperbus method, including local and networked hyperbus, performance service framework, and any example such as workload mediator, modified task scheduler, etc. is regarded as the subject matter protected by this patent. Lastly, the abstract functions of the embodiments cover any hardware virtualization technology beyond today's VTx/SVM from Intel and AMD, and any none-x86 hardware virtualization technology.

Based on the above description regarding block diagram, flowchart and their combination, the virtualization method used here to enhance performance, on one hand, provides for enterprise with a technology of server virtualization which is based on hyperbus to create performance service framework, as well as networked hyperbus to allow an administrator manage performance of virtualized server, communicate with remote host on the net, and realize the management of remote hyperbus. On the other hand, because hyperbus is able to work with any virtualization application product (such as virtual desktop infrastructure, VDI) via management center and host agent, hyperbus is the foundation infrastructure for terminal virtualization.

In summary, various embodiment of this invention combines local hyperbus functions, networked hyperbus function and performance service framework, providing an enterprise-grade virtualization method to enhance performance, as well as accessory tools. This method realizes KVM para-virtualization based on Linux operating system kernel and KVM, to create various hyperbus components, so that an administrator is able to enhance Linux KVM performance via performance service framework. Further, the existing limited para-virtualization KVM method can still work together with hyperbus components.

Although the invention has been described with reference to specific embodiments, it will be understood by those skilled in the art that various changes may be made without departing from the spirit or scope of the invention. Accordingly, the disclosure of embodiments of the invention is intended to be illustrative of the scope of the invention and is not intended to be limiting. It is intended that the scope of the invention shall be limited only to the extent required by the appended claims. For example, to one of ordinary skill in the art, it will be readily apparent that activities described herein may be comprised of many different activities, procedures and be performed by many different modules, in many different orders that any element of the systems may be modified and that the foregoing discussion of certain of these embodiments does not necessarily represent a complete description of all possible embodiments.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A kernel bus system for building at least one virtual machine monitor, the kernel bus system is based on a kernel-based virtual machine, the kernel bus system being stored at one or more non-transitory memory storage modules and being configured to run on one or more processors of a host computer, the host computer comprising one or more hardware devices and memory comprising the one or more non-transitory memory storage modules, the kernel bus system comprising:
a hyperbus;
one or more user space components;
one or more guest space components configured to interact with the one or more user space components via the hyperbus;
one or more virtual machine monitor components configured to interact with the one or more user space components and the one or more guest space components via the hyperbus, the one or more virtual machine monitor components comprising:
one or more frontend devices configured to perform one or more first input/output operations with the one or more hardware devices of the host computer using at least one of a zero-copy method or a non-pass-thru method; and
one or more para-virtualization components comprising:
a virtual interrupt module configured to use VTx/SVM interrupt handling and one or more processor instructions to swap the one or more processors of the host computer between a kernel space and a guest space; and
a virtual input/output driver configured to enable synchronous input/output signaling, asynchronous input/output signaling, payload delivery, and pass-through delivery substantially independent of an QEMU process emulation,
wherein:
the one or more frontend devices are further configured such that when the one or more frontend devices perform one or more first input/output operations with the one or more hardware devices of the host computer using the zero-copy method, the one or more frontend devices handle synchronous and asynchronous file input/outputs and finding missed physical pages; and
the hyperbus, the one or more user space components, the one or more guest space components, the one or more virtual machine monitor components, and the one or more para-virtualization components are configured to run on the one or more processors of the host computer;
the one or more guest space components comprise one or more virtual machines;
the one or more user space components comprise a device manager, a policy rule base, and a rule base user interface;
the hyperbus comprises: a shadow ISA/ABI; and one or more policy decision function modules; and
the shadow ISA/ABI of the hyperbus is configured to broadcast one or more device management functions to the one or more virtual machines of the one or more guest space components.

2. The kernel bus system of claim 1, further comprising:
one or more kernel-based virtual machine components, wherein:
the one or more guest space components comprise one or more virtual machine operating system kernels;
the hyperbus comprises one or more kernel-based virtual machine backend components; and
the one or more kernel-based virtual machine backend components of the hyperbus are configured to determine one or more code paths for the one or more virtual machine operating system kernels of the one or more guest space components; and
the one or more kernel-based virtual machine components are configured to run on the one or more processors of the host computer.

3. The kernel bus system of claim 2, wherein:
the one or more virtual machines of the one or more guest space components comprise a virtual machine;
the virtual machine of the one or more guest space components is configured to execute the one or more first input/output operations;
the virtual machine comprises a virtual machine kernel;
the hyperbus comprises the a user-defined kernel entity;
the hyperbus is configured such that when the virtual machine of the one or more guest space components begins execution of the one or more first input/output operations, the hyperbus delivers a signal to the user-defined kernel entity of the hyperbus, wherein the signal informs the user-defined kernel entity of the hyperbus that the virtual machine is executing the one or more first input/output operations; and
the user-defined kernel entity is configured to access at least one of the one or more virtual machine monitor components or the one or more kernel-based virtual machine components to complete the one or more first input/output operations.

4. The kernel bus system of claim 1, wherein:
the one or more virtual machines of the one or more guest space components comprise at least one virtual machine;
the at least one virtual machine comprises a user space application;
the hyperbus comprises one or more hyperbus components;
the at least one virtual machine is configured such that when the user space application of the at least one virtual machine executes one or more second input/output operations, the at least one virtual machine interacts with the one or more hyperbus components via a trap interrupt; and
the one or more hyperbus components is configured to switch the one or more second input/output operations of the user space application of the at least one virtual machine to a user space when the at least one virtual machine interacts with the one or more hyperbus components via the trap interrupt.

5. The kernel bus system of claim 1, wherein:
the one or more guest space components comprise one or more virtual machines; and
the hyperbus is configured to simultaneously operate on the one or more virtual machines of the one or more guest space components using one or more local kernel calls and shared memory of the memory.

6. The kernel bus system of claim 1, further comprising:
a ISA/ABI module,
wherein:
the one or more guest space components comprise one or more virtual machines;
the one or more user space components comprise a device manager;
the device manager of the one or more user space components is configured to manage the ISA/ABI module using the one or more device management functions;
the one or more device management functions comprise discovering, assigning, traffic-controlling, and band-binding; and
the hyperbus is configured to broadcast the one or more device management functions to the one or more virtual machines of the one or more guest space components.

7. The kernel bus system of claim 1, wherein:
the hyperbus comprises one or more policy decision function modules and one or more policy execution point modules;
the one or more user space components comprise a policy rule base and a rule base user interface;
the one or more policy decision function modules of the hyperbus are configured to receive one or more policies from the rule base user interface of the one or more user space components and make decisions regarding the one or more policies using one or more rules of the policy rule base of the one or more user space components; and
the one or more policy execution point modules are configured to execute the a policy passed from the one or more policy decision function module modules.

8. The kernel bus system of claim 1, wherein:
the one or more guest space components comprise one or more virtual machines;
the one or more user space components comprise a device manager, a policy rule base, and a rule base user interface;
the hyperbus comprises: a shadow ISA/ABI; and one or more policy decision function modules;
the rule base user interface is configured to allow an administrator to set one or more policies of the one or more policy decision function modules of the hyperbus;
the device manager of the one or more user space components is configured to send the one or more device management functions to the hyperbus; and
the one or more device management functions comprise discovering, assigning, traffic-controlling, and band-binding; and
the shadow ISA/ABI of the hyperbus is configured to broadcast the one or more device management functions to the one or more virtual machines of the one or more guest space components.

9. The kernel bus system of claim 1, wherein:
the hyperbus comprises a software hash calculator and a hyperbus TCS agent;
the software hash calculator is configured to calculate a signed hash value;
the hyperbus TCS agent is configured to obtain a stored hash value from at least one of a peripheral device module or a storage module; and
the hyperbus TCS agent is further configured to stop execution of the kernel bus system if the stored hash value does not match the signed hash value.

10. The kernel bus system of claim 1, wherein:
the one or more user space components comprise a performance database, a bottleneck identifier, and a workload mediator;
the hyperbus comprises one or more policy execution point modules;
the one or more policy execution point modules are configured to provide first performance data to the bottleneck identifier;
the performance database is configured to store historical performance data and statistical performance data;
the bottleneck identifier is configured to at least partially determine bottleneck information using the first performance data, the historical performance data, and the statistical performance data; and
the workload mediator is configured as a policy decision function to reconfigure a task time slice based on the bottleneck information provided by the bottleneck identifier.

11. The kernel bus system of claim 10, wherein:
the hyperbus further comprises a radix tree traverser;
the radix tree traverser is configured to determine a radix tree; and
the radix tree is configured to be used to address the first performance data.

12. The kernel bus system of claim 1, wherein:
the hyperbus comprises:
a local hyperbus configured to run the one or more processors of the host computer; and
a networked hyperbus configured to run one or more processors of a remote computer.

13. The kernel bus system of claim 1, wherein:
the hyperbus comprises:
a performance service module configured to enable an administrator to adjust a performance of the host computer; and
the one or more user space components comprise:
a policy manager; and
a user space application library configured to control the performance service module of the hyperbus via the policy manager.

14. The kernel bus system of claim 1, wherein:
the one or more processor instructions used to swap between the kernel space and the guest space comprise VMExit and VMEntry; and
the VTx/SVM interrupt handling comprises the VMExit and the VMEntry.

15. A method of building at least one virtual machine monitor via a kernel bus system on a host computer, the method comprising:
providing a hyperbus configured to run on the host computer;
providing one or more user space components configured to run on the host computer;
providing one or more guest space components configured to run on the host computer and further configured to interact with the one or more user space components via the hyperbus;
providing one or more virtual machine monitor components configured to interact with the one or more user space components and the one or more guest space components via the hyperbus, the one or more virtual machine monitor components configured to run on the host computer and comprising:

one or more frontend devices configured to perform one or more input/output operations with one or more hardware devices of the host computer using a zero-copy procedure or a non-pass-thru procedure, the one or more frontend devices are further configured such that when the one or more frontend devices perform one or more first input/output operations with the one or more hardware devices of the host computer using the zero-copy method procedure, the one or more frontend devices handle synchronous and asynchronous file input/outputs and finding missed physical pages; and providing one or more para-virtualization components configured to run on the host computer and comprising:
a virtual interrupt module that uses VTx/SVM interrupt handling and is configured to use one or more processor instructions to swap one or more processors of the host computer between a kernel space and a guest space; and
a virtual input/output driver configured to enable synchronous input/output signaling, asynchronous input/output signaling and payload delivery, and pass-through delivery substantially independent of a QEMU process emulation, wherein:
the one or more guest space components comprise one or more virtual machines;
the one or more user space components comprise a device manager, a policy rule base, and a rule base user interface;
the hyperbus comprises: a shadow ISA/ABI; and one or more policy decision function modules; and
the shadow ISA/ABI of the hyperbus is configured to broadcast one or more device management functions to the one or more virtual machines of the one or more guest space components.

16. A computer system being stored at one or more non-transitory memory storage modules and being configured to run on one or more processors of a host computer, the host computer comprising one or more hardware devices and memory comprising the one or more non-transitory memory storage modules, the computer system comprising:
one or more hyperbus service modules configured to run on the host computer; and
one or more hyperbus backend components configured to run on the host computer;
one or more user space components;
one or more kernel space components; and
one or more guest space components configured to run on the host computer and comprising:
one or more virtual machines configured to interact with the one or more guest space components via the hyperbus and comprising one or more virtual machine applications, the one or more virtual machine applications configured to perform one or more input/output operations;
one or more virtual machine operating system kernels comprising one or more drivers, the one or more drivers are configured to interact with the one or more hyperbus service modules to facilitate the one or more virtual machines performing the one or more input/output operations; and
one or more VIRTIO devices comprising:
a VM-QEMU-KVM para-virtualization mechanism configured to facilitate task switching between the one or more guest space components, the one or more user space components, and the one or more kernel space components; and
an AIO service agent configured to facilitate read and write to the memory;

wherein:
the one or more virtual machine operating system kernels of the one or more guest space components are configured to enter the one or more hyperbus backend components using at least one trap instruction; and
the one or more hyperbus backend components are configured to choose a code path from one or more code paths to interact with the one or more VIRTIO devices;
the one or more user space components comprise a device manager, a policy rule base, and a rule base user interface;
the hyperbus comprises: a shadow ISA/ABI; and one or more policy decision function modules;
the shadow ISA/ABI of the hyperbus is configured to broadcast one or more device management functions to the one or more virtual machines of the one or more guest space components;
the one or more hyperbus service modules comprise an AIO service agent;
the VM-QEMU-KVM para-virtualization mechanism comprises a QEMU module; and
a QEMU module comprises the one or more VIRTIO devices.

17. The computer system of claim 16, wherein:
the one or more user space components comprise a performance database, a bottleneck identifier, and a workload mediator;
the hyperbus comprises two or more policy execution point modules;
the two or more policy execution point modules are configured to provide first performance data to the bottleneck identifier;
the performance database is configured to store historical performance data and statistical performance data;
the bottleneck identifier is configured to at least partially determine bottleneck information using the first performance data, the historical performance data, and the statistical performance data; and
the workload mediator is configured to reconfigure a task time slice based on the bottleneck information provided by the bottleneck identifier.

18. The computer system of claim 17, wherein:
the hyperbus further comprises a radix tree traverser;
the radix tree traverser is configured to determine a radix tree; and
the first performance data comprise the radix tree.

\* \* \* \* \*